(12) United States Patent
Yamamoto et al.

(10) Patent No.: US 8,609,208 B2
(45) Date of Patent: Dec. 17, 2013

(54) OPTICALLY ISOTROPIC LIQUID CRYSTAL MEDIUM AND OPTICAL DEVICE

(71) Applicants: JNC Corporation, Tokyo (JP); JNC Petrochemical Corporation, Tokyo (JP)

(72) Inventors: Shin-Ichi Yamamoto, Chiba (JP); Koki Sago, Chiba (JP); Takafumi Kuninobu, Chiba (JP); Yasuhiro Haseba, Chiba (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 0 days.

(21) Appl. No.: 13/664,439

(22) Filed: Oct. 31, 2012

(65) Prior Publication Data

US 2013/0114009 A1    May 9, 2013

(30) Foreign Application Priority Data

Nov. 1, 2011    (JP) .................. 2011-240019

(51) Int. Cl.
| | |
|---|---|
| C09K 19/34 | (2006.01) |
| C09K 19/32 | (2006.01) |
| C09K 19/12 | (2006.01) |
| C09K 19/54 | (2006.01) |
| C09K 19/38 | (2006.01) |
| G02F 1/1333 | (2006.01) |

(52) U.S. Cl.
USPC ............. 428/1.1; 252/299.61; 252/299.62; 252/299.66; 252/299.5; 349/182; 349/183

(58) Field of Classification Search
CPC ............. C09K 19/0275; C09K 19/321; C09K 19/3402; C09K 19/38; C09K 19/586; C09K 2019/0466; C09K 2019/3427
USPC ............. 428/1.1; 252/299.61, 299.62, 299.63, 252/299.66, 299.5; 349/182, 183
See application file for complete search history.

(56) References Cited

U.S. PATENT DOCUMENTS

2012/0313042 A1 * 12/2012 Yanai et al. ............. 252/299.61

FOREIGN PATENT DOCUMENTS

| JP | 2003-327966 | 11/2003 |
|---|---|---|
| JP | 2005-157109 | 6/2005 |
| JP | 2005-336477 | 12/2005 |
| JP | 2006-506477 | 2/2006 |
| JP | 2006-506515 | 2/2006 |
| JP | 2006-089622 | 4/2006 |
| JP | 2006-127707 | 5/2006 |
| JP | 2006-225655 | 8/2006 |
| JP | 2006-299084 | 11/2006 |
| WO | 98/23561 | 6/1998 |
| WO | 2005/080529 | 9/2005 |
| WO | 2005/090520 | 9/2005 |
| WO | 2006/063662 | 6/2006 |
| WO | 2010/058681 | 5/2010 |

OTHER PUBLICATIONS

Kikuchi et al., "Polymer-stabilized liquid crystal blue phases," Nature Materials, Sep. 2002, pp. 64-68, vol. 1.

Hisakado et al., "Large Electro-optic Kerr Effect in Polymer-Stabilized Liquid-Crystalline Blue Phases," Advanced Materials, Jan. 6, 2005, pp. 96-98, vol. 17, No. 1.

Haseba et al., "Electro-optic effects of the optically isotropic state induced by the incorporative effects of a polymer network and the chirality of liquid crystal," Journal of the SID, Jun. 2006, pp. 551-556, vol. 14/6.

* cited by examiner

Primary Examiner — Shean C Wu
(74) Attorney, Agent, or Firm — Jianq Chyun IP Office

(57) ABSTRACT

A liquid crystal medium having an optically isotropic liquid crystal phase is described, which has stability to heat, light and so on, a broad temperature range of liquid crystal phase, a large optical anisotropy and a large dielectric anisotropy. A liquid crystal composition is described, which includes an achiral component T and a chiral dopant and exhibits an optically isotropic liquid crystal phase. The achiral component T contains, as its first component, at least one compound selected from compounds represented by formula (1), $$R^1 {-}{\left(\!\!{A^1}\!\!\right)}{-}Z^1{\Big\}_i}{\left(\!\!{A^2}\!\!\right)}{-}Z^2{\Big\}_j}{\left(\!\!{A^3}\!\!\right)}{-}Z^3{\Big\}_k}{\left(\!\!\underset{O}{\overset{O}{\bigcirc}}\!\!\right)}{-}Z^4{-}$$

$$\!\!{-}{\left(\!\!{A^4}\!\!\right)}{\Big\}_m}{-}Z^5{-}{A^5}{\Big\}_n}{-}Z^6{-}{\left(\!\!{A^6}\!\!\right)}{\Big\}_p}{-}Z^7{-}{\left(\!\!\underset{Y^2}{\overset{Y^1}{\bigcirc}}\!\!\right)}{-}X^1$$

(1)

wherein $R^1$ is $C_{1\text{-}10}$ alkyl, the rings $A^1$ to $A^6$ are 1,4-phenylene, $Z^1$ to $Z^7$ are single bonds, $Y^1$ and $Y^2$ are fluorine; $X^1$ is halogen, and i, j, k, m, n, p and q are independently 0 or 1.

48 Claims, 1 Drawing Sheet

OPTICALLY ISOTROPIC LIQUID CRYSTAL MEDIUM AND OPTICAL DEVICE

CROSS-REFERENCE TO RELATED APPLICATIONS

This application claims the priority benefit of Japan Application No. 2011-240019, filed on Nov. 1, 2011. The entirety of the above-mentioned patent application is hereby incorporated by reference herein and made a part of this specification.

BACKGROUND OF THE INVENTION

1. Field of the Invention

This invention relates to a liquid crystal medium useful as a material for optical devices, particularly a liquid crystal medium having a broad temperature range of liquid crystal phase, a large dielectric anisotropy and a large optical anisotropy. The invention also relates to an optical device that utilizes the liquid crystal medium, particularly an optical device that can be used in a broad temperature range and driven at a low voltage and is capable of acquiring a rapid electrooptical response.

2. Description of Related Art

Liquid crystal display (LCD) devices using liquid crystal compositions are widely used for display of clocks, calculators, word processors and so on. These LCD devices utilize the optical anisotropy and the dielectric anisotropy of liquid crystal compounds. The operation modes of LCD devices mainly include phase change (PC), twisted nematic (TN), super twisted nematic (STN), bistable twisted nematic (BTN), electrically controlled birefringence (ECB), optically compensated bend (OCB), in-plane switching (IPS), vertical alignment (VA) and so on, which use one or more polarizers for display purposes. Also, many studies have recently been done to the mode where an electric field is applied to an optically isotropic liquid crystal phase to induce electric birefringence (Patent Documents 1-14, Non-patent Documents 1-3).

Moreover, wavelength tuneable filters, wavefront control devices, liquid crystal lenses, aberrational correction devices, aperture control devices, optical head devices and so on that utilize the electric birefringence of a blue phase as one of the optically isotropic liquid crystal phases have been proposed (Patent Documents 10-12).

According to the driving mode, LCD devices can be classified into passive matrix (PM) and active matrix (AM) types. The PM type is further classified into static type, multiplex type and so on, and the AM type is classified into thin film transistor (TFT) type and metal insulator metal (MIM) type, etc.

Each of these LCD devices contains a liquid crystal composition with suitable properties. To improve the characteristics of an LCD device, it is preferred that the liquid crystal composition has suitable properties. General properties necessary for a liquid crystal compound as a component of a liquid crystal composition include:
1) chemical and physical stability,
2) a high clearing point (liquid crystal phase-isotropic phase transition temperature),
3) a low lower-limit temperature of the liquid crystal phase (nematic phase, cholesteric phase, smectic phase, and optically isotropic liquid crystal phases like blue phase, etc.),
4) good compatibility with other liquid crystal compounds,
5) an appropriately large dielectric anisotropy, and
6) an appropriately large optical anisotropy.

Particularly, in view of lowering the driving voltage, a liquid crystal compound being large in both the dielectric anisotropy and the optical anisotropy is preferred for an optically isotropic liquid crystal phase.

When a liquid crystal composition including a liquid crystal compound with chemical and physical stability (the $1^{st}$ property) is used in an LCD device, the voltage holding ratio can be improved.

In addition, a liquid crystal composition including a liquid crystal compound having a high clearing point or a low lower-limit temperature of liquid crystal phase (the $2^{nd}$ and $3^{rd}$ properties) can have a broad temperature range of nematic phase or optically isotropic liquid crystal phase, and therefore can be used in display devices in a broad temperature range. To exhibit better properties that are difficult to exhibit by a single compound, a liquid crystal compound is usually mixed with a number of other liquid crystal compounds to prepare a liquid crystal composition for use. Therefore, a liquid crystal compound used in an LCD device preferably has good compatibility with other liquid crystal compounds (the $4^{th}$ property). Recently, LCD devices being superior in the display performances such as contrast, display capacity, response time and so on are required particularly. In addition, regarding the used liquid crystal material, a liquid crystal composition with a low driving voltage is required. Also, in order to drive, at a low voltage, an optical device that is driven in an optically isotropic liquid crystal phase, it is preferred to use a liquid crystal compound with large dielectric anisotropy and optical anisotropy.

On the other hand, an optically isotropic liquid crystal composition containing a compound of formula (1) of this invention has a feature of being driven by a low driving voltage. A composition further containing a compound represented by formula (2) or (3) in addition to formula (1) of this invention is also driven by a low voltage.

PRIOR-ART DOCUMENTS

Patent Documents

[Patent Document 1] Japanese Patent Publication No. 2003-327966
[Patent Document 2] International Publication No. 2005/90520
[Patent Document 3] Japanese Patent Publication No. 2005-336477
[Patent Document 4] Japanese Patent Publication No. 2006-89622
[Patent Document 5] Japanese Patent Publication No. 2006-299084
[Patent Document 6] Japanese Patent Publication No. 2006-506477
[Patent Document 7] Japanese Patent Publication No. 2006-506515
[Patent Document 8] International Publication No. 2006/063662
[Patent Document 9] Japanese Patent Publication No. 2006-225655
[Patent Document 10] Japanese Patent Publication No. 2005-157109
[Patent Document 11] International Publication No. 2005/80529
[Patent Document 12] Japanese Patent Publication No. 2006-127707
[Patent Document 13] International Publication No. 1998/023561

[Patent Document 14] International Publication No. 2010/058681

Non-Patent Documents

[Non-patent Document 1] *Nature Materials,* 1, 64, (2002)
[Non-patent Document 2] *Adv. Mater.,* 17, 96, (2005)
[Non-patent Document 3] *Journal of the SID,* 14, 551, (2006)

SUMMARY OF THE INVENTION

An object of the invention is to provide a liquid crystal medium having stability to heat, light and so on, a broad temperature range of liquid crystal phase, a large optical anisotropy, a large dielectric anisotropy, and an optically isotropic liquid crystal phase. Another object is to provide a variety of optical devices including the liquid crystal medium, which can be used in a broad temperature range and have a short response time, a large contrast and a low driving voltage.

Accordingly, this invention provides a liquid crystal medium as a liquid crystal composition or a polymer/liquid crystal composite, and an optical device containing the liquid crystal medium as follows.

[1] A liquid crystal composition exhibiting an optically isotropic liquid crystal phase, which comprises an achiral component T and a chiral dopant, wherein the achiral component T contains, as a first component thereof, at least one compound selected from the group consisting of compounds represented by formula (1),

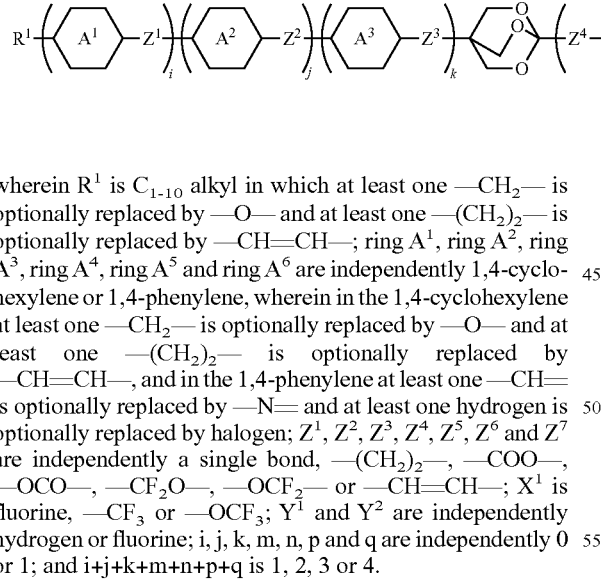

wherein $R^1$ is $C_{1-10}$ alkyl in which at least one —$CH_2$— is optionally replaced by —O— and at least one —$(CH_2)_2$— is optionally replaced by —CH=CH—; ring $A^1$, ring $A^2$, ring $A^3$, ring $A^4$, ring $A^5$ and ring $A^6$ are independently 1,4-cyclohexylene or 1,4-phenylene, wherein in the 1,4-cyclohexylene at least one —$CH_2$— is optionally replaced by —O— and at least one —$(CH_2)_2$— is optionally replaced by —CH=CH—, and in the 1,4-phenylene at least one —CH= is optionally replaced by —N= and at least one hydrogen is optionally replaced by halogen; $Z^1$, $Z^2$, $Z^3$, $Z^4$, $Z^5$, $Z^6$ and $Z^7$ are independently a single bond, —$(CH_2)_2$—, —COO—, —OCO—, —$CF_2O$—, —$OCF_2$— or —CH=CH—; $X^1$ is fluorine, —$CF_3$ or —$OCF_3$; $Y^1$ and $Y^2$ are independently hydrogen or fluorine; i, j, k, m, n, p and q are independently 0 or 1; and i+j+k+m+n+p+q is 1, 2, 3 or 4.

[2] The liquid crystal composition of [1], wherein in formula (1), i+j+k+m+n+p+q is 2, 3 or 4.

[3] The liquid crystal composition of [1] or [2], wherein in formula (1), q is 1.

[4] The liquid crystal composition of any one of [1] to [3], wherein in formula (1), $R^1$ is a straight alkyl of $C_{1-10}$, a straight alkenyl of $C_{2-10}$ or a straight alkoxy of $C_{1-9}$; the ring $A^1$, the ring $A^2$, the ring $A^3$, the ring $A^4$, the ring $A^5$ and the ring $A^6$ are independently 1,4-cyclohexylene, 1,4-cyclohexenylene, tetrahydropyran-2,5-diyl, or 1,4-phenylene in which at least one hydrogen is optionally replaced by fluorine or chlorine; and $Z^1$, $Z^2$, $Z^3$, $Z^4$, $Z^5$, $Z^6$ and $Z^7$ are independently a single bond, —$(CH_2)_2$—, —COO—, —$CF_2O$— or —CH=CH—.

[5] The liquid crystal composition of any one of [1] to [4], wherein in formula (1), $R^1$ is a straight alkyl of $C_{1-10}$; the ring $A^1$, the ring $A^2$, the ring $A^3$, the ring $A^4$, the ring $A^5$ and the ring $A^6$ are independently 1,4-cyclohexylene, 1,4-phenylene, tetrahydropyran-2,5-diyl, 3-fluoro-1,4-phenylene or 3,5-difluoro-1,4-phenylene; and $Z^1$, $Z^2$, $Z^3$, $Z^4$, $Z^5$, $Z^6$ and $Z^7$ are independently a single bond, —$(CH_2)_2$—, —COO—, —$CF_2O$— or —CH=CH—.

[6] The liquid crystal composition of [1], wherein the first component comprises at least one compound selected from the group consisting of compounds represented by formula (1-1-1):

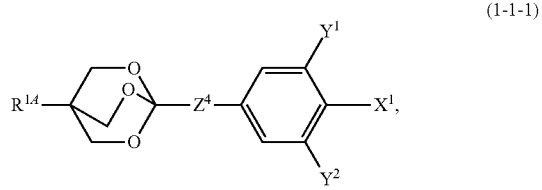

wherein $R^{1A}$ is a straight alkyl of $C_{1-10}$, $Z^4$ is a single bond; —$(CH_2)_2$—, —COO—, —$CF_2O$— or —CH=CH—; $X^1$ is fluorine, —$CF_3$ or —$OCF_3$—; and $Y^1$ and $Y^2$ are independently hydrogen or fluorine.

[7] The liquid crystal composition of [1], wherein the first component comprises at least one compound selected from the group consisting of compounds represented by formulae (1-2-1) and (1-2-2):

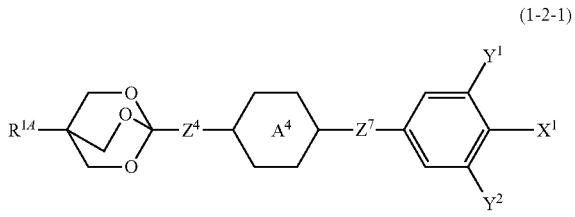

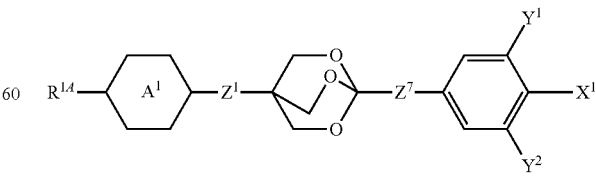

wherein $R^{1A}$ is a straight alkyl of $C_{1-10}$; the ring $A^1$ and the ring $A^4$ are independently 1,4-cyclohexylene, 1,4-phenylene, tetrahydropyran-2,5-diyl, 3-fluoro-1,4-phenylene or 3,5-difluoro-1,4-phenylene; $Z^1$, $Z^4$ and $Z^7$ are independently a single bond, —(CH$_2$)$_2$—, —COO—, —CF$_2$O— or —CH═CH—; $X^1$ is fluorine, —CF$_3$ or —OCF$_3$—; $Y^1$ and $Y^2$ are independently hydrogen or fluorine; in formula (1-2-1), at least one of $Z^4$ and $Z^7$ is a single bond; and in formula (1-2-2), at least one of $Z^1$ and $Z^7$ is a single bond.

[8] The liquid crystal composition of [7], wherein in formula (1-2-1), arbitrary one of $Z^4$ and $Z^7$ is —CF$_2$O—; and in formula (1-2-2), arbitrary one of $Z^1$ and $Z^7$ is —CF$_2$O—.

[9] The liquid crystal composition of [1], wherein the first component comprises at least one compound selected from the group consisting of compounds represented by formulae (1-3-1), (1-3-2) and (1-3-3):

(1-3-1)

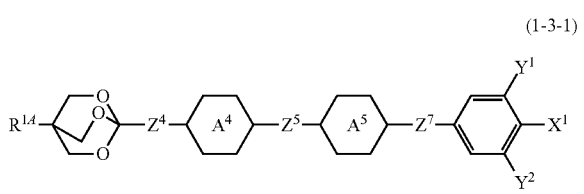

(1-3-2)

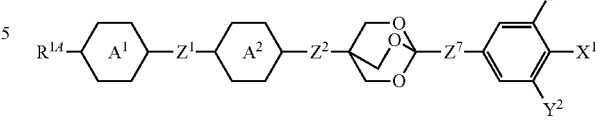

(1-3-3)

wherein $R^{14}$ is a straight alkyl of $C_{1-10}$; the ring $A^1$, the ring $A^2$, the ring $A^4$ and the ring $A^5$ are independently 1,4-cyclohexylene, 1,4-phenylene, tetrahydropyran-2,5-diyl, 3-fluoro-1,4-phenylene or 3,5-difluoro-1,4-phenylene; $Z^1$, $Z^2$, $Z^4$, $Z^5$ and $Z^7$ are independently a single bond, —(CH$_2$)$_2$—, —COO—, —CF$_2$O— or —CH═CH—; $X^1$ is fluorine, —CF$_3$ or —OCF$_3$—; $Y^1$ and $Y^2$ are independently hydrogen or fluorine; in formula (1-3-1), at least two of $Z^4$, $Z^5$ and $Z^7$ are single bonds; in formula (1-3-2), at least two of $Z^1$, $Z^4$ and $Z^7$ are single bonds; and in formula (1-3-3), at least two of $Z^1$, $Z^2$ and $Z^7$ are single bonds.

[10] The liquid crystal composition of [9], wherein in formula (1-3-1), arbitrary one of $Z^4$, $Z^5$ and $Z^7$ is —CF$_2$O—; in formula (1-3-2), arbitrary one of $Z^1$, $Z^4$ and $Z^7$ is —CF$_2$O—; and in formula (1-3-3), arbitrary one of $Z^1$, $Z^2$ and $Z^7$ is —CF$_2$O—.

[11] The liquid crystal composition of [1], wherein the first component comprises at least one compound selected from the group consisting of compounds represented by formulae (1-4-1), (1-4-2), (1-4-3) and (1-4-4):

(1-4-1)

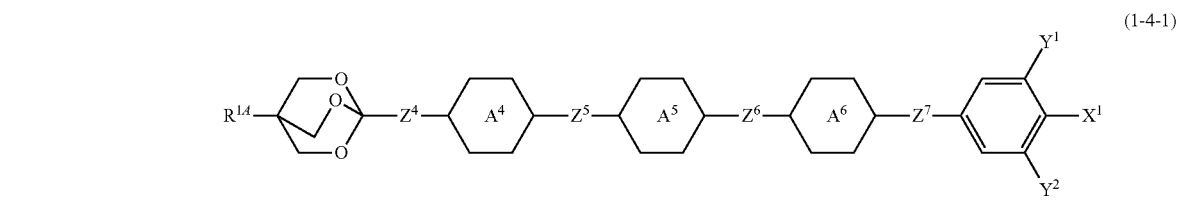

(1-4-2)

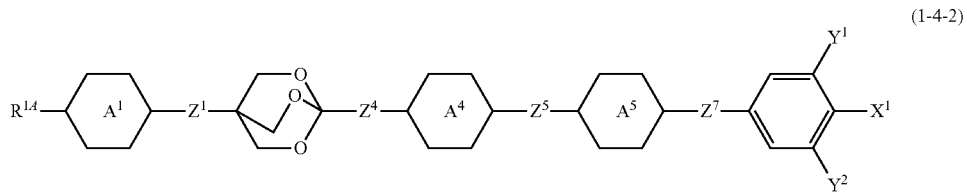

(1-4-3)

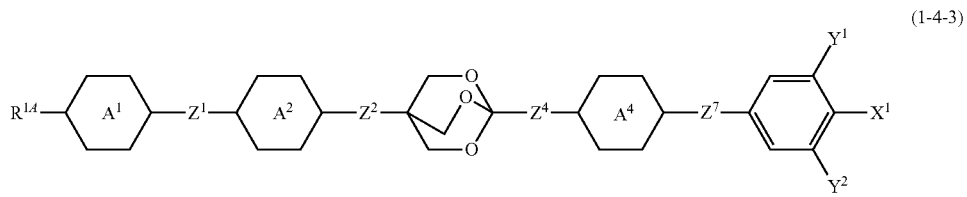

(1-4-4)

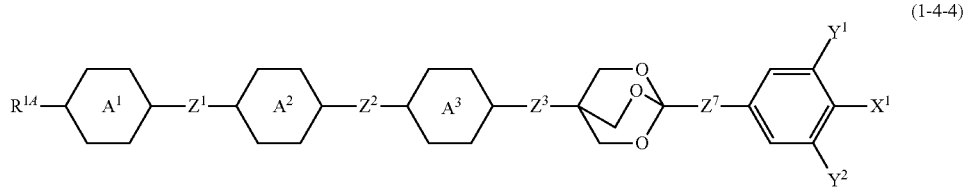

wherein $R^{14}$ is a straight alkyl of $C_{1-10}$; the ring $A^1$, the ring $A^2$, the ring $A^3$, the ring $A^4$, the ring $A^5$ and the ring $A^6$ are independently 1,4-cyclohexylene, 1,4-phenylene, tetrahydropyran-2,5-diyl, 3-fluoro-1,4-phenylene or 3,5-difluoro-1,4-phenylene; $Z^1, Z^2, Z^3, Z^5$, and $Z^7$ are independently a single bond, —($CH_2$)$_2$—, —COO—, —$CF_2O$— or —CH=CH—; $X^1$ is fluorine, —$CF_3$ or —$OCF_3$; $Y^1$ and $Y^2$ are independently hydrogen or fluorine; in formula (1-4-1), at least three of $Z^4, Z^5, Z^6$ and $Z^7$ are single bonds; in formula (1-4-2), at least three of $Z^1, Z^4, Z^5$ and $Z^7$ are single bonds; in formula (1-4-3), at least three of $Z^1, Z^2, Z^4$ and $Z^7$ are single bonds; and in formula (1-4-4), at least three of $Z^1, Z^2, Z^3$ and $Z^7$ are single bonds.

[12] The liquid crystal composition of [1], wherein in formula (1-4-1), arbitrary one of $Z^4, Z^5, Z^6$ and $Z^7$ is —$CF_2O$—; in formula (1-4-2), arbitrary one of $Z^1, Z^4, Z^5$ and $Z^7$ is —$CF_2O$—; in formula (1-4-3), arbitrary one of $Z^1, Z^2, Z^4$ and $Z^7$ is —$CF_2O$—; and in formula (1-4-4), arbitrary one of $Z^1, Z^2, Z^3$ and $Z^7$ is —$CF_2O$—.

[13] The liquid crystal composition of any one of [1] to [12], wherein the ratio of the first component relative to the total weight of the achiral component T is in the range of 0.5 wt % to 50 wt %.

[14] The liquid crystal composition of any one of [1] to [13], wherein the achiral component T further comprises, as a second component thereof, at least one compound selected from the group consisting of compounds represented by formula (2),

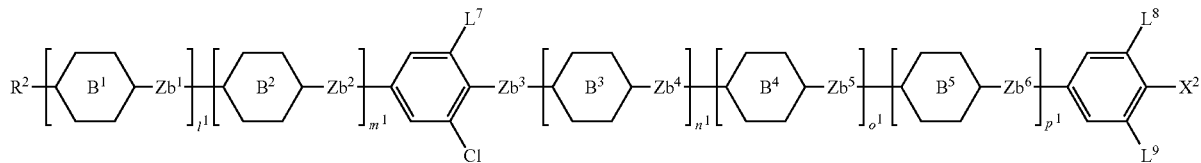

(2)

wherein $R^2$ is hydrogen, or $C_{1-20}$ alkyl in which arbitrary —$CH_2$— is optionally replaced by —O—, —S—, —COO—, —OCO—, —CH=CH—, —CF=CF— or —C≡C—, and in the alkyl or in a group derived by replacing arbitrary —$CH_2$— in the alkyl by —O—, —S—, —COO—, —OCO—, —CH=CH—, —CF=CF— or —C≡C—, arbitrary hydrogen is optionally replaced by halogen; ring $B^1$, ring $B^2$, ring $B^3$, ring $B^4$ and ring $B^5$ are independently 1,4-cyclohexylene, 1,3-dioxane-2,5-diyl, tetrahydropyran-2,5-diyl, 1,4-phenylene, 1,4-phenylene in which one or two hydrogen atoms are replaced by fluorine, 1,4-phenylene in which two hydrogen atoms are replaced by fluorine and chlorine respectively, pyridine-2,5-diyl, or pyrimidine-2,5-diyl; $Zb^1, Zb^2, Zb^3, Zb^4, Zb^5, Zb^6$ are independently a single bond, or $C_{1-4}$ alkylene in which arbitrary —$CH_2$— is optionally replaced by —O—, —COO— or —$CF_2O$—; $L^7, L^8$ and $L^9$ are independently hydrogen or fluorine; $X^2$ is fluorine, chlorine, —$CF_3$ or —$OCF_3$; $l^1, m^1, n^1, o^1$ and $p^1$ are independently 0 or 1, and $2 \le l^1+m^1+n^1+o^1+p^1 \le 3$.

[15] The liquid crystal composition of [14], wherein the second component of the achiral component T comprises at least one compound selected from the group consisting of compounds represented by formulae (2-1-1-2), (2-1-2-1), (2-1-3-1), (2-1-3-2), (2-1-4-2) and (2-1-4-3):

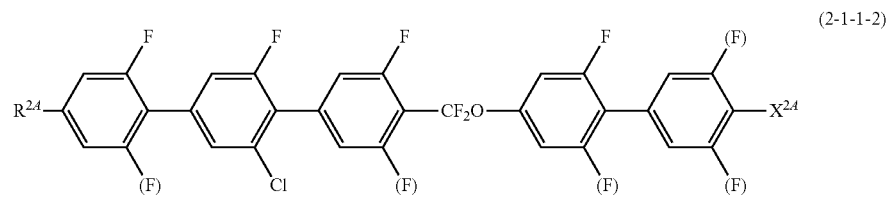

(2-1-1-2)

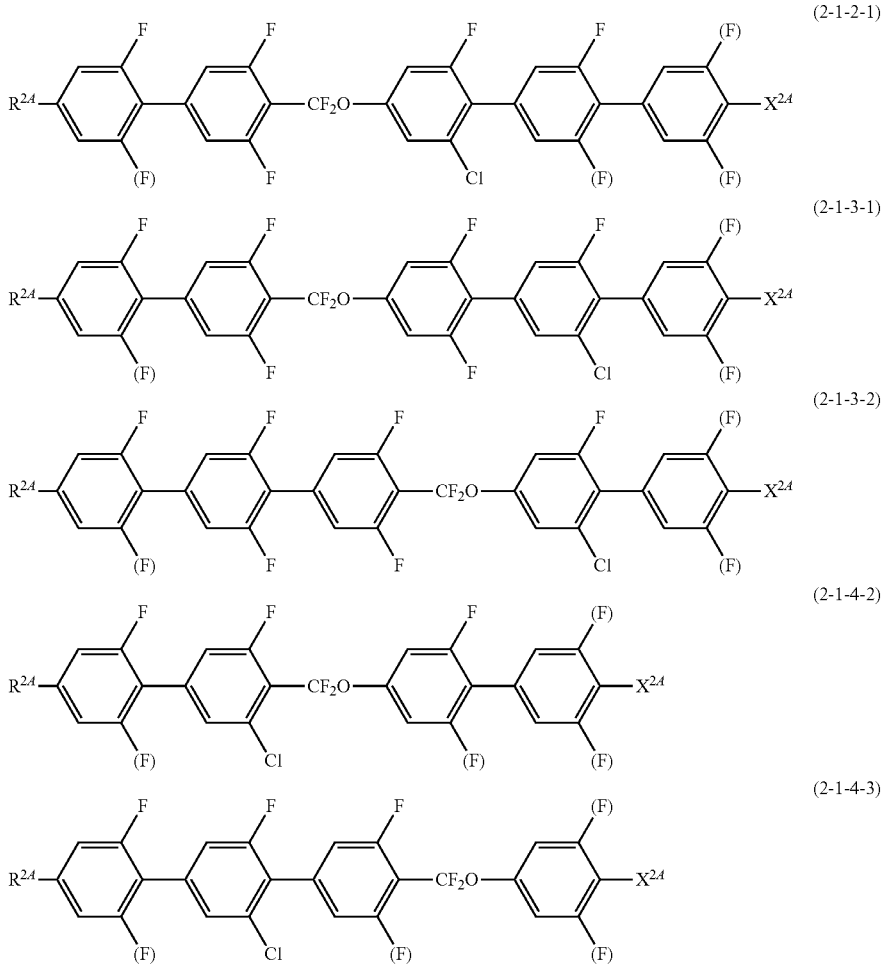

wherein $R^{2A}$ is $C_{1-12}$ alkyl, $C_{1-12}$ alkoxy, $C_{2-12}$ alkenyl, or $C_{2-12}$ alkenyl in which arbitrary hydrogen is replaced by fluorine; each (F) is independently hydrogen or fluorine; and $X^{2A}$ is fluorine, chlorine, —$CF_3$ or —$OCF_3$.

[16] The liquid crystal composition of [14], wherein the second component of the achiral component T comprises at least one compound selected from the group consisting of compounds represented by formulae (2-1-1-2) of [15].

[17] The liquid crystal composition of [14], wherein the second component of the achiral component T comprises at least one compound selected from the group consisting of compounds represented by formulae (2-1-4-3) of [15].

[18] The liquid crystal composition of [14], wherein the second component of the achiral component T comprises a mixture of at least one compound selected from the group consisting of compounds represented by formulae (2-1-1-2) of [15] and at least one compound selected from the group consisting of compounds represented by formulae (2-1-4-3) of [15].

[19] The liquid crystal composition of any one of [14] to [18], wherein the ratio of the second component relative to the total weight of the achiral component T is in the range of 5 wt % to 70 wt %.

[20] The liquid crystal composition of any one of [1] to [19], wherein the achiral component T further comprises, as a third component thereof, at least one compound selected from the group consisting of compounds represented by formula (3),

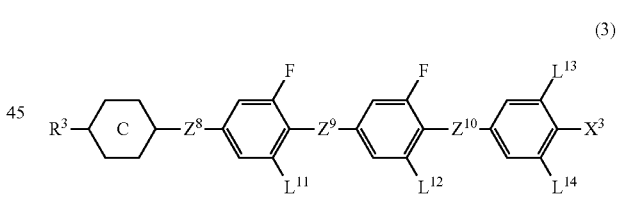

wherein $R^3$ is hydrogen, or $C_{1-20}$ alkyl in which arbitrary —$CH_2$— is optionally replaced by —O—, —S—, —COO—, —OCO—, —CH=CH—, —CF=CF— or —C≡C—, and in the alkyl or in a group derived by replacing arbitrary —$CH_2$— in the alkyl by —O—, —S—, —COO—, —OCO—, —CH=CH—, —CF=CF— or —C≡C—, arbitrary hydrogen is optionally replaced by halogen; ring C is 1,4-phenylene in which one or more hydrogen atoms are replaced by fluorine, tetrahydropyran-2,5-diyl or 1,3-dioxane-2,5-diyl; $Z^8$, $Z^9$ and $Z^{10}$ are independently a single bond, —COO— or —$CF_2$O—, with a proviso that at least one of $Z^8$, $Z^9$ and $Z^{10}$ is —$CF_2$O—; $L^{11}$, $L^{12}$, $L^{13}$ and $L^{14}$ are independently hydrogen or fluorine; $X^3$ is hydrogen, halogen, —$SF_5$, or $C_{1-10}$ alkyl in which arbitrary —$CH_2$— is optionally replaced by —O—, —S—, —COO—, —OCO—, —CH=CH—, —CF=CF— or —C≡C—, and in the alkyl or in a group derived by replacing arbitrary —$CH_2$— in the alkyl by —O—, —S—, —COO—, —OCO—, —CH=CH—, —CF=CF— or —C≡C—, arbitrary hydrogen is optionally replaced by fluorine.

[21] The liquid crystal composition of [20], wherein the third component of the achiral component T comprises at least one compound selected from the group consisting of compounds represented by formulae (3-2) to (3-5):

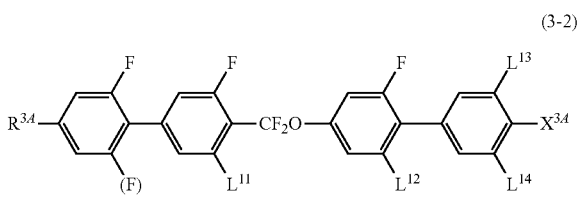
(3-2)

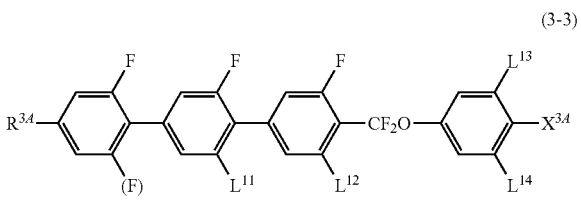
(3-3)

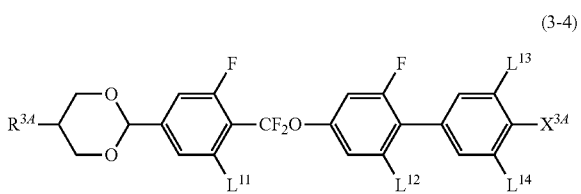
(3-4)

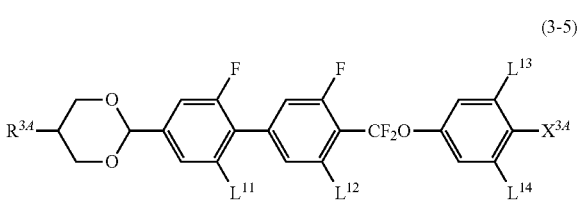
(3-5)

wherein each $R^{3A}$ is independently $C_{1-12}$ alkyl, $C_{1-12}$ alkoxy, $C_{2-12}$ alkenyl, or $C_{2-12}$ alkenyl in which arbitrary hydrogen is replaced by fluorine; $X^{3A}$ is fluorine, chlorine, —$CF_3$ or —$OCF_3$; and $L^{11}$, $L^{12}$, $L^{13}$ and $L^{14}$ are independently hydrogen or fluorine.

[22] The liquid crystal composition of [21], wherein the third component of the achiral component T comprises at least one compound selected from the group consisting of compounds represented by formula (3-2).

[23] The liquid crystal composition of [21], wherein the third component of the achiral component T comprises at least one compound selected from the group consisting of compounds represented by formula (3-3).

[24] The liquid crystal composition of [21], wherein the third component of the achiral component T comprises at least one compound selected from the group consisting of compounds represented by formula (3-4).

[25] The liquid crystal composition of [21], wherein the third component of the achiral component T comprises at least one compound selected from the group consisting of compounds represented by formula (3-5).

[26] The liquid crystal composition of any one of [20] to [25], wherein the ratio of the third component relative to the total weight of the achiral component T is in the range of 5 wt % to 70 wt %.

[27] The liquid crystal composition of any one of [20] to [26], wherein relative to the total weight of the achiral component T, the ratio of the first component is in the range of 1 wt % to 30 wt %, the ratio of the second component is in the range of 10 wt % to 50 wt %, and the ratio of the third component is in the range of 10 wt % to 50 wt %.

[28] The liquid crystal composition of any one of [1] to [27], wherein the achiral component T further comprises, as a fourth component thereof, at least one compound selected from the group consisting of compounds represented by formula (4),

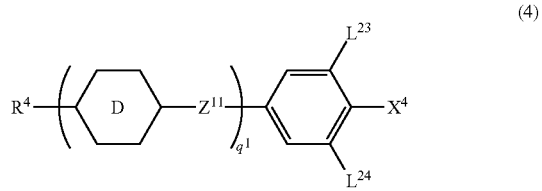
(4)

wherein $R^4$ is $C_{1-12}$ alkyl, $C_{1-12}$ alkoxy, $C_{2-12}$ alkenyl, or $C_{2-12}$ alkenyl in which arbitrary hydrogen is replaced by fluorine; each ring D is independently 1,4-cyclohexylene, 1,3-dioxane-2,5-diyl, tetrahydropyran-2,5-diyl, 1,4-phenylene, 2-fluoro-1,4-phenylene, 3-fluoro-1,4-phenylene, 3,5-difluoro-1,4-phenylene, 3,5-dichloro-1,4-phenylene or pyrimidine-2,5-diyl; each $Z^{11}$ is independently a single bond, ethylene, —COO—, —OCO—, —$CF_2$O— or —$OCF_2$—; $L^{23}$ and $L^{24}$ are independently hydrogen or fluorine; $X^4$ is fluorine, chlorine, —$CF_3$ or —$OCF_3$; $q^1$ is 1, 2, 3 or 4; when $q^1$ is 3 or 4, one $Z^{10}$ is —$CF_2$O— or —$OCF_2$—; and when $q^1$ is 3, each ring D is not 1,3-dioxane-2,5-diyl or tetrahydropyran-2,5-diyl, and the rings D are not simultaneously fluorine-substituted 1,4-phenylene.

[29] The liquid crystal composition of [28], wherein the fourth component of the achiral component T comprises at least one compound selected from the group consisting of compounds represented by formulae (4-1) to (4-7):

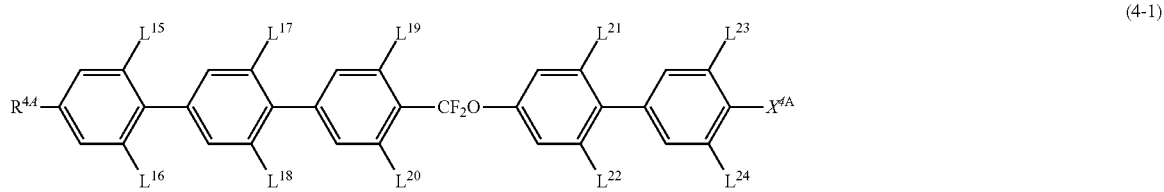
(4-1)

-continued

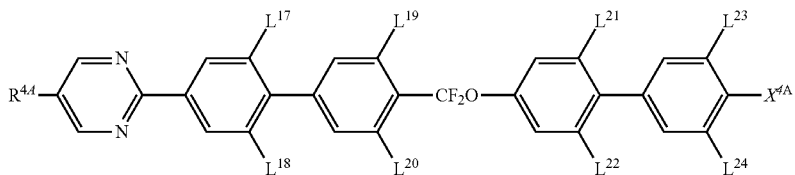

(4-2)

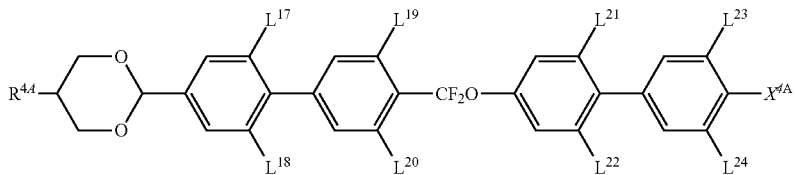

(4-3)

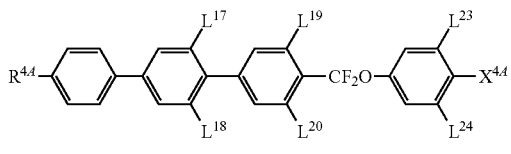

(4-4)

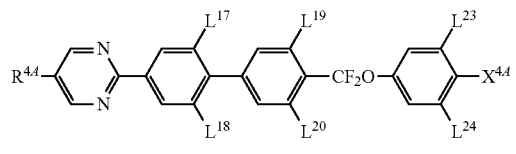

(4-5)

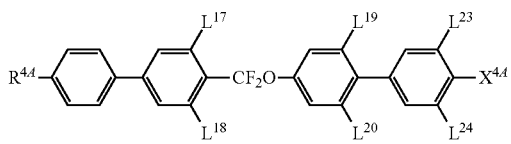

(4-6)

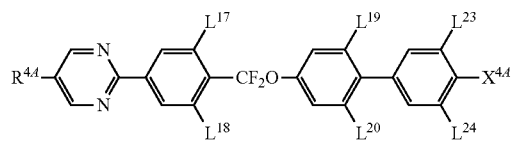

(4-7)

wherein each $R^{4A}$ is independently $C_{1-12}$ alkyl, $C_{1-12}$ alkoxy, $C_{2-12}$ alkenyl, or $C_{2-12}$ alkenyl in which arbitrary hydrogen is replaced by fluorine; $X^{4A}$ is fluorine, chlorine, —$CF_3$ or —$OCF_3$; and $L^{15}$, $L^{16}$, $L^{17}$, $L^{18}$, $L^{19}$, $L^{20}$, $L^{21}$, $L^{22}$, $L^{23}$ and $L^{24}$ are independently hydrogen or fluorine.

[30] The liquid crystal composition of [28] or [29], wherein the ratio of the fourth component relative to the total weight of the achiral component T is in the range of 5 wt % to 40 wt %.

[31] The liquid crystal composition of any one of [1] to [30], wherein the achiral component T further comprises, as a fifth component thereof, at least one compound selected from the group consisting of compounds represented by formula (5), (5)

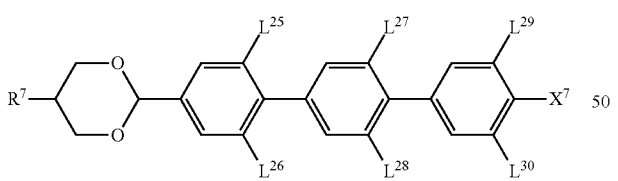

wherein $R^4$ is hydrogen, or $C_{1-20}$ alkyl in which arbitrary —$CH_2$— is optionally replaced by —O—, —S—, —COO—, —OCO—, —CH=CH—, —CF=CF— or —C≡C—, and in the alkyl or in a group derived by replacing arbitrary —$CH_2$— in the alkyl by —O—, —S—, —COO—, —OCO—, —CH=CH—, —CF=CF— or —C≡C—, arbitrary hydrogen is optionally replaced by halogen; $L^{25}$, $L^{26}$, $L^{27}$, $L^{28}$, $L^{29}$ and $L^{30}$ are independently hydrogen or fluorine; and $X^7$ is hydrogen, halogen, —$SF_5$, or $C_{1-10}$ alkyl in which arbitrary —$CH_2$— is optionally replaced by —O—, —S—, —COO—, —OCO—, —CH=CH—, —CF=CF— or —C≡C—, and in the alkyl or in a group derived by replacing arbitrary —$CH_2$— in the alkyl by —O—, —S—, —COO—, —OCO—, —CH=CH—, —CF=CF— or —C≡C—, arbitrary hydrogen is optionally replaced by fluorine.

[32] The liquid crystal composition of [31], wherein the fifth component of the achiral component T comprises at least one compound selected from the group consisting of compounds represented by formulae (5-1) to (5-3):

(5-1)

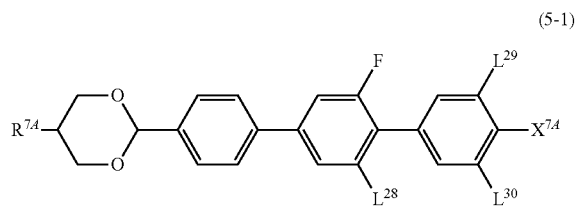

(5-2)

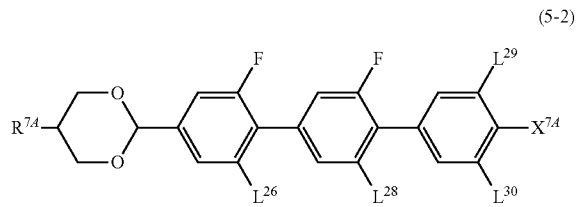

(5-3)

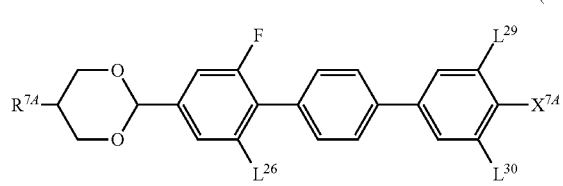

wherein $R^{7A}$ is $C_{1-12}$ alkyl, $C_{1-12}$ alkoxy, $C_{2-12}$ alkenyl, or $C_{2-12}$ alkenyl in which arbitrary hydrogen is replaced by fluorine; $L^{26}$, $L^{28}$, $L^{29}$ and $L^{30}$ are independently hydrogen or fluorine; and $X^{7A}$ is fluorine, chlorine, —$CF_3$ or —$OCF_3$.

[33] The liquid crystal composition of [32], wherein the fifth component of the achiral component T comprises at least one compound selected from the group consisting of compounds represented by formula (5-2).

[34] The liquid crystal composition of [32], wherein the fifth component of the achiral component T comprises at least one compound selected from the group consisting of compounds represented by formulae (5-1-1), (5-1-2), (5-2-1) to (5-2-4), (5-3-1) and (5-3-2), (5-1-1)
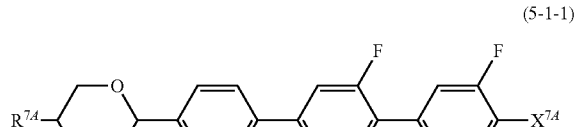

(5-1-2)

(5-2-1)
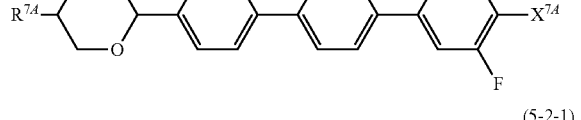

(5-2-2)
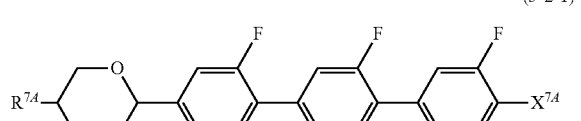

(5-2-3)
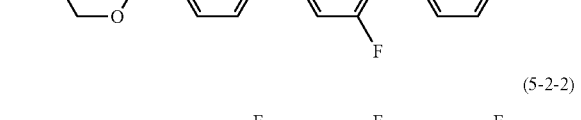

(5-2-4)
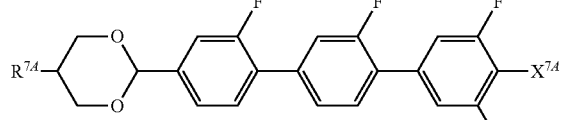

(5-3-1)
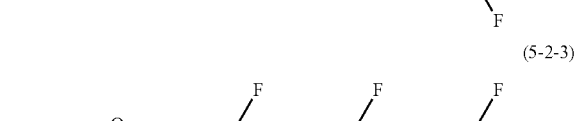

-continued (5-3-2)
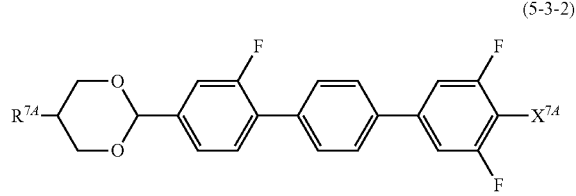

wherein $R^{7A}$ is $C_{1-12}$ alkyl, $C_{1-12}$ alkoxy, $C_{2-12}$ alkenyl, or $C_{2-12}$ alkenyl in which arbitrary hydrogen is replaced by fluorine; and $X^{7A}$ is fluorine, chlorine or —$OCF_3$.

[35] The liquid crystal composition of any one of [31] to [34], wherein the ratio of the fifth component relative to the total weight of the achiral component T is in the range of 1.0 wt % to 30 wt %.

[36] The liquid crystal composition of any one of [1] to [35], wherein the chiral dopant comprises at least one compound selected from the group consisting of compounds represented by formulae (K1)-(K5), (K1)
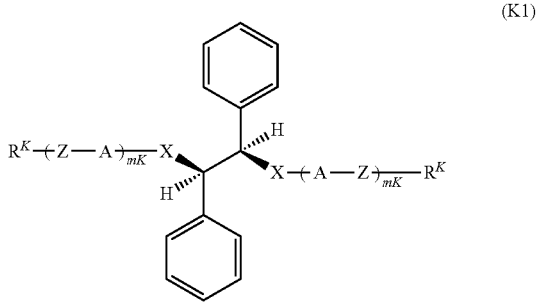

(K2)
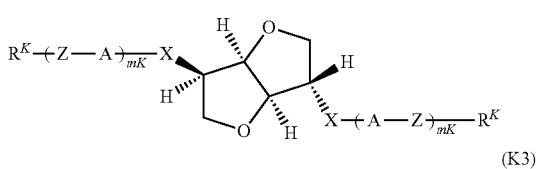

(K3)
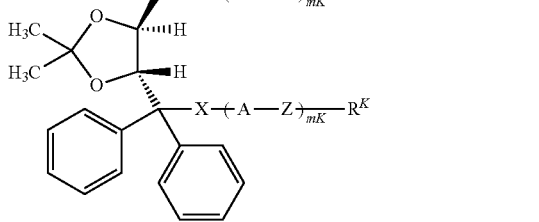

(K4)
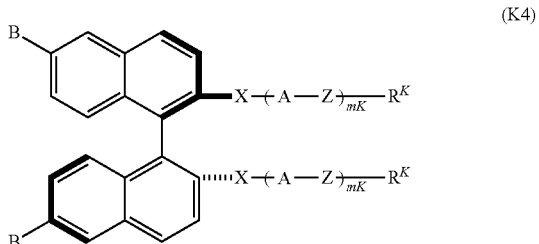

-continued (K5)

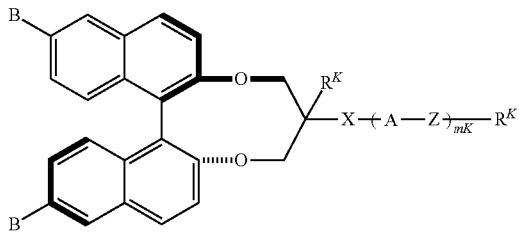

wherein each $R^K$ is independently hydrogen, halogen, —C≡N, —N═C═O, —N═C═S, or $C_{1-20}$ alkyl in which arbitrary —CH$_2$— is optionally replaced by —O—, —S—, —COO— or —OCO—, arbitrary —CH$_2$—CH$_2$— is optionally replaced by —CH═CH—, —CF═CF— or —C≡C—, and arbitrary hydrogen is optionally replaced by halogen; each A is independently an aromatic six- to eight-member ring, a non-aromatic three- to eight-member ring, or a fused ring of 9 or more carbons, and in these rings arbitrary hydrogen is optionally replaced by halogen, $C_{1-3}$ alkyl or $C_{1-3}$ haloalkyl, —CH$_2$— is optionally replaced by —O—, —S— or —NH—, and —CH═ is optionally replaced by —N═; each B is independently hydrogen, halogen, $C_{1-3}$ alkyl, $C_{1-3}$ haloalkyl, an aromatic six- to eight-member ring, a non-aromatic three- to eight-member ring, or a fused ring of 9 or more carbons, and in these rings arbitrary hydrogen is optionally replaced by halogen, $C_{1-3}$ alkyl or $C_{1-3}$ haloalkyl, —CH$_2$— is optionally replaced by —O—, —S— or —NH—, and —CH═ is optionally replaced by —N═; each Z is independently a single bond, or $C_{1-8}$ alkylene in which arbitrary —CH$_2$— is optionally replaced by —O—, —S—, —COO—, —OCO—, —CSO—, —OCS—, —N═N—, —CH═N— or —N═CH—, arbitrary —CH$_2$—CH$_2$— is optionally replaced by —CH═CH—, —CF═CF— or —C≡C—, and arbitrary hydrogen is optionally replaced by halogen; X is a single bond, —COO—, —OCO—, —CH$_2$O—, —OCH$_2$—, —CF$_2$O—, —OCF$_2$— or —CH$_2$CH$_2$—; and mK is an integer of 1-4.

[37] The liquid crystal composition of [36], wherein the chiral dopant comprises at least one compound selected from the group consisting of compounds represented by formulae (K4-1) to (K4-6) and (K5-1) to (K5-3).

(K4-1)

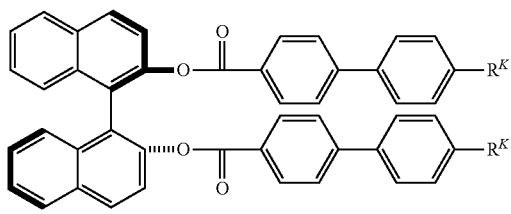

(K4-2)

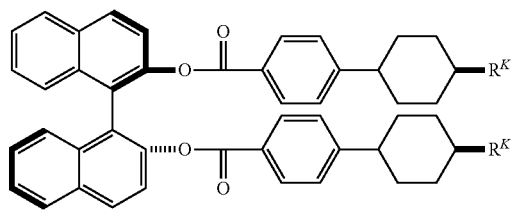

(K4-3)

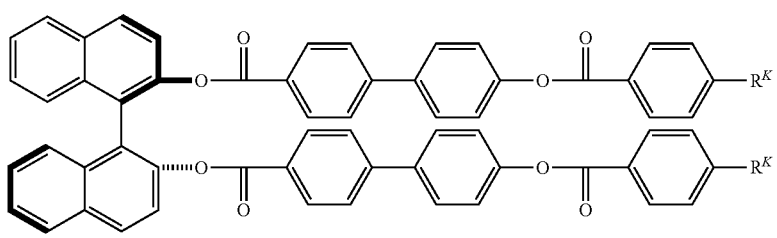

(K4-4)

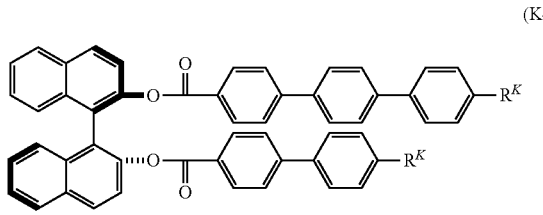

(K4-5)

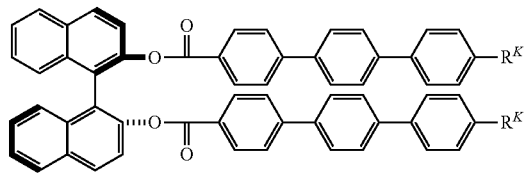

(K4-6)

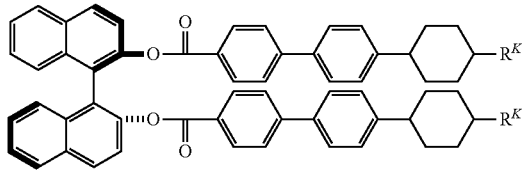

(K5-1)

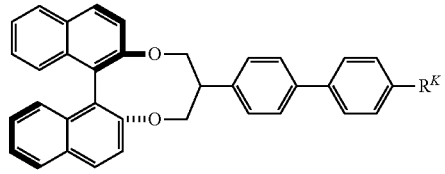

-continued (K5-2)

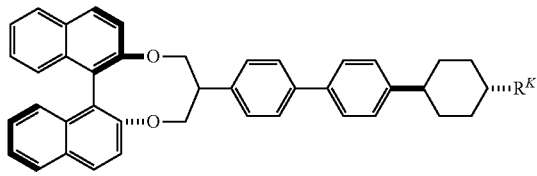

(K5-3)

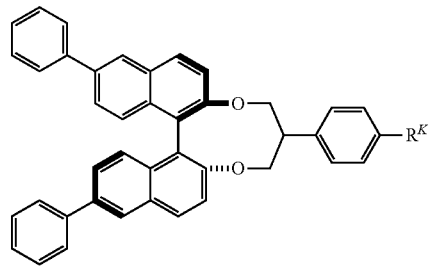

wherein each $R^K$ is independently $C_{3-10}$ alkyl in which the —$CH_2$— adjacent to a ring is optionally replaced by —O—, and in the alkyl or in a group derived by replacing the —$CH_2$— in the alkyl adjacent to the ring by —O—, arbitrary —$CH_2$— is optionally replaced by —C≡C—.

[38] The liquid crystal composition of any one of [1] to [37], wherein the ratio of the chiral dopant relative to the total weight of the liquid crystal composition is in the range of 1 wt % to 40 wt %.

[39] The liquid crystal composition of any one of [1] to [38], which exhibits a chiral nematic phase at any temperature in a range of 70° C. to −20° C. and has a helical pitch of 700 nm or less at a temperature in at least a part of the range of 70° C. to −20° C.

[40] The liquid crystal composition of any one of [1] to [39], further comprising at least one antioxidant, at least one ultraviolet absorbent, or at least one antioxidant and at least one ultraviolet absorbent.

[41] A mixture, comprising the liquid crystal composition of any one of [1] to [40], and a polymerizable monomer.

[42] A polymer/liquid crystal composite material, being obtained by polymerizing the mixture of [41] and used in a device driven in an optically isotropic liquid crystal phase.

[43] The polymer/liquid crystal composite material of [42], wherein the mixture of [41] is polymerized in an isotropic phase or in an optically isotropic liquid crystal phase.

[44] An optical device, comprising: a liquid crystal medium disposed between two substrates with electrodes disposed on a surface of one or both of the substrates, and an electric-field applying means for applying an electric field to the liquid crystal medium via the electrodes, wherein the liquid crystal medium is the liquid crystal composition of any one of [1] to [40], or the polymer/liquid crystal composite material of [42] or [43].

[45] An optical device, comprising: two substrates with a surface of one or both thereof disposed with electrodes thereon and at least one thereof being transparent, a liquid crystal medium disposed between the two substrates, a polarizer disposed on an outer side of the substrates, and an electric-field applying means for applying an electric field to the liquid crystal medium via the electrodes, wherein the liquid crystal medium is the liquid crystal composition of any one of [1] to [40], or the polymer/liquid crystal composite material of [42] or [43].

[46] The optical device of [44] or [45], wherein on at least one of the two substrates, the electrodes are constructed in a manner such that the electric field is applied in at least two directions.

[47] The optical device of [44] or [45], wherein the two substrates are arranged parallel to each other, and on one or both of the two substrates, the electrodes are constructed in a manner such that the electric field is applied in at least two directions.

[48] The optical device of [44] or [45], wherein the electrodes are disposed in a matrix form to form pixel electrodes, and each pixel is provided with an active device being a thin film transistor (TFT).

In this invention, the term "liquid crystal compound" means a compound with a mesogen but is not limited to a compound having a liquid crystal phase. The "liquid crystal medium" is a generic term of a liquid crystal composition and a polymer/liquid crystal composite. Moreover, the term "optical device" refers to various devices using electrooptical effect to achieve light modulation or optical switching, etc., for example, display devices (LCD devices), light modulation devices used in optical communication systems, optical signal processing or various sensor systems. With respect to light modulation that utilizes a change in the refractive index of an optically isotropic liquid crystal medium due to voltage application, the Kerr effect is known. The Kerr effect is an effect that the electric birefringence Δn(E) is proportional to the square of the electric field E, i.e., $\Delta n(E)=K \cdot \lambda \cdot E^2$ (K=Kerr constant, λ=wavelength), for a material exhibiting the Kerr effect. Herein, the "electric birefringence" is the optical anisotropy induced by applying an electric field to the isotropic liquid crystal medium.

The terms in the specification are defined below. "Liquid crystal compound" is a generic term of compounds having a liquid crystal phase, such as nematic phase or smectic phase etc., and compounds having no liquid crystal phase but being useful as a component of a liquid crystal composition. "Achiral component" is the non-optically active compounds among the liquid crystal compounds. A chiral dopant is an optically active compound, which is added to give a desired twisted molecular arrangement to the liquid crystal composition. "LCD device" is a generic term of LCD panels and LCD modules. "Liquid crystal compound", "liquid crystal composition" and "LCD device" are often simply called "compound", "composition" and "device", respectively. Further, e.g., the upper-limit temperature of a liquid crystal phase is the phase transition temperature from the liquid crystal phase to the isotropic phase, and often simply called "clearing point" or "upper-limit temperature". The lower-limit temperature of a liquid crystal phase is often simply called "lower-limit temperature". A compound represented by formula (1) is often just called a compound (1). This rule also applies to a compound represented by formula (2), etc. In formulae (2)-(5), the symbols $A^1$, B and C, etc. surrounded by hexagons respectively correspond to ring $A^1$, ring B and ring C, etc. A compound content expressed by a percentage is a weight percentage (wt %) relative to the total weight of the composition. Numerous identical symbols, such as the rings $A^1, Y^1$ or B, etc., are included in the same or different formulae, but the groups represented by the same symbol can be identical or different from each other.

"Arbitrary" denotes not only arbitrary position but also arbitrary number, except for the case where the number is zero. The expression "arbitrary A may be replaced by B, C or D" not only means arbitrary A may be replaced by B, arbitrary A may be replaced by C or arbitrary A may be replaced by D, but also means that a plurality of A's may be replaced by at least two of B, C and D. For example, the scope of "alkyl in which arbitrary —$CH_2$— may be replaced by —O— and arbitrary —$CH_2$—$CH_2$— may be replaced by —CH=CH—" includes alkyl, alkenyl, alkoxy, alkoxyalkyl, alkoxyalkenyl and alkenyloxyalkyl, etc. Further, in this invention, two contiguous —$CH_2$— being replaced by —O— to form —O—O— is not preferable, so is the terminal —$CH_2$— of alkyl being replaced by —O—. This invention will be further described below. The terminal groups, rings and linking groups, etc. of the compound of formula (1) will also be illustrated by way of preferred examples.

EFFECTS OF THE INVENTION

The liquid crystal composition of this invention is stable to heat and light, etc., exhibits a high upper-limit temperature and a low lower-limit temperature of an optically isotropic liquid crystal phase, and has a low driving voltage in a device driven in an optically isotropic liquid crystal phase. The polymer/liquid crystal composite material of this invention exhibits an optically isotropic liquid crystal phase having a high upper-limit temperature and a low lower-limit temperature, and has a low driving voltage in a device driven in an optically isotropic liquid crystal phase.

The optical device of this invention driven in an optically isotropic liquid crystal phase has a broad temperature range for use, a short response time, a high contrast and a low driving voltage.

Figure 1:
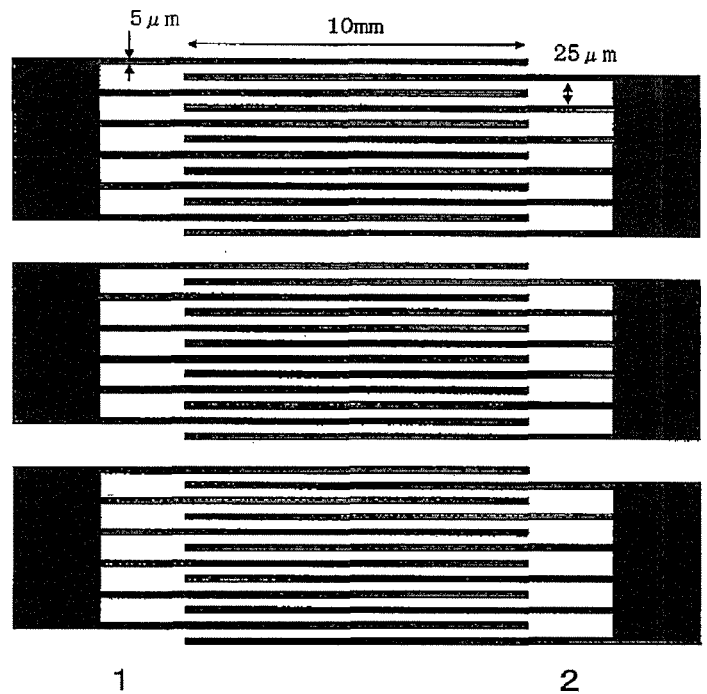
FIG. 1 shows a comb-like electrode substrate used in an embodiment.

DESCRIPTION OF THE EMBODIMENTS 1-1. Compound (1)

The liquid crystal composition exhibiting an optically isotropic liquid crystal phase of this invention includes an achiral component T and a chiral dopant, wherein the achiral component T contains, as a first component thereof, a compound represented by formula (1). A first aspect of this invention is a composition containing the first component, the chiral dopant and other components not specifically mentioned in this specification. The compound of formula (1) is described first.

In formula (1), $R^1$ is $C_{1-10}$ alkyl in which at least one —$CH_2$— is optionally replaced by —O— and at least one —$(CH_2)_2$— is optionally replaced by —CH=CH—.

$R^1$ is alkyl, alkoxy, alkoxyalkyl, alkoxyalkoxy, alkenyl, alkenyloxy, alkenyloxyalkyl or alkoxyalkenyl. In general, a liquid crystal compound having a branched group among these groups has a lower upper-limit temperature and a higher viscosity as compared to the analogue having the corresponding straight group. Hence, among these groups, the straight ones are preferred than the branched ones. The preferred stereo configuration of the —CH=CH— in these alkenyl groups depends on the position of the double bond. The trans-configuration is preferred for alkenyl having a double bond at an odd position, such as —CH=CHCH$_3$, —CH=CHC$_2$H$_5$, —CH=CHC$_3$H$_7$, —CH=CHC$_4$H$_9$, —C$_2$H$_4$CH=CHCH$_3$ and —C$_2$H$_4$CH=CHC$_2$H$_5$. The cis-configuration is preferred for alkenyl having a double bond at an even position, such as —CH$_2$CH=CHCH$_3$, —CH$_2$CH=CHC$_2$H$_5$ and —CH$_2$CH=CHC$_3$H$_7$. An alkenyl compound having a preferred stereo configuration has a high upper-limit temperature or a broad temperature range of liquid crystal phase. This is detailed in *Mol. Cryst. Liq. Cryst.*, 1985, 131, 109 and *Mol. Cryst. Liq. Cryst.*, 1985, 131, 327.

Specific examples of the alkyl include —CH$_3$, —C$_2$H$_5$, —C$_3$H$_7$, —C$_4$H$_9$, —C$_5$H$_{11}$, —C$_6$H$_{13}$, —C$_7$H$_{15}$, —C$_8$H$_{17}$, —C$_9$H$_{19}$ and —C$_{10}$H$_{21}$.

Specific examples of the alkoxy include —OCH$_3$, —OC$_2$H$_5$, —OC$_3$H$_7$, —OC$_4$H$_9$, —OC$_5$H$_{11}$, —OC$_6$H$_{13}$, —OC$_7$H$_{15}$, —OC$_8$H$_{17}$ and —OC$_9$H$_{19}$.

Specific examples of the alkoxyalkyl include —CH$_2$OCH$_3$, —CH$_2$OC$_2$H$_5$, —CH$_2$OC$_3$H$_7$, —(CH$_2$)$_2$—OCH$_3$, —(CH$_2$)$_2$—OC$_2$H$_5$, —(CH$_2$)$_2$—OC$_3$H$_7$, —(CH$_2$)$_3$—OCH$_3$, —(CH$_2$)$_4$—OCH$_3$, and —(CH$_2$)$_5$—OCH$_3$.

Specific examples of the alkenyl include —CH=CH$_2$, —CH=CHCH$_3$, —CH$_2$CH=CH$_2$, —CH=CHC$_2$H$_5$, —CH$_2$CH=CHCH$_3$, —(CH$_2$)$_2$—CH=CH$_2$, —CH=CHC$_3$H$_7$, —CH$_2$CH=CHC$_2$H$_5$, —(CH$_2$)$_2$—CH=CHCH$_3$ and —(CH$_2$)$_3$—CH=CH$_2$.

Specific examples of the alkenyloxy include —OCH$_2$CH=CH$_2$, —OCH$_2$CH=CHCH$_3$ and —OCH$_2$CH=CHC$_2$H$_5$.

$R^1$ is preferably $C_{1-10}$ alkyl. Preferred examples of $R^1$ include —CH$_3$, —C$_2$H$_5$, —C$_3$H$_7$, —C$_4$H$_9$, —C$_5$H$_{11}$, —C$_6$H$_{13}$, —C$_7$H$_{15}$, —C$_8$H$_{17}$, —C$_9$H$_{19}$ and —C$_{10}$H$_{21}$.

In formula (1), the ring $A^1$, the ring $A^2$, the ring $A^3$, the ring $A^4$, the ring $A^5$ and the ring $A^6$ are independently 1,4-cyclohexylene (14-1), 1,4-cyclohexenylene (14-2) (14-3), 1,3-dioxane-2,5-diyl (14-4), tetrahydropyran-2,5-diyl (14-5), pyrimidine-2,5-diyl (14-6), pyridine-2,5-diyl (14-7), 1,4-phenylene (14-8), or 1,4-phenylene in which at least one hydrogen is replaced by halogen. The 1,4-phenylene groups in which at least one hydrogen is replaced by halogen include the groups (14-9) to (14-26) etc., wherein the preferred examples are the groups (14-9) to (14-26).

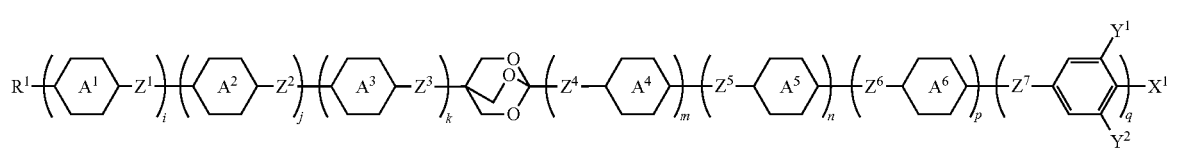

(1)

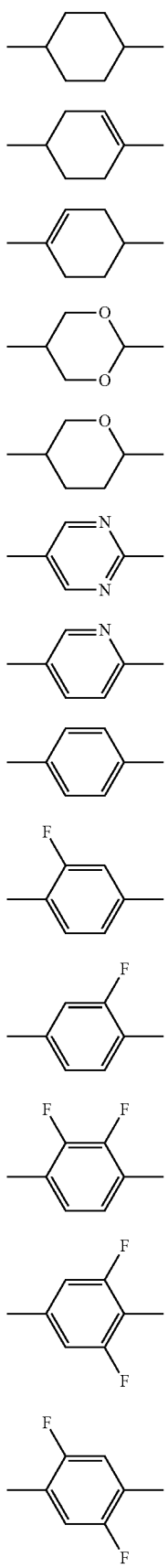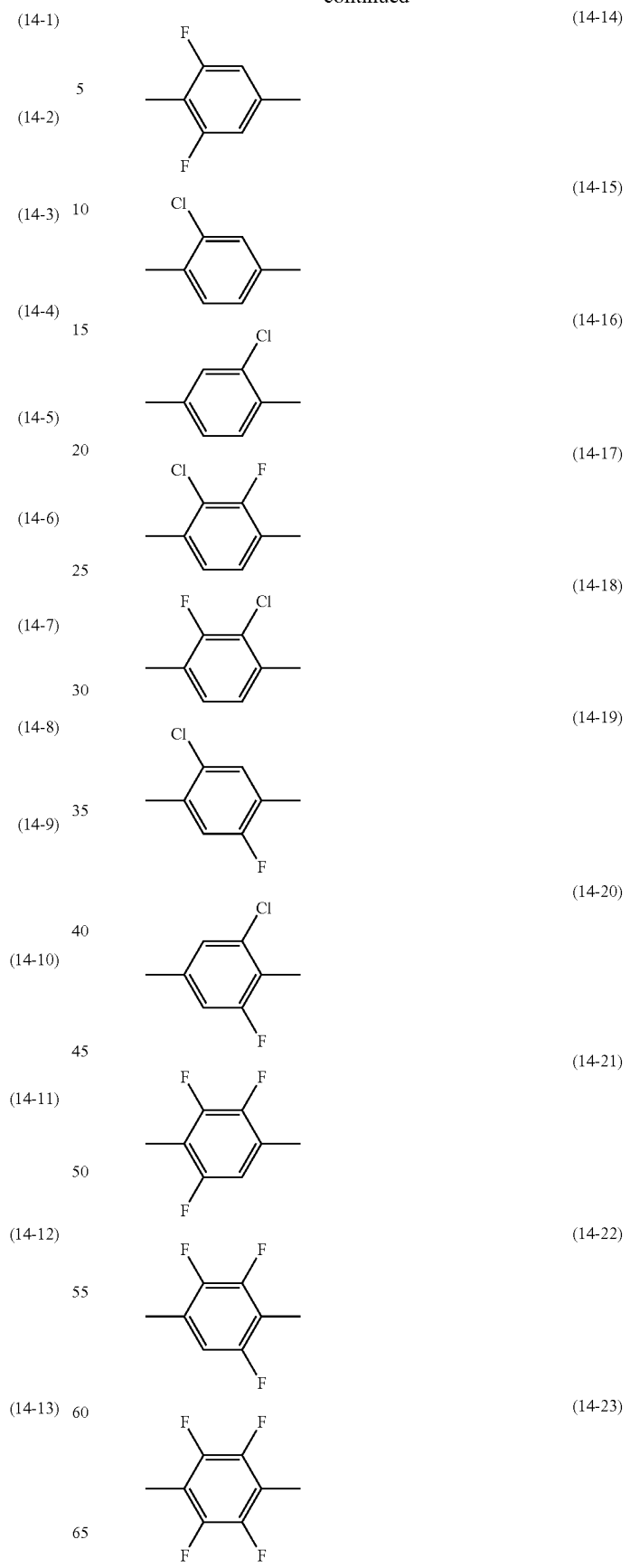

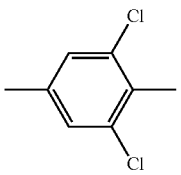

(14-24)

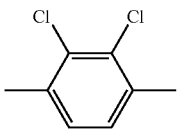

(14-25)

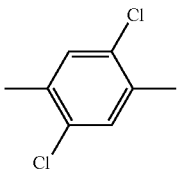

(14-26)

Preferred examples of the ring $A^1$, the ring $A^2$, the ring $A^3$, the ring $A^4$, the ring $A^5$ and the ring $A^6$ include 1,4-cyclohexylene (14-1), 1,4-cyclohexenylene (14-2) (14-3), 1,4-phenylene (14-8), 2-fluoro-1,4-phenylene (14-10), 3,5-difluoro-1,4-phenylene (14-12), 2,5-difluoro-1,4-phenylene (14-13), tetrahydropyran-2,5-diyl (14-5) and 3-chloro-5-fluoro-1,4-phenylene (14-20).

More preferred examples of the ring $A^1$, the ring $A^2$, the ring $A^3$, the ring $A^4$, the ring $A^5$ and the ring $A^6$ include 1,4-cyclohexylene (14-1), 1,4-phenylene (14-8), 2-fluoro-1,4-phenylene (14-10), 3,5-difluoro-1,4-phenylene (14-12) and 2,5-difluoro-1,4-phenylene (14-13).

In formula (1), $Z^1, Z^2, Z^3, Z^4, Z^5, Z^6$ and $Z^7$ are independently a single bond, —$(CH_2)_2$—, —COO—, —OCO—, —$CF_2O$—, —$OCF_2$— or —CH=CH—.

Preferred examples of $Z^1, Z^2, Z^3, Z^4, Z^5, Z^6$ and $Z^7$ include a single bond, —$(CH_2)_2$—, —COO—, —$CF_2O$— or —CH=CH—. Among the bondings, the stereo configuration of the double bound of a linking group such as —CH=CH— in the trans-form is superior to that in the cis-form. More preferred $Z^1, Z^2, Z^3, Z^4, Z^5, Z^6$ and $Z^7$ include a single bond, —$(CH_2)_2$—, —COO— and —$CF_2O$—.

In formula (1), $X^1$ is fluorine, —$CF_3$ or —$OCF_3$.

In formula (1), $Y^1$ and $Y^2$ are independently hydrogen or fluorine.

In formula (1), i, j, k, m, n, p and q are independently 0 or 1, and i+j+k+m+n+p+q is 1, 2, 3 or 4.

More preferably, i+j+k+m+n+p+q is 2, 3 or 4. Moreover, it is particularly preferred that q is 1.

The compound (1) in this invention is further detailed below. The compound has very stable physical and chemical properties under the conditions where the device is usually used, and has a good compatibility with other liquid crystal compounds. A composition containing such compound is stable under the conditions where the device is usually used. Even if the composition is maintained at a low temperature, the compound does not separate as crystals (or a smectic phase). The compound has general physical properties essential to a compound, an appropriate optical anisotropy and an appropriate dielectric anisotropy. Moreover, the compound (1) has a large positive dielectric anisotropy. A compound having a large dielectric anisotropy is useful as a component for lowering the driving voltage of an optically isotropic liquid crystal composition.

For the compound (1), by suitably selecting the combination of $R^1$, the ring $A^1$, the ring $A^2$, the ring $A^3$, the ring $A^4$, the ring $A^5$, the ring $A^6$, $Z^1, Z^2, Z^3, Z^4, Z^5, Z^6, Z^7, X^1, Y^1, Y^2$, i, j, k, m, n, p and q, the physical properties of the achiral component T, such as the clearing point, optical anisotropy and dielectric anisotropy, etc., can be adjusted as required. The effects of these variables to the physical properties of the compound (1) are described below.

In the cases of the combinations with i+j+k+m+n+p+q=1, the compatibility with other compounds is particularly good, and the upper-limit temperature of nematic phase is low. In the cases of the combinations with i+j+k+m+n+p+q=2, the compatibility with other compounds is good, and the temperature range of liquid crystal phase is broad. In the cases of the combinations with i+j+k+m+n+p+q=3 or 4, the clearing point is high, and a compound having a very large dielectric anisotropy can be obtained by suitably selecting the species of the rings and the linking groups.

When the ring $A^1$, the ring $A^2$, the ring $A^3$, the ring $A^4$, the ring $A^5$ and the ring $A^6$ are all 1,4-cyclohexylene, the clearing point is high, and the viscosity is low. When at least one of the ring $A^1$, the ring $A^2$, the ring $A^3$, the ring $A^4$, the ring $A^5$ and the ring $A^6$ is 1,4-phenylene, the optical anisotropy is relatively large, and the orientational order parameter is relatively large. Moreover, when the ring $A^1$, the ring $A^2$, the ring $A^3$, the ring $A^4$, the ring $A^5$ and the ring $A^6$ are all 1,4-phenylene, the optical anisotropy is particularly large. Moreover, when the ring $A^1$, the ring $A^2$, the ring $A^3$, the ring $A^4$, the ring $A^5$ or the ring $A^6$ is halogen-substituted 1,4-phenylene as expressed by the groups (14-10), (14-12) or (14-20), the dielectric anisotropy is lager. When at least one of the ring $A^1$, the ring $A^2$, the ring $A^3$, the ring $A^4$, the ring $A^5$ and the ring $A^6$ is the group (14-4) or (14-6), the dielectric anisotropy is lager. When at least one of the ring $A^1$, the ring $A^2$, the ring $A^3$, the ring $A^4$, the ring $A^5$ and the ring $A^6$ is the group (14-5), the compatibility with other compounds is good.

When $Z^1, Z^2, Z^3, Z^4, Z^5, Z^6$ or $Z^7$ is a single bond, —$CH_2$—$CH_2$—, —CH=CH—, —$CF_2O$— or —$OCF_2$—, the viscosity is low. When Z, $Z^2, Z^3, Z^4, Z^5, Z^6$ or $Z^7$ is —CH=CH—, the temperature range of the liquid crystal phase is broad, and the elastic constant ratio $K_{33}/K_{11}$ ($K_{33}$: bend elastic constant; $K_{11}$: splay elastic constant) is large. When $Z^1, Z^2, Z^3, Z^4, Z^5, Z^6$ or $Z^7$ is a single bond, —$(CH_2)_2$—, —COO—, —OCO—, —$CF_2O$— or —$OCF_2$—, the compound is relatively stable chemically and relatively difficult to degrade. When $Z^1, Z^2, Z^3, Z^4, Z^5, Z^6$ or $Z^7$ is —COO— or —OCO—, the upper-limit temperature of the nematic phase is high.

When $X^1$ is fluorine, the dielectric anisotropy is large, and the viscosity is low. When $X^1$ is —$CF_3$, the dielectric anisotropy is particularly large. When $X^1$ is —$OCF_3$, the dielectric anisotropy is large, and the compatibility with other compounds is good.

By suitably selecting the species of the rings $A^1$ to $A^6$ and the linking groups $Z^1$ to $Z^7$ etc. as above, a compound with target physical properties can be obtained.

The preferred compounds among the compounds of formula (1) are expressed by formulae (1-1-1), (1-2-1), (1-2-2), (1-3-1) to (1-3-3) and (1-4-1) to (1-4-4).

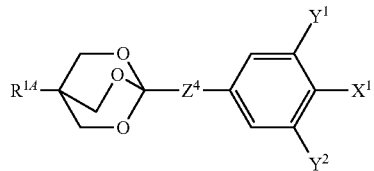
(1-1-1)
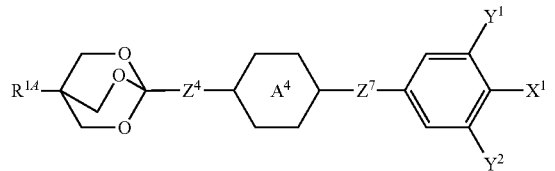
(1-2-1)
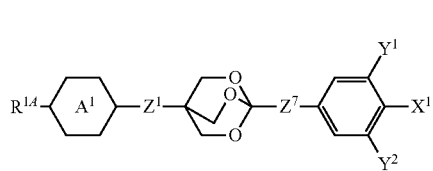
(1-2-2)
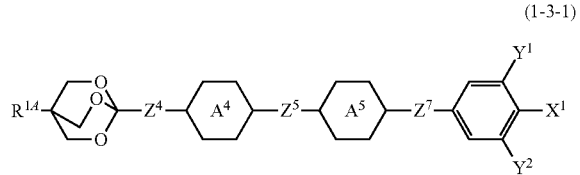
(1-3-1)
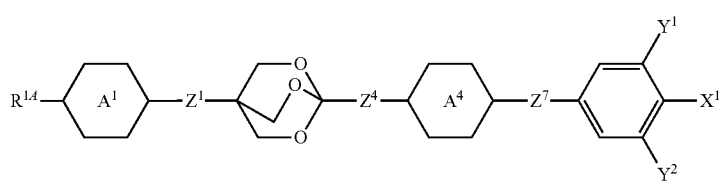
(1-3-2)
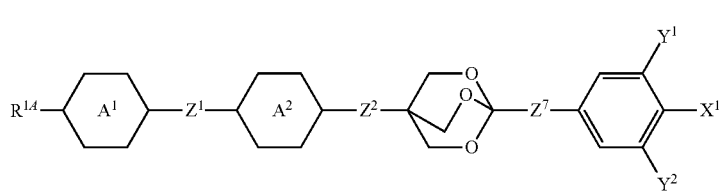
(1-3-3)
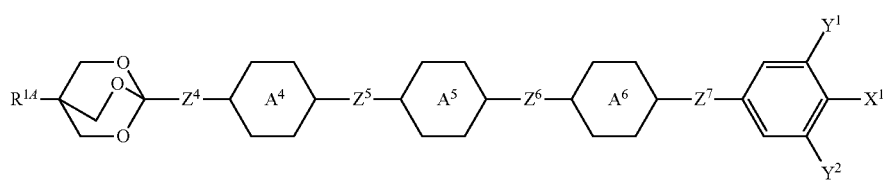
(1-4-1)
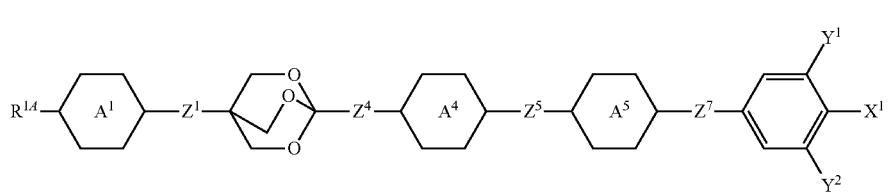
(1-4-2)
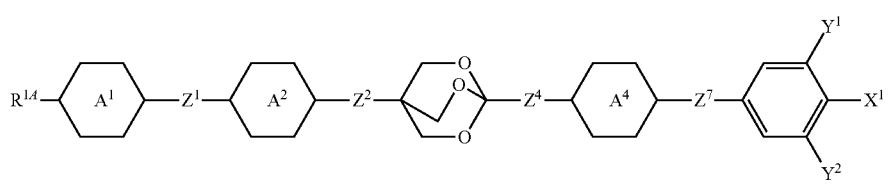
(1-4-3)
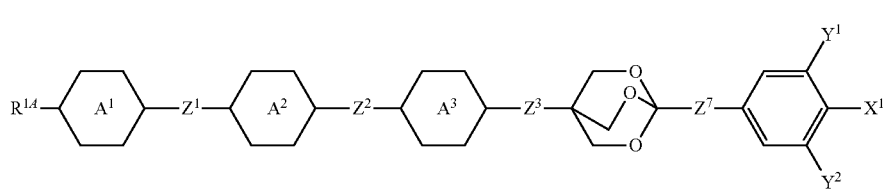
(1-4-4)

In these formulae, $R^{14}$ is a straight alkyl of $C_{1\text{-}10}$. The ring $A^1$, the ring $A^2$, the ring $A^3$, the ring $A^4$, the ring $A^5$ and the ring $A^6$ are independently 1,4-cyclohexylene, 1,4-phenylene, 3-fluoro-1,4-phenylene or 3,5-difluoro-1,4-phenylene. $Z^1$, $Z^4$ and $Z^7$ are independently a single bond, —$(CH_2)_2$—, —COO—, —$CF_2O$— or —CH=CH—. $X^1$ is fluorine, —$CF_3$ or —$OCF_3$—. $Y^1$ and $Y^2$ are independently hydrogen or fluorine.

In formula (1-2-1), at least one of $Z^4$ and $Z^7$ is a single bond. In formula (1-2-2), at least one of $Z^1$ and $Z^7$ is a single bond. In formula (1-3-1), at least two of $Z^4$, $Z^5$ and $Z^7$ are single bonds. In formula (1-3-2), at least two of $Z^1$, $Z^4$ and $Z^7$ are single bonds. In formula (1-3-3), at least two of $Z^1$, $Z^2$ and $Z^7$ are single bonds. In formula (1-4-1), at least three of $Z^4$, $Z^5$, $Z^6$ and $Z^7$ are single bonds. In formula (1-4-2), at least three of $Z^1$, $Z^4$, $Z^5$ and $Z^7$ are single bonds. In formula (1-4-3), at least three of $Z^1$, $Z^2$, $Z^4$ and $Z^7$ are single bonds. In formula (1-4-4), at least three of $Z^1$, $Z^2$, $Z^3$ and $Z^7$ are single bonds.

Among the compounds of formulae (1-1) to (1-4), those of formulae (1-1) to (1-3) are preferred, and those of formulae (1-1-1), (1-1-2), (1-2-1) to (1-2-4), (1-3-1) and (1-3-2) are more preferred. Among them, the compounds of formulae (1-2-1), (1-2-2) and (1-3-2) are even more preferred.

The compound (1) used in this invention has a relatively good compatibility with other liquid crystal compounds, in spite of having a high clearing point. Therefore, the composition has a larger temperature range of optically isotropic liquid crystal phase, and can be used in a display device in a broad temperature range. Moreover, the compound is useful as a component for lowering the driving voltage of a composition driven in an optically isotropic liquid crystal phase.

1-2. Synthesis of Compound (1)

The synthesis of the compound (1) is described below. A compound (1) can be synthesized by a suitable combination of organic synthesis methods. The methods for introducing target terminal groups, rings and linking groups in the starting compound are described in, for example, *Organic Syntheses* (John Wiley & Sons, Inc.), *Organic Reactions* (John Wiley & Sons, Inc.), *Comprehensive Organic Synthesis* (Pergamon Press), and New Lecture on Experimental Chemistry (Maruzen).

For example, it is possible to use the method of Japanese Patent No. 2959526 to synthesize a compound of formula (1) of this invention.

2-1. Compound (2)

The 2$^{nd}$ aspect of this invention is a liquid crystal composition that contains the first component, the chiral dopant, and, as a second component, at least one compound selected from the group consisting of compounds expressed by formula (2), which is described as follow.

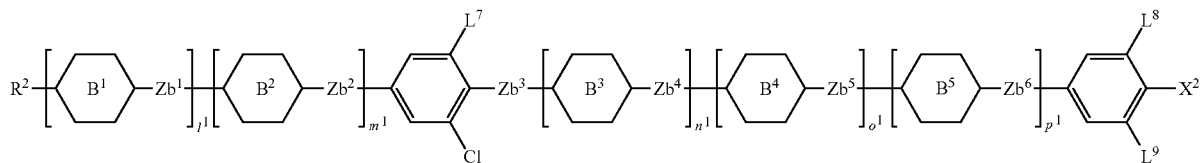

(2)

Herein, $R^2$ is hydrogen, or $C_{1\text{-}20}$ alkyl in which arbitrary —$CH_2$— is optionally replaced by —O—, —S—, —COO—, —OCO—, —CH=CH—, —CF=CF— or —C≡C—, and in the alkyl or in a group derived by replacing arbitrary —$CH_2$— in the alkyl by —O—, —S—, —COO—, —OCO—, —CH=CH—, —CF=CF— or —C≡C—, arbitrary hydrogen is optionally replaced by halogen. The ring $B^1$, the ring $B^2$, the ring $B^3$, the ring $B^4$ and the ring $B^5$ are independently 1,4-cyclohexylene, 1,3-dioxane-2,5-diyl, tetrahydropyran-2,5-diyl, 1,4-phenylene, 1,4-phenylene in which one or two hydrogen atoms are replaced by fluorine, 1,4-phenylene in which two hydrogen atoms are replaced by fluorine and chlorine respectively, pyridine-2,5-diyl, or pyrimidine-2,5-diyl. $Zb^1$, $Zb^2$, $Zb^3$, $Zb^4$, $Zb^5$ and $Zb^6$ are independently a single bond, or $C_{1\text{-}4}$ alkylene in which arbitrary —$CH_2$— is optionally replaced by —O—, —COO— or —$CF_2O$—. $L^7$, $L^8$ and $L^9$ are independently hydrogen or fluorine. $X^2$ is fluorine, chlorine, —$CF_3$ or —$OCF_3$. In addition, $l^1$, $m^1$, $n^1$, $o^1$ and $p^1$ are independently 0 or 1, and $2 \le l^1 + m + n^1 + o^1 + p^1 \le 3$.

$R^2$ is $C_{1\text{-}12}$ alkyl, $C_{1\text{-}12}$ alkoxy, $C_{2\text{-}12}$ alkenyl, or $C_{2\text{-}12}$ alkenyl in which arbitrary hydrogen is replaced by fluorine.

In consideration of the stability or dielectric anisotropy of the compound, the ring $B^1$, the ring $B^2$, the ring $B^3$, the ring $B^4$ and the ring $B^5$ are preferably 1,4-phenylene, or 1,4-phenylene in which one or two hydrogen atoms are replaced by fluorine.

$Zb^1$, $Zb^2$, $Zb^3$, $Zb^4$, $Zb^5$ and $Zb^6$ are independently a single bond, or $C_{1\text{-}4}$ alkylene in which arbitrary —$CH_2$— is optionally replaced by —O—, —COO— or —$CF_2O$—. It is preferred that $Zb^1$, $Zb^2$, $Zb^3$, $Zb^4$, $Zb^5$ and $Zb^6$ are all single bonds, or at least one of them is —COO— or —$CF_2O$—. When the compatibility with other liquid crystal compounds is considered important, it is preferred that at least one of them is —$CF_2O$—. It is particularly preferred that $n^1=1$ and $Zb^4$ is —$CF_2O$—.

$X^2$ is fluorine, chlorine, —$CF_3$, —$CHF_2$, —$CH_2F$, —$OCF_3$, —$OCHF_2$, —$OCH_2F$, —$OCF_2CFHCF_3$ or —CH=CHCF$_3$, wherein fluorine, chlorine, —$CF_3$ and —$OCF_3$ are preferred.

The preferred compounds among the compounds of formula (2) are expressed by formula (2-1)

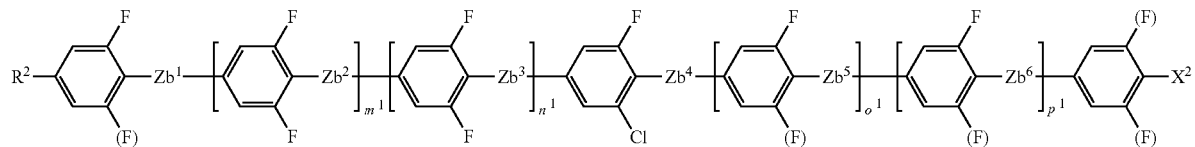

(2-1)

In formula (2-1), $R^2$, $Zb^1$ to $Zb^6$, $m^1$, $n^1$, $o^1$, $p^1$ and $X^2$ are defined as in the case of formula (2), $1 \leq m^1+n^1+o^1+p^1 \leq 2$, and each (F) is independently hydrogen or fluorine. $R^2$ is $C_{1-12}$ alkyl, $C_{1-12}$ alkoxy, $C_{2-12}$ alkenyl, or $C_{2-12}$ alkenyl in which arbitrary hydrogen is replaced by fluorine. $X^2$ is fluorine, chlorine, —$CF_3$ or —$OCF_3$.

The preferred stereo configuration of the —CH=CH— in alkenyl depends on the position of the double bond. The trans-configuration is preferred for alkenyl having a double bond at an odd position, such as —CH=CHCH$_3$, —CH=CHC$_2$H$_5$, —CH=CHC$_3$H$_7$, —CH=CHC$_4$H$_9$, —C$_2$H$_4$CH=CHCH$_3$ and —C$_2$H$_4$CH=CHC$_2$H$_5$. The cis-configuration is preferred for alkenyl having a double bond at an even position, such as —CH$_2$CH=CHCH$_3$, —CH$_2$CH=CHC$_2$H$_5$ and —CH$_2$CH=CHC$_3$H$_7$. An alkenyl compound having a preferred stereo configuration has a high upper-limit temperature or a broad temperature range of liquid crystal phase. This is detailed in *Mol. Cryst. Liq. Cryst.*, 1985, 131, 109 and *Mol. Cryst. Liq. Cryst.*, 1985, 131, 327.

$Zb^1$, $Zb^2$, $Zb^3$, $Zb^4$, $Zb^5$ and $Zb^6$ are independently a single bond or —CF$_2$O—. When the compatibility with other liquid crystal compounds is considered important, it is preferred that at least one of $Zb^1$, $Zb^2$, $Zb^3$, $Zb^4$, $Zb^5$ and $Zb^6$ is —CF$_2$O—. It is particularly preferred that $n^1=1$ and $Zb^4$ is —CF$_2$O—.

The preferred compounds among the compounds of formula (2-1) are expressed by formulae (2-1-1) to (2-1-5).

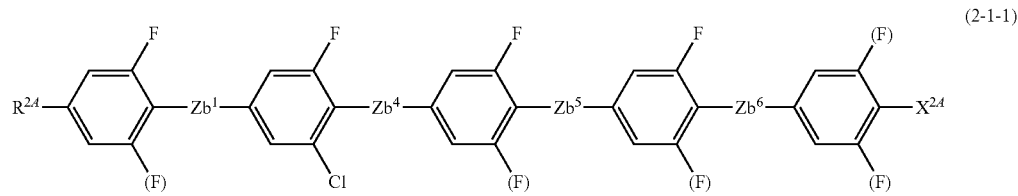

(2-1-1)

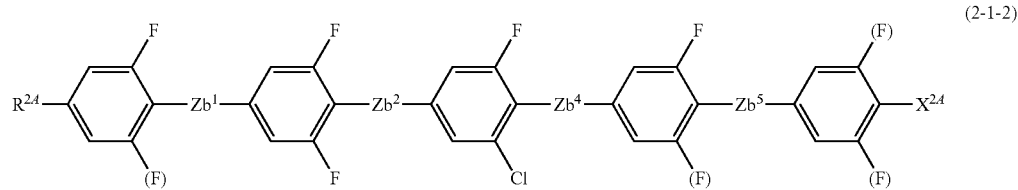

(2-1-2)

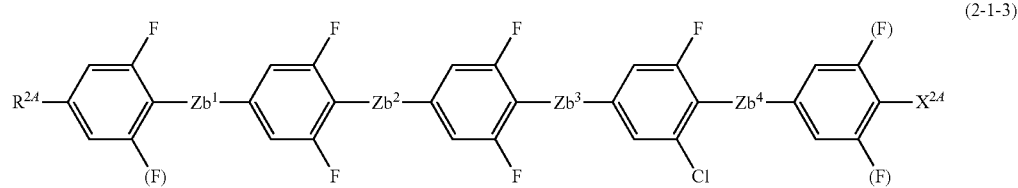

(2-1-3)

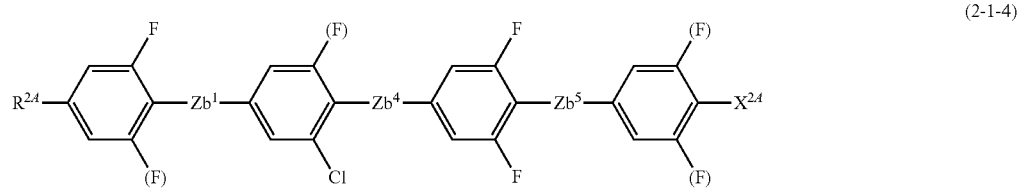

(2-1-4)

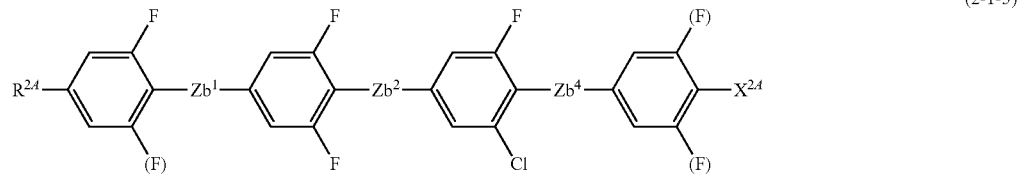

(2-1-5)

Herein, $Zb^1$ to $Zb^6$ are defined as above.

$R^{2A}$ is $C_{1-12}$ alkyl, $C_{1-12}$ alkoxy, $C_{2-12}$ alkenyl, or $C_{2-12}$ alkenyl in which arbitrary hydrogen is replaced by fluorine. Each (F) is independently hydrogen or fluorine. $X^{2A}$ is fluorine, chlorine, —$CF_3$ or —$OCF_3$.

Among the compounds of formulae (2-1-1) to (2-1-5), those of the following formulae (2-1-1-1) to (2-1-1-3), (2-1-2-1) to (2-1-2-3), (2-1-3-1) to (2-1-3-3), (2-1-4-1) to (2-1-4-3) and (2-1-5-1) to (2-1-5-3) are preferred, wherein those of formulae (2-1-1-1), (2-1-1-2), (2-1-2-1), (2-1-2-2), (2-1-3-1), (2-1-3-2), (2-1-4-2), (2-1-4-3) and (2-1-5-3) are more preferred.

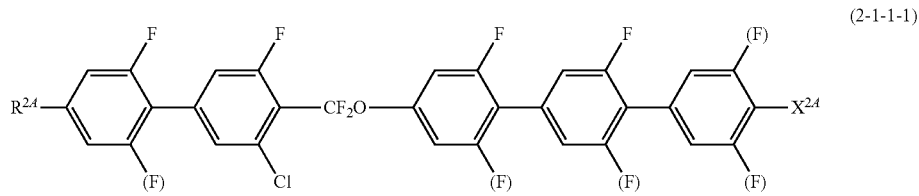

(2-1-1-1)

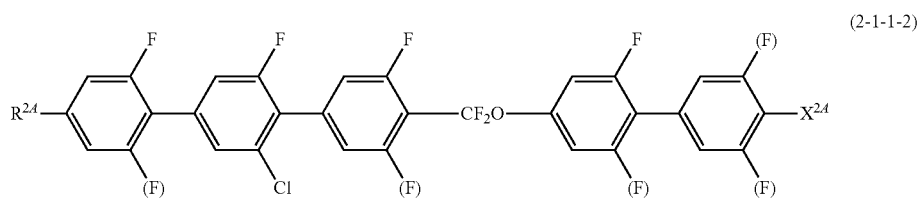

(2-1-1-2)

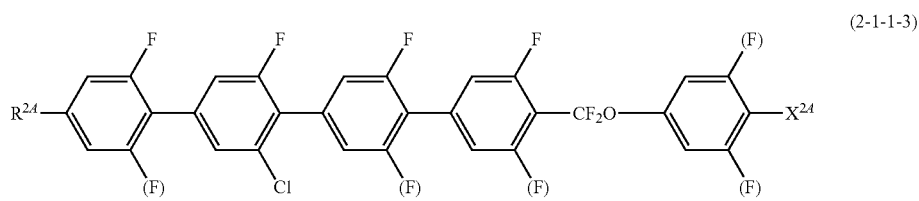

(2-1-1-3)

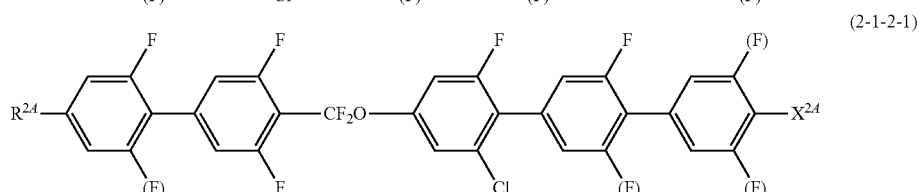

(2-1-2-1)

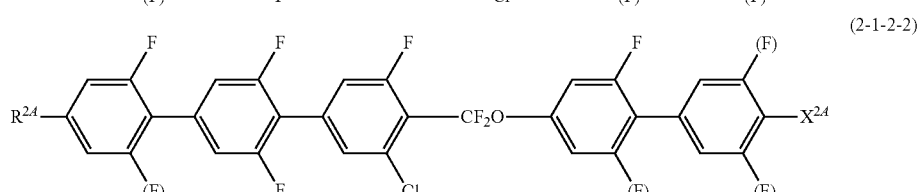

(2-1-2-2)

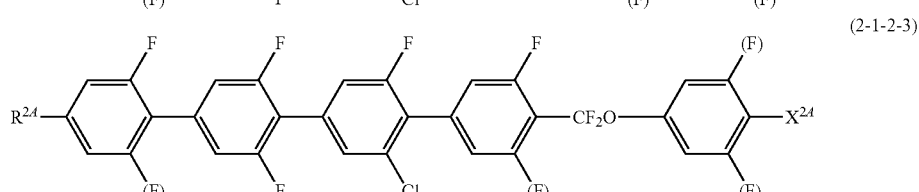

(2-1-2-3)

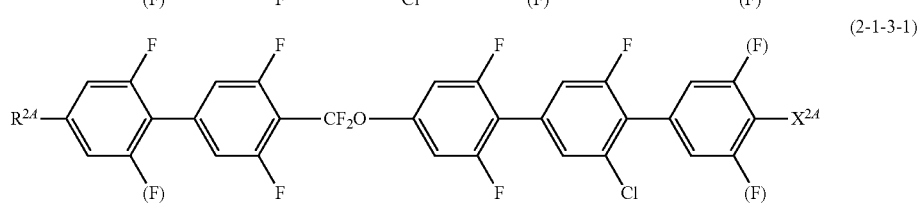

(2-1-3-1)

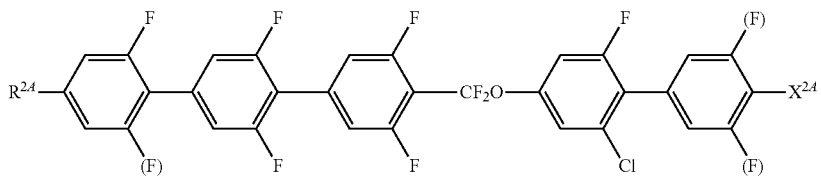

(2-1-3-2)

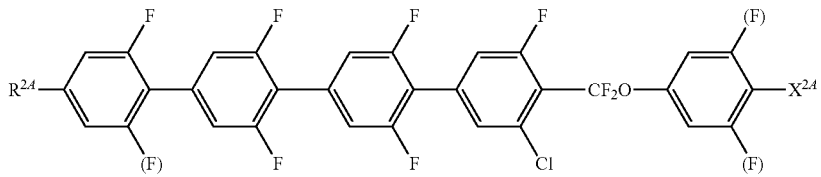

(2-1-3-3)

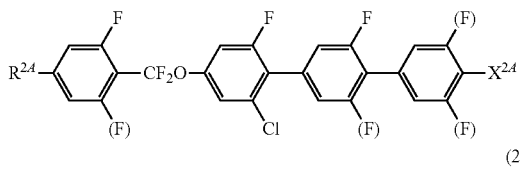

(2-1-4-1)

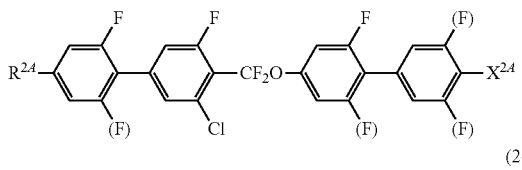

(2-1-4-2)

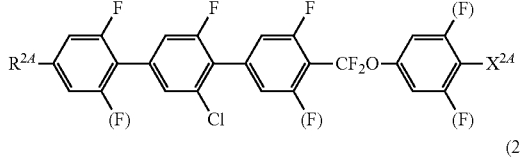

(2-1-4-3)

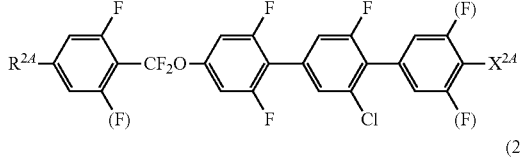

(2-1-5-1)

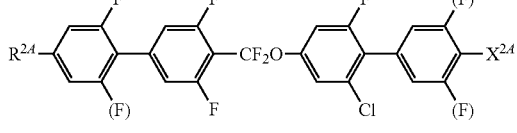

(2-1-5-2)

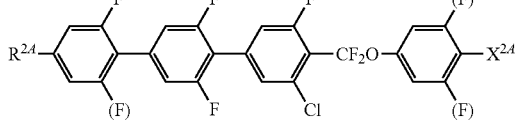

(2-1-5-3)

In these formulae, $R^{2A}$, (F) and $X^{2A}$ are defined as in the case of the above formulae (2-1-1) to (2-1-5).

2-2. Properties of Compound (2-1)

The compound (2-1) used in this invention is further detailed below. A compound (2-1) is a liquid crystal compound having a chlorobenzene ring. This compound has very stable physical and chemical properties under the conditions where the device is usually used, and has good compatibility with other liquid crystal compounds. Further, a smectic phase is difficult to exhibit. A composition containing such a compound is stable under the conditions where the device is usually used. Hence, the composition has a larger temperature range of a cholesteric phase, and thus can be used in a display device in a broad temperature range. Moreover, since the compound has large dielectric anisotropy and optical anisotropy, it is useful as a component for lowering the driving voltage of a composition driven in a cholesteric phase and for raising the reflectivity.

For the compound (2-1), by suitably selecting the combination of $m^1$, $n^1$, $o^1$ and $p^1$, the left terminal group $R^2$, the groups on the most right benzene ring and their substitution positions [(F) and $X^2$], or the species of the linking groups $Zb^1$ to $Zb^6$, the physical properties such as clearing point, optical anisotropy and dielectric anisotropy, etc., can be adjusted arbitrarily. The respective effects of the combination of $m^1$, $n^1$, $o^1$ and $p^1$, the left terminal group $R^2$, the right terminal group $X^2$, the species of the linking groups $Zb^1$ to $Zb^6$, and the species of (F) to the physical properties of the compound (2-1) are described below.

In general, a compound with $m^1+n^1+o^1+p^1=2$ has a high clearing point, and a compound with $m^1+n^1+o^1+p^1=1$ has a low melting point.

When $R^2$ is alkenyl, the preferred stereo configuration depends on the position of the double bond. A trans-configuration is preferred for an alkenyl having a double bond at an odd position, such as —CH=CHCH$_3$, —CH=CHC$_2$H$_5$, —CH=CHC$_3$H$_7$, —CH=CHC$_4$H$_9$, —C$_2$H$_4$CH=CHCH$_3$ and —C$_2$H$_4$CH=CHC$_2$H$_5$. A cis-configuration is preferred for alkenyl having a double bond at an even position, such as —CH$_2$CH=CHCH$_3$, —CH$_2$CH=CHC$_2$H$_5$ and —CH$_2$CH=CHC$_3$H$_7$. An alkenyl compound having a preferred stereo configuration has a high upper-limit temperature or a wide temperature range of liquid crystal phase. This is detailed in *Mol. Cryst. Liq. Cryst.*, 1985, 131, 109 and *Mol. Cryst. Liq. Cryst.*, 1985, 131, 327.

Because the linking groups $Zb^1$ to $Zb^6$ are single bonds or —CF$_2$O—, the compound is relatively stable chemically, and degradation is relatively difficult to occur. Moreover, when the linking groups are single bonds, the viscosity is low. When the linking groups are —CF$_2$O—, the dielectric anisotropy is large.

When the right terminal group $X^2$ is fluorine, chlorine, —CF$_3$, —OCF$_3$ or —CH=CH—CF$_3$, the dielectric anisotropy is large. When $X^2$ is fluorine, —OCF$_3$ or —CF$_3$, the compound is chemically stable.

When (F) is hydrogen, the melting point is low. When (F) is fluorine, the dielectric anisotropy is large.

As mentioned above, by properly selecting the species of the ring structures, the terminal groups and the linking groups, etc., a compound with target physical properties can be obtained.

3-1. Compound (3)

The $3^{rd}$ aspect of this invention is a liquid crystal composition that contains at least one compound selected from the group consisting of compounds expressed by formula (3) as a third component, the first component, and the chiral dopant. In addition to the third component and the first component, the achiral component T may also contain the second component.

The compound expressed by formula (3) is described below.

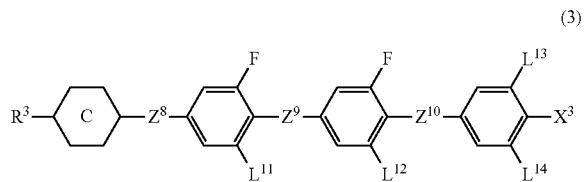

(3)

In formula (3), $R^3$ is hydrogen, or $C_{1-20}$ alkyl in which arbitrary —$CH_2$— is optionally replaced by —O—, —S—, —COO—, —OCO—, —CH=CH—, —CF=CF— or —C≡C—, and in the alkyl or in a group derived by replacing arbitrary —$CH_2$— in the alkyl by —O—, —S—, —COO—, —OCO—, —CH=CH—, —CF=CF— or —C≡C—, arbitrary hydrogen is optionally replaced by halogen. The ring C is 1,4-phenylene in which one or more hydrogen atoms are replaced by fluorine, tetrahydropyran-2,5-diyl or 1,3-dioxane-2,5-diyl. $Z^8$, $Z^9$ and $Z^{10}$ are independently a single bond, —COO— or —$CF_2O$—, with a proviso that at least one of $Z^8$, $Z^9$ and $Z^{10}$ is —$CF_2O$—. $L^{11}$, $L^{12}$, $L^{13}$ and $L^{14}$ are independently hydrogen or fluorine. $X^3$ is hydrogen, halogen, —$SF_5$, or $C_{1-10}$ alkyl in which arbitrary —$CH_2$— is optionally replaced by —O—, —S—, —COO—, —OCO—, —CH=CH—, —CF=CF— or —C≡C—, and in the alkyl or in a group derived by replacing arbitrary —$CH_2$— in the alkyl by —O—, —S—, —COO—, —OCO—, —CH=CH—, —CF=CF— or —C≡C—, arbitrary hydrogen is optionally replaced by fluorine.

The preferred stereo configuration of —CH=CH— in an alkenyl depends on the position of the double bond. The trans-configuration is preferred for an alkenyl having a double bond at an odd position, such as —CH=CHCH₃, —CH=CHC₂H₅, —CH=CHC₃H₇, —CH=CHC₄H₉, —C₂H₄CH=CHCH₃ and —C₂H₄CH=CHC₂H₅. The cis-configuration is preferred for alkenyl having a double bond at an even position, such as —CH₂CH=CHCH₃, —CH₂CH=CHC₂H₅ and —CH₂CH=CHC₃H₇. An alkenyl compound having a preferred stereo configuration has a high upper-limit temperature or a wide temperature range of liquid crystal phase. This is detailed in *Mol. Cryst. Liq. Cryst.*, 1985, 131, 109 and *Mol. Cryst. Liq. Cryst.*, 1985, 131, 327.

Specific examples of the alkyl include —CH₃, —C₂H₅, —C₃H₇, —C₄H₉, —C₅H₁₁, —C₆H₁₃, —C₇H₁₅, —C₈H₁₇, —C₉H₁₉, —C₁₀H₂₁, —C₁₁H₂₃, —C₁₂H₂₅, —C₁₃H₂₇, —C₁₄H₂₉ and —C₁₅H₃₁.

Specific examples of the alkoxy include —OCH₃, —OC₂H₅, —OC₃H₇, —OC₄H₉, —OC₅H₁₁, —OC₆H₁₃, —OC₇H₁₅, —OCH₁₇, —OC₉H₁₉, —OC₁₀H₂₁, —OC₁₁H₂₃, —OC₁₂H₂₅, —OC₁₃H₂₇ and —OC₁₄H₂₉.

Specific examples of the alkoxyalkyl include —CH₂OCH₃, —CH₂OC₂H₅, —CH₂OC₃H₇, —(CH₂)₂—OCH₃, —(CH₂)₂—OC₂H₅, —(CH₂)₂—OC₃H₇, —(CH₂)₃—OCH₃, —(CH₂)₄—OCH₃, and —(CH₂)₅—OCH₃.

Specific examples of the alkenyl include —CH=CH₂, —CH=CHCH₃, —CH₂CH=CH₂, —CH=CHC₂H₅, —CH₂CH=CHCH₃, —(CH₂)₂—CH=CH₂, —CH=CHC₃H₇, —CH₂CH=CHC₂H₅, —(CH₂)₂—CH=CHCH₃ and —(CH₂)₃—CH=CH₂.

Specific examples of the alkenyloxy include —OCH₂CH=CH₂, —OCH₂CH=CHCH₃ and —OCH₂CH=CHC₂H₅.

Specific examples of the alkynyl include —C≡CH, —C≡CCH₃, —CH₂C≡CH, —C≡CC₂H₅, —CH₂C≡CCH₃, —(CH₂)₂—CCH, —C≡CC₃H₇, —CH₂C≡CC₂H₅, —(CH₂)₂—C≡CCH₃ and —C≡C(CH₂)₅.

In formula (3), the ring C is 1,4-phenylene in which one or more hydrogen atoms are replaced by fluorine, tetrahydropyran-2,5-diyl or 1,3-dioxane-2,5-diyl. In order to increase the optical anisotropy, 1,4-phenylene in which one or more hydrogen atoms are replaced by fluorine is preferred. In order to improve the compatibility with other liquid crystal compounds, 1,3-dioxane-2,5-diyl is preferred.

In formula (3), $Z^8$, $Z^9$ and $Z^{10}$ are independently a single bond, —COO— or —$CF_2O$—, with a proviso that at least one of $Z^8$, $Z^9$ and $Z^{10}$ is —$CF_2O$—.

Preferred examples of $Z^8$, $Z^9$ and $Z^{10}$ include a single bond and —$CF_2O$—.

In formula (3), $L^{11}$, $L^{12}$, $L^{13}$ and $L^{14}$ are independently hydrogen or fluorine. When Z is —COO— or —$CF_2O$—, $L^{11}$, $L^{13}$ and $L^{14}$ are preferably fluorine. When $Z^8$ is —COO— or —$CF_2O$—, $L^{11}$, $L^{13}$ and $L^{14}$ are preferably fluorine. When $Z^9$ is —COO— or —$CF_2O$—, $L^{12}$, $L^{13}$ and $L^{14}$ are preferably fluorine.

In formula (3), $X^3$ is hydrogen, halogen, —$SF_5$, or $C_{1-10}$ alkyl in which arbitrary —$CH_2$— is optionally replaced by —O—, —S—, —COO—, —OCO—, —CH=CH—, —CF=CF— or —C≡C—, and in the alkyl or in a group derived by replacing arbitrary —$CH_2$— in the alkyl by —O—, —S—, —COO—, —OCO—, —CH=CH—, —CF=CF— or —C≡C—, arbitrary hydrogen is optionally replaced by fluorine.

Specific examples of alkyl in which arbitrary hydrogen is replaced by halogen are —CH₂F, —CHF₂, —CF₃, —(CH₂)₂—F, —CF₂CH₂F, —CF₂CHF₂, —CH₂CF₃, —CF₂CF₃, —(CH₂)₃—F, —(CF₂)₃—F, —CF₂CHFCF₃, —CHFCF₂CF₃, —(CH₂)₄—F, —(CF₂)₄—F, —(CH₂)₅—F and —(CF₂)₅—F.

Specific examples of alkoxy in which arbitrary hydrogen is replaced by halogen are —OCH₂F, —OCHF₂, —OCF₃, —O—(CH₂)₂—F, —OCF₂CH₂F, —OCF₂CHF₂, —OCH₂CF₃, —O—(CH₂)₃—F, —O—(CF₂)₃—F, —OCF₂CHFCF₃, —OCHFCF₂CF₃, —O(CH₂)₄—F, —O—(CF₂)₄—F, —O—(CH₂)₅—F and O—(CF₂)₅—F.

Specific examples of alkenyl in which arbitrary hydrogen is replaced by halogen are —CH=CHF, —CH=CF₂, —CF=CHF, —CH=CHCHF₂, —CH=CHCF₃, —(CH₂)₂—CH=CF₂, —CH₂CH=CHCF₃, —CH=CHCF₃ and —CH=CHCF₂CF₃.

Preferred examples of $X^3$ include fluorine, chlorine, —$CF_3$, —$CHF_2$, —$OCF_3$ and —$OCHF_2$. More preferred examples of $X^3$ include fluorine, chlorine, —$CF_3$ and —$OCF_3$.

Among the compounds of formula (3), those of formulae (3-1) to (3-5) are preferred, wherein those of formulae (3-2) to (3-5) are more preferred.

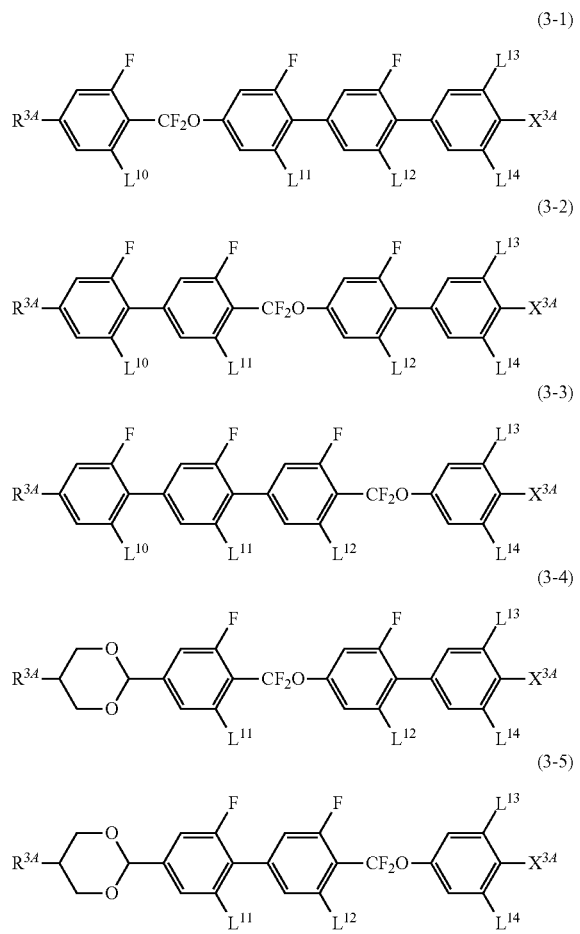

In these formulae, each $R^{3A}$ is independently $C_{1-12}$ alkyl, $C_{1-12}$ alkoxy, $C_{2-12}$ alkenyl, or $C_{2-12}$ alkenyl in which arbitrary hydrogen is replaced by fluorine. $X^{3A}$ is fluorine, chlorine, —$CF_3$ or —$OCF_3$. $L^{10}$ to $L^{14}$ are independently hydrogen or fluorine.

3-2. Properties of Compound (3)

The compound (3) used in this invention is further detailed below. A compound (3) is a liquid crystal compound having four benzene rings, or one dioxane ring or tetrahydropyran ring and three benzene rings, and at least one —$CF_2O$— as a linking group. This compound has very stable physical and chemical properties under the conditions where the device is usually used, and has a good compatibility with other liquid crystal compounds. A composition containing such a compound is stable under the conditions where the device is usually used. Therefore, the composition can have a larger temperature range of cholesteric phase, and thus can be used in a display device in a broad temperature range. Moreover, because the compound has large dielectric anisotropy and optical anisotropy, it is useful as a component for lowering the driving voltage of a composition driven in a cholesteric phase and for raising the reflectivity.

For the compound (3), by suitably selecting the species of the left terminal group $R^3$, the groups ($L^{10}$-$L^{14}$ and $X^3$) on the benzene rings and the linking groups $Z^8$-$Z^{10}$, the physical properties such as clearing point, optical anisotropy and dielectric anisotropy, etc., can be adjusted arbitrarily. The effects of the species of the left terminal group $R^3$, the groups ($L^{10}$-$L^{14}$ and $X^3$) on the benzene rings, and the linking groups $Z^8$-$Z^{10}$ to the physical properties of the compound (3) are described below.

When $R^3$ is alkenyl, the preferred stereo configuration of —CH—CH— in the alkenyl depends on the position of the double bond. A trans-configuration is preferred for an alkenyl having a double bond at an odd position, such as —CH=$CHCH_3$, —CH=$CHC_2H_5$, —CH=$CHC_3H_7$, —CH=$CHC_4H_9$, —$C_2H_4$CH=$CHCH_3$ and —$C_2H_4$CH=$CHC_2H_5$. A cis-configuration is preferred for alkenyl having a double bond at an even position, such as —$CH_2$CH=$CHCH_3$, —$CH_2$CH=$CHC_2H_5$ and —$CH_2$CH=$CHC_3H_7$. An alkenyl compound having a preferred stereo configuration has a high upper-limit temperature or a wide temperature range of liquid crystal phase. This is detailed in *Mol. Cryst. Liq. Cryst.*, 1985, 131, 109 and *Mol. Cryst. Liq. Cryst.*, 1985, 131, 327.

When $Z^8$, $Z^9$ and $Z^{10}$ are single bonds or —$CF_2O$—, the viscosity is low. When $Z^8$, $Z^9$ and $Z^{10}$ are —$CF_2O$—, the dielectric anisotropy is large. When $Z^S$, $Z^9$ and $Z^{10}$ are single bonds or —$CF_2O$—, the compound is chemically stable relatively, and is not easily degraded.

When $X^3$ is fluorine, chlorine, —$SF_5$, —$CF_3$, —$CHF_2$, —$CH_2F$, —$OCF_3$, —$OCHF_2$ or —$OCH_2F$, the dielectric anisotropy is large. When $X^3$ is fluorine, —$OCF_3$ or —$CF_3$, the compound is chemically stable.

When the number of fluorine in $L^{10}$ to $L^{14}$ is more, the dielectric anisotropy is larger. When $L^{10}$ is hydrogen, the compatibility with other liquid crystal compounds is good. When $L^{13}$ and $L^{14}$ are simultaneously fluorine, the dielectric anisotropy is particularly large.

By properly selecting the species of the terminal groups and the linking groups, etc., as above, a compound with target physical properties can be obtained.

3-3. Specific Examples of Compound (3)

Preferred examples of the compounds (3) include the compounds of formulae (3-1) to (3-5). More preferred examples include those of formulae (3-2-1) to (3-2-8), (3-3-1) to (3-3-4), (3-4-1) to (3-4-6) and (3-5-1) to (3-5-6). Even more preferred examples include those of formulae (3-2-1) to (3-2-4), (3-3-1), (3-3-2), (3-4-1) to (3-4-5), (3-5-1) to (3-5-3) and (3-5-5). Further more preferred examples include those of formulae (3-2-1), (3-2-3), (3-3-1), (3-4-1), (3-4-4) and (3-5-2).

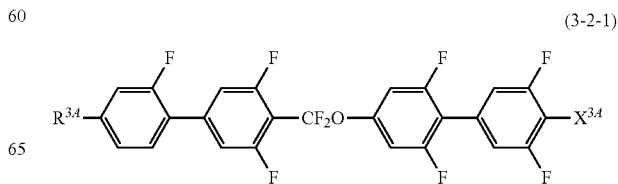

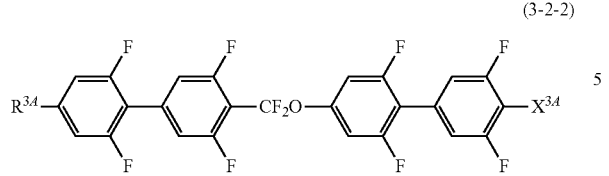
(3-2-2)
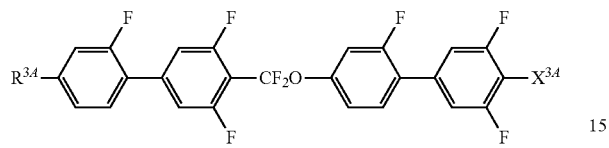
(3-2-3)
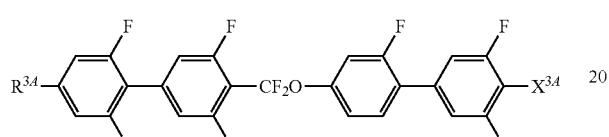
(3-2-4)
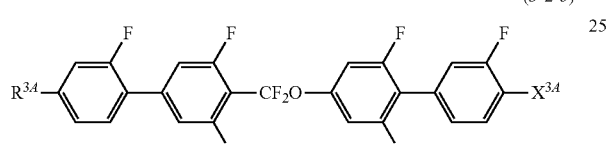
(3-2-5)
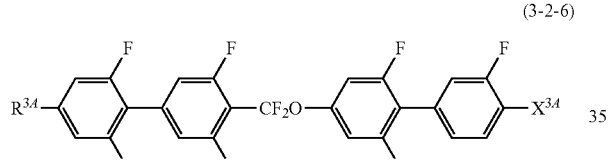
(3-2-6)
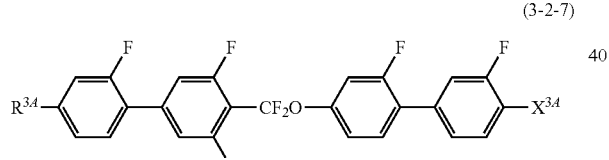
(3-2-7)
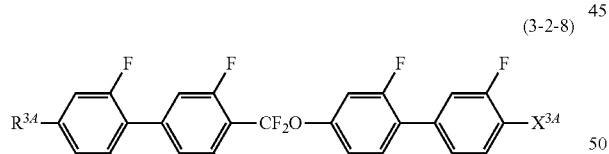
(3-2-8)
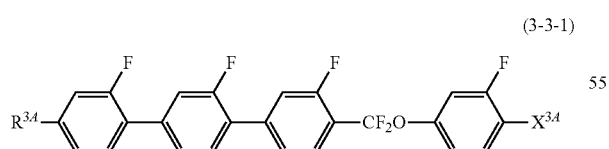
(3-3-1)
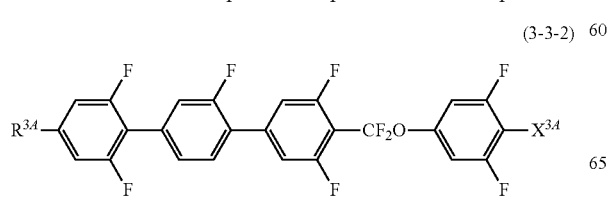
(3-3-2)
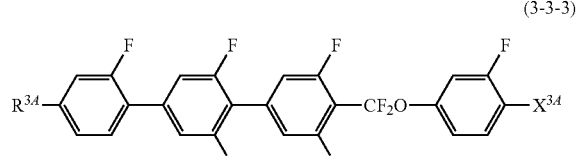
(3-3-3)
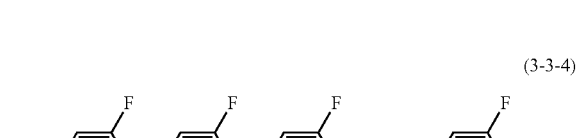
(3-3-4)
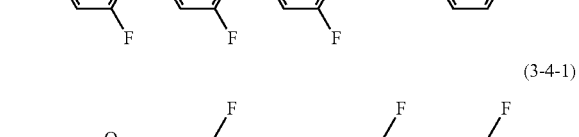
(3-4-1)
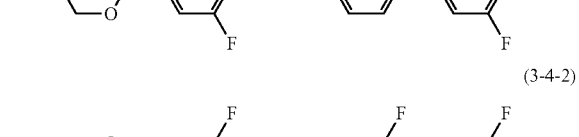
(3-4-2)
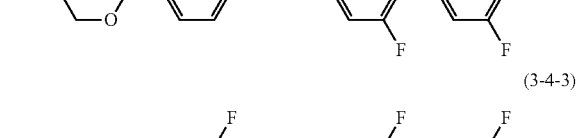
(3-4-3)
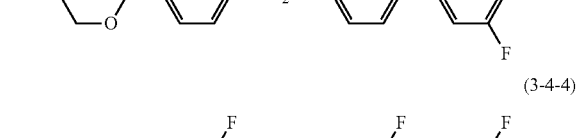
(3-4-4)
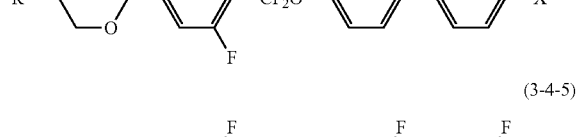
(3-4-5)
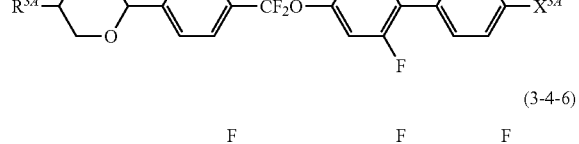
(3-4-6)
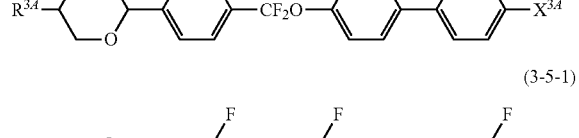
(3-5-1)

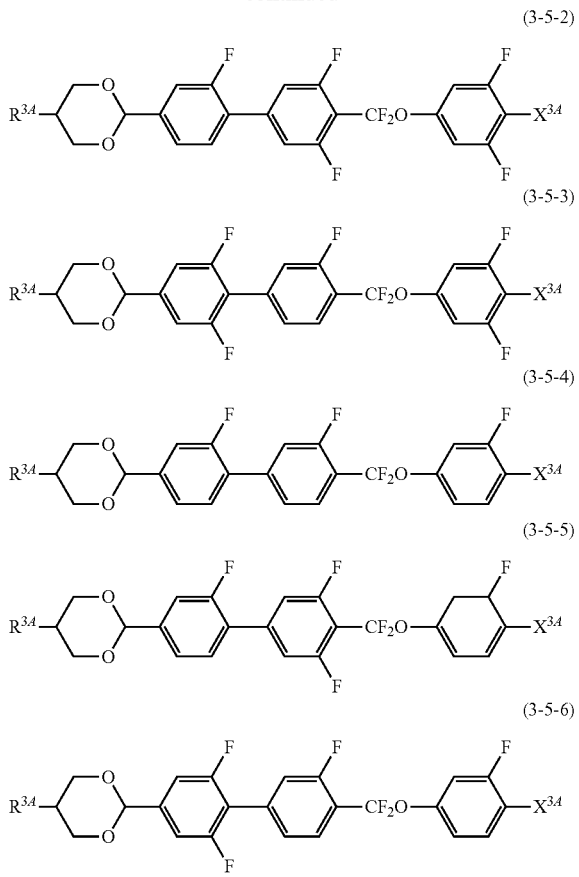

(3-5-2), (3-5-3), (3-5-4), (3-5-5), (3-5-6)

In these formulae, each $R^{3A}$ is independently $C_{1-2}$ alkyl, $C_{1-12}$ alkoxy, $C_{2-12}$ alkenyl, or $C_{2-12}$ alkenyl in which arbitrary hydrogen is replaced by fluorine, and $X^{3A}$ is fluorine, chlorine, —$CF_3$ or —$OCF_3$.

4. Compound (4)

The 4$^{th}$ aspect of this invention is a liquid crystal composition that contains the first component, the chiral dopant, and additional components that include a component A selected from compounds expressed by the above formulae (2) and (3) and, as a fourth component, at least one compound selected from the group consisting of compounds expressed by formula (4). The compound expressed by formula (4) is described below.

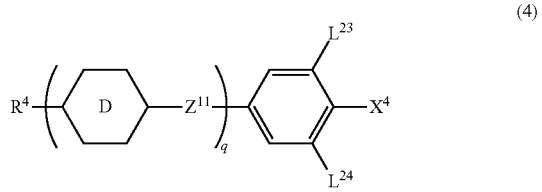

(4)

In formula (4), $R^4$ is $C_{1-12}$ alkyl, $C_{1-12}$ alkoxy, $C_{2-12}$ alkenyl, or $C_{2-12}$ alkenyl in which arbitrary hydrogen is replaced by fluorine. Each ring D is independently 1,4-cyclohexylene, 1,3-dioxane-2,5-diyl, tetrahydropyran-2,5-diyl, 1,4-phenylene, 2-fluoro-1,4-phenylene, 3-fluoro-1,4-phenylene, 3,5-difluoro-1,4-phenylene, 3,5-dichloro-1,4-phenylene or pyrimidine-2,5-diyl. Each $Z^{11}$ is independently a single bond, ethylene, —COO—, —OCO—, —$CF_2O$— or —$OCF_2$—. $L^{23}$ and $L^{24}$ are independently hydrogen or fluorine. $X^4$ is fluorine, chlorine, —$CF_3$ or —$OCF_3$, and q is 1, 2, 3 or 4. When q is 3 or 4, one $Z^{10}$ is —$CF_2O$— or —$OCF_2$—. When q is 3, each ring D is not 1,3-dioxane-2,5-diyl or tetrahydropyran-2,5-diyl, and the rings D are not simultaneously fluorine-substituted 1,4-phenylene.

The fourth component of the achiral component T is suitably for preparing a composition having a large dielectric anisotropy. The amount of the fourth component relative to the total weight of the component T is preferably no less than about 5 wt % to increase the dielectric anisotropy, and no more than 40 wt % to lower the lower-limit temperature of the liquid crystal phase. The ratio is more preferably from about 5 wt % to about 30 wt %, and particularly preferably from about 5 wt % to about 20 wt %.

$R^4$ is $C_{1-12}$ alkyl, $C_{1-12}$ alkoxy, $C_{2-12}$ alkenyl, or $C_{2-12}$ alkenyl in which arbitrary hydrogen is replaced by fluorine. To enhance the stability to UV light or the stability to heat, $R^4$ is preferably $C_{1-12}$ alkyl. To lower the viscosity, $R^4$ is preferably $C_{2-12}$ alkenyl. To enhance the stability to UV light or enhance the stability to heat, $R^4$ is preferably $C_{1-12}$ alkyl.

The alkyl is preferably methyl, ethyl, propyl, butyl, pentyl, hexyl, heptyl or octyl. In order to lower the viscosity, the alkyl is more preferably ethyl, propyl, butyl, pentyl or heptyl.

The alkoxy is preferably methoxy, ethoxy, propoxy, butoxy, pentyloxy, hexyloxy, or heptyloxy. In order to lower the viscosity, the alkoxy is more preferably methoxy or ethoxy.

The alkenyl is preferably vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. In order to lower the viscosity, the alkenyl is more preferably vinyl, 1-propenyl, 3-butenyl or 3-pentenyl. A preferred stereo configuration of the —CH═CH— in these alkenyl groups depends on the position of the double bond. In order to lower the viscosity, the trans-configuration is preferred for alkenyls such as 1-propenyl, 1-butenyl, 1-pentenyl, 1-hexenyl, 3-pentenyl and 3-hexenyl. A cis-configuration is preferred for alkenyls such as 2-butenyl, 2-pentenyl and 2-hexenyl. Among these alkenyls, the straight ones are preferred than the branched ones.

The alkenyl in which arbitrary hydrogen is replaced by fluorine is preferably 2,2-difluorovinyl, 3,3-difluoro-2-propenyl, 4,4-difluoro-3-butenyl, 5,5-difluoro-4-pentenyl or 6,6-difluoro-5-hexenyl, for example. In order to lower the viscosity, 2,2-difluorovinyl or 4,4-difluoro-3-butenyl is more preferred.

The scope of the alkyl does not include cyclic alkyl groups. The scope of the alkoxy does not include cyclic alkoxy groups. The scope of the alkenyl does not include cyclic alkenyl groups. The scope of the alkenyl in which arbitrary hydrogen is replaced by fluorine does not include cyclic alkenyl groups in which arbitrary hydrogen is replaced by fluorine.

Each ring D is independently 1,4-cyclohexylene, 1,3-dioxane-2,5-diyl, tetrahydropyran-2,5-diyl, 1,4-phenylene, 2-fluoro-1,4-phenylene, 3-fluoro-1,4-phenylene, 3,5-difluoro-1,4-phenylene, 3,5-dichloro-1,4-phenylene or pyrimidine-2,5-diyl. When q is 2 or more, arbitrary two rings D may be the same or different. In order to increase the optical anisotropy, the ring D is preferably 1,4-phenylene or 3-fluoro-1,4-phenylene. In order to lower the viscosity, the ring D is preferably 1,4-cyclohexylene.

Each $Z^{11}$ is independently a single bond, ethylene, —COO—, —OCO—, —$CF_2O$— or —$OCF_2$—, but when q is 3 or 4, one $Z^{11}$ is —CF$_2$O—. When q is 2 or more, arbitrary two $Z^{11}$ may be the same or different. To lower the viscosity, $Z^{11}$ is preferably a single bond. To increase the dielectric anisotropy and improve the compatibility, $Z^{11}$ is preferably —CF$_2$O—.

$L^{23}$ and $L^{24}$ are each independently hydrogen or fluorine. To increase the dielectric anisotropy, it is preferred that $L^{23}$ and $L^{24}$ are both fluorine. To raise the clearing point, it is preferred that $L^{23}$ and $L^{24}$ are both hydrogen.

$X^4$ is fluorine, chlorine, —CF$_3$ or —OCF$_3$. To increase the dielectric anisotropy, —CF$_3$ is preferred. To improve the compatibility, fluorine and —OCF$_3$ are preferred. To increase the optical anisotropy, chlorine is preferred.

Among the compounds of formula (4), those of formulae (4-1) to (4-7) are preferred.

5. Compound (5)

The 5$^{th}$ aspect of this invention is a liquid crystal composition that contains the first component, additional components that include a component A including at least one compound selected from compounds expressed by the above formulae (2) and (3) and, as a fifth component, at least one compound selected from the group consisting of compounds expressed by formula (5), and a chiral dopant. The achiral component T may also include the fourth component. The compound expressed by formula (5) is described below.

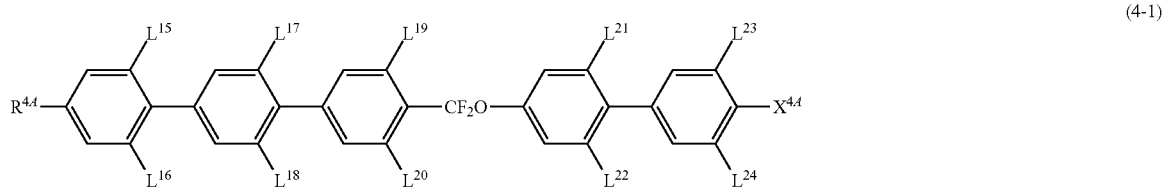
(4-1)

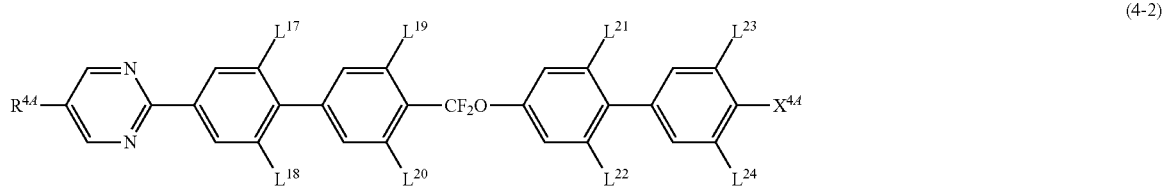
(4-2)

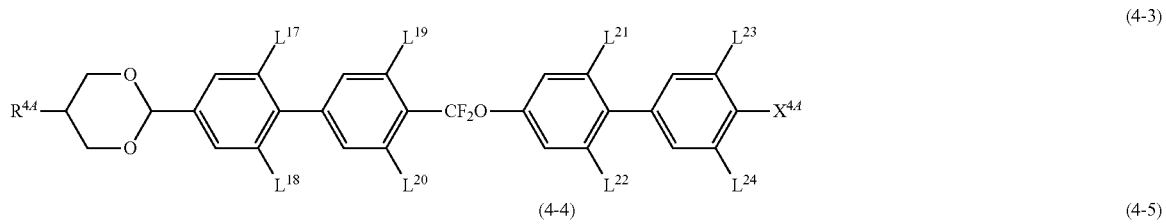
(4-3)

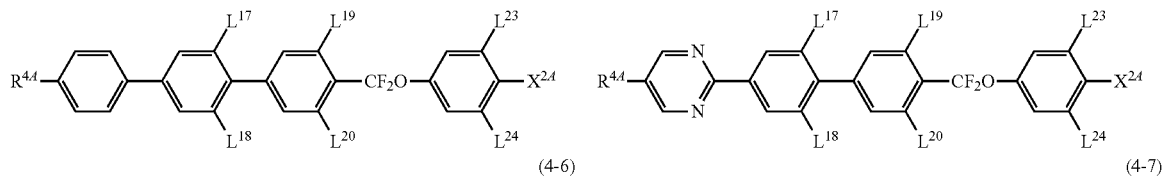
(4-4)       (4-5)

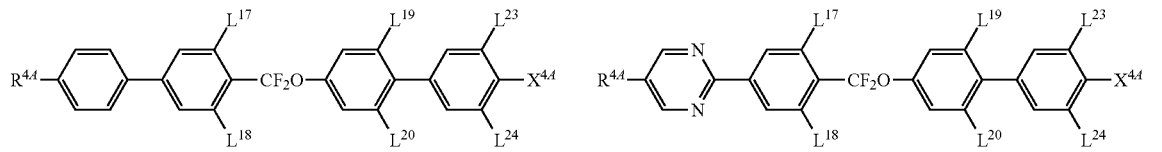
(4-6)       (4-7)

In the above formulae (4-1) to (4-7), each $R^{4A}$ is independently $C_{1-12}$ alkyl, $C_{1-12}$ alkoxy, $C_{2-12}$ alkenyl, or $C_{2-12}$ alkenyl in which arbitrary hydrogen is replaced by fluorine. $X^{4A}$ is fluorine, chlorine, —CF$_3$ or —OCF$_3$. $L^{15}$ to $L^{24}$ are each independently hydrogen or fluorine.

The compounds of formula (4-1) to (4-3) have high clearing points, and have good compatibility for having five rings. The compounds of formula (4-4) and (4-5) have high clearing points. The compounds of formula (4-6) and (4-7) have good compatibility with other liquid crystal compounds. Moreover, when the number of fluorine atoms in $L^{15}$ to $L^{24}$ is larger, the dielectric anisotropy is larger.

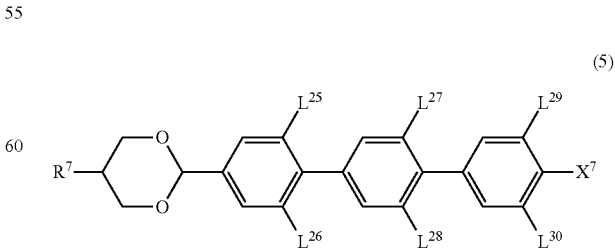
(5)

In formula (5), $R^7$ is hydrogen, or $C_{1-20}$ alkyl in which arbitrary —CH$_2$— is optionally replaced by —O—, —S—, —COO—, —OCO—, —CH=CH—, —CF=CF— or —C≡C—, and in the alkyl or in a group derived by replacing arbitrary —CH$_2$— in the alkyl by —O—, —S—, —COO—, —OCO—, —CH=CH—, —CF=CF— or —C≡C—, arbitrary hydrogen is optionally replaced by halogen. $L^{25}$, $L^{26}$, $L^{27}$, $L^{28}$, $L^{29}$ and $L^{30}$ are independently hydrogen or fluorine. $X^7$ is hydrogen, halogen, —SF$_5$, or C$_{1-10}$ alkyl in which arbitrary —CH$_2$— is optionally replaced by —O—, —S—, —COO—, —OCO—, —CH=CH—, —CF=CF— or —C≡C—, and in the alkyl or in a group derived by replacing arbitrary —CH$_2$— in the alkyl by —O—, —S—, —COO—, —OCO—, —CH=CH—, —CF=CF— or —C≡C—, arbitrary hydrogen is optionally replaced by fluorine.

The preferred stereo configuration of —CH=CH— in the alkenyl depends on the position of the double bond. A trans-configuration is preferred for an alkenyl having a double bond at an odd position, such as —CH=CHCH$_3$, —CH=CHC$_2$H$_5$, —CH=CHC$_3$H$_7$, —CH=CHC$_4$H$_9$, —C$_2$H$_4$CH=CHCH$_3$ and —C$_2$H$_4$CH=CHC$_2$H$_5$. A cis-configuration is preferred for alkenyl having a double bond at an even position, such as —CH$_2$CH=CHCH$_3$, —CH$_2$CH=CHC$_2$H$_5$ and —CH$_2$CH=CHC$_3$H$_7$. An alkenyl compound having a preferred stereo configuration has a high upper-limit temperature or a broad temperature range of liquid crystal phase. This is detailed in *Mol. Cryst. Liq. Cryst.*, 1985, 131, 109 and *Mol. Cryst. Liq. Cryst.*, 1985, 131, 327.

Specific examples of the alkyl include —CH$_3$, —C$_2$H$_5$, —C$_3$H$_7$, —C$_4$H$_9$, —C$_5$H$_{11}$, —C$_6$H$_{13}$, —C$_7$H$_{15}$, —C$_8$H$_{17}$, —C$_9$H$_{19}$, —C$_{10}$H$_{21}$, —C$_{11}$H$_{23}$, —C$_{12}$H$_{25}$, —C$_{13}$H$_{27}$, —C$_{14}$H$_{29}$ and —C$_{15}$H$_{31}$.

Specific examples of the alkoxy include —OCH$_3$, —OC$_2$H$_5$, —OC$_3$H$_7$, —OC$_4$H$_9$, —OC$_5$H$_{11}$, —OC$_6$H$_{13}$, —OC$_7$H$_{15}$, —OC$_8$H$_{17}$, —OC$_9$H$_{19}$, —OC$_{10}$H$_{21}$, —OC$_{11}$H$_{23}$, —OC$_{12}$H$_{25}$, —OC$_{13}$H$_{27}$ and —OC$_{14}$H$_{29}$.

Specific examples of the alkoxyalkyl include —CH$_2$OCH$_3$, —CH$_2$OC$_2$H$_5$, —CH$_2$OC$_3$H$_7$, —(CH$_2$)$_2$—OCH$_3$, —(CH$_2$)$_2$—OC$_2$H$_5$, —(CH$_2$)$_2$—OC$_3$H$_7$, —(CH$_2$)$_3$—OCH$_3$, —(CH$_2$)$_4$—OCH$_3$, and —(CH$_2$)$_5$—OCH$_3$.

Specific examples of the alkenyl include —CH=CH$_2$, —CH=CHCH$_3$, —CH$_2$CH=CH$_2$, —CH=CHC$_2$H$_5$, —CH$_2$CH=CHCH$_3$, —(CH$_2$)$_2$—CH=CH$_2$, —CH=CHC$_3$H$_7$, —CH$_2$CH=CHC$_2$H$_5$, —(CH$_2$)$_2$—CH=CHCH$_3$ and —(CH$_2$)$_3$—CH=CH$_2$.

Specific examples of the alkenyloxy include —OCH$_2$CH=CH$_2$, —OCH$_2$CH=CHCH$_3$ and —OCH$_2$CH=CHC$_2$H$_5$.

Specific examples of the alkynyl include —C≡CH, —C≡CCH$_3$, —CH$_2$C≡CH, —C≡CC$_2$H$_5$, —CH$_2$C≡CCH$_3$, —(CH$_2$)$_2$—C≡CH, —C≡CC$_3$H$_7$, —CH$_2$C≡CC$_2$H$_5$, —(CH$_2$)$_2$—C≡CCH$_3$ and —C≡C(CH$_2$)$_5$.

In formula (5), $X^7$ is hydrogen, halogen, —SF$_5$, or C$_{1-10}$ alkyl in which arbitrary —CH$_2$— is optionally replaced by —O—, —S—, —COO—, —OCO—, —CH=CH—, —CF=CF— or —C≡C—, and in the alkyl or in a group derived by replacing arbitrary —CH$_2$— in the alkyl by —O—, —S—, —COO—, —OCO—, —CH=CH—, —CF=CF— or —C≡C—, arbitrary hydrogen is optionally replaced by fluorine.

Specific examples of the alkyl in which arbitrary hydrogen is replaced by fluorine or chlorine include —CH$_2$F, —CF$_3$, —CF$_2$CH$_2$F, —CF$_2$CHF$_2$, —CH$_2$CF$_3$, —CF$_2$CF$_3$, —(CH$_2$)$_3$—F, —(CF$_2$)$_3$—F, —CF$_2$CHFCF$_3$ and —CHFCF$_2$CF$_3$.

Specific examples of the alkoxy in which arbitrary hydrogen is replaced by fluorine or chlorine include —OCH$_2$F, —OCF$_3$, —OCF$_2$CH$_2$F, —OCF$_2$CHF$_2$, —OCH$_2$CF$_3$, —O—(CF$_2$)$_3$—F, —OCF$_2$CHFCF$_3$ and —OCHFCF$_2$CF$_3$.

Specific examples of the alkenyl in which arbitrary hydrogen is replaced by fluorine or chlorine include —CH=CF$_2$, —CF=CHF, —CH=CHCH$_2$F, —CH=CHCF$_3$, —(CH$_2$)$_2$—CH=CF$_2$, —CH$_2$CH=CHCF$_3$ and —CH=CHCF$_2$CF$_3$.

Specific examples of preferred $X^7$ include fluorine, chlorine, —CF$_3$, —CHF$_2$, —OCF$_3$ and —OCHF$_2$. Examples of more preferred $X^7$ include fluorine, chlorine, —CF$_3$ and —OCF$_3$. When $X^7$ is chlorine or fluorine, the melting point is low, and the compatibility with other liquid crystal compounds is particularly good. When $X^1$ is —CF$_3$, —CHF$_2$, —OCF$_3$ or —OCHF$_2$, the compound exhibits a particularly large dielectric anisotropy.

Among the compounds of formula (5), those of formulae (5-1) to (5-4) are preferred.

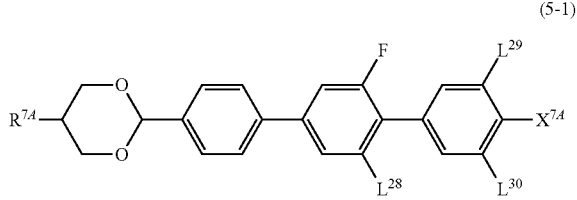

(5-1)

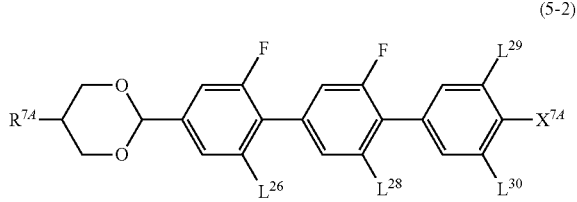

(5-2)

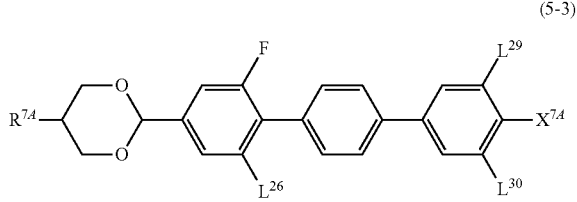

(5-3)

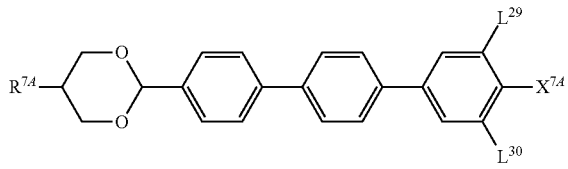

(5-4)

In formulae (5-1) to (5-4), each $R^{5A}$ is independently C$_{1-12}$ alkyl, C$_{1-12}$ alkoxy, C$_{2-12}$ alkenyl, or C$_{2-12}$ alkenyl in which arbitrary hydrogen is replaced by fluorine. $L^{26}$, $L^{28}$, $L^{29}$ and $L^{30}$ are independently hydrogen or fluorine. $X^{5A}$ is fluorine, chlorine, —CF$_3$ or —OCF$_3$.

Among the compounds expressed by formulae (5-1) to (5-4), those of formulae (5-1) to (5-3) are more preferred, and those of formulae (5-1-1), (5-1-2), (5-2-1) to (5-2-4), (5-3-1) and (5-3-2) are even more preferred, wherein those of formulae (5-2-1), (5-2-2) and (5-3-2) are further more preferred.

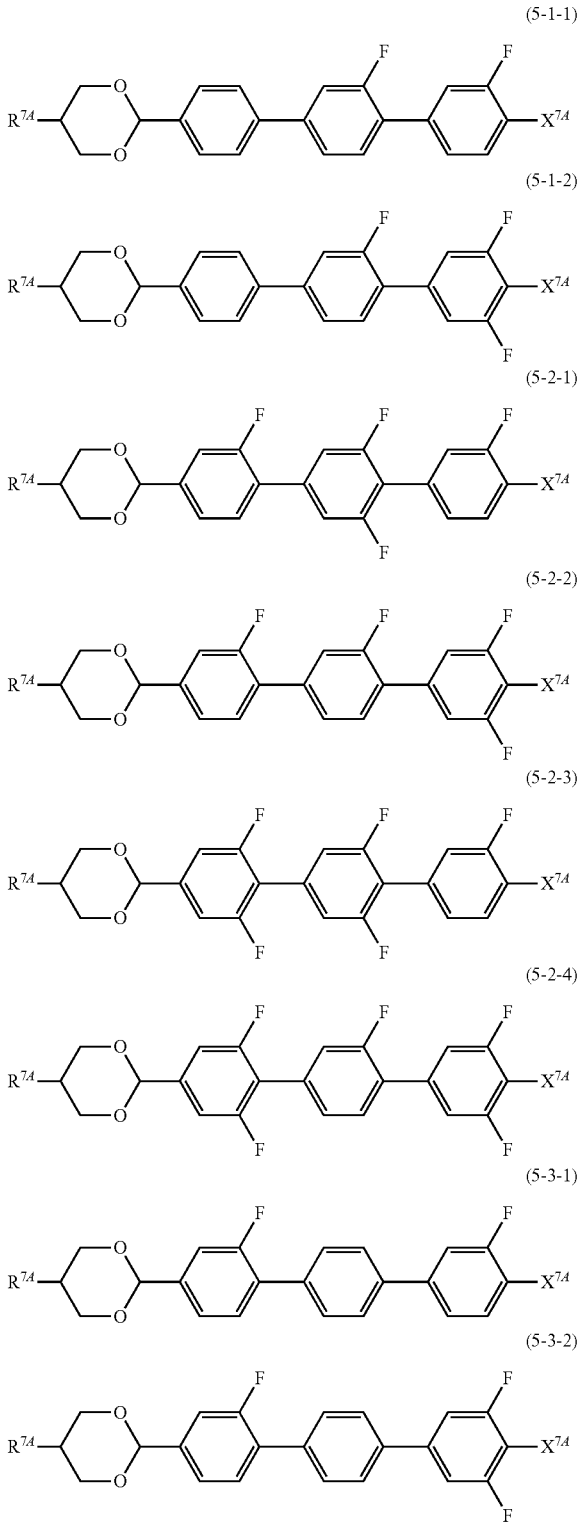

Herein, $R^{74}$ and $X^{74}$ are defined as above.

The fifth component is suitable for preparing a composition having a large dielectric anisotropy. Relative to the total weight of the achiral component T, the amount of the fifth component is preferably not less than about 1.0 wt % for increasing the dielectric anisotropy, and not more than about 50 wt % for lowering the lower-limit temperature of the liquid crystal phase. The ratio is more preferably from about 1 wt % to about 25 wt %, and particularly preferably from about 1 wt % to about 15 wt %.

5-1. Properties of Compound (5)

The compound (5) used in this invention is further detailed below. A compound (5) is a liquid crystal compound having a dioxane ring and three benzene rings. This compound has very stable physical and chemical properties under the conditions where the device is usually used, and also has a relatively good compatibility with other liquid crystal compounds in spite of a high clearing point. A composition containing such a compound is stable under the conditions where the device is usually used. Therefore, the composition can have a larger temperature range of optically isotropic liquid crystal phase, and thus can be used in a display device in a broad temperature range. Moreover, the compound is useful as a component for lowering the driving voltage of a composition driven in an optically isotropic liquid crystal phase. Moreover, when the composition prepared from the compound (5) and the chiral dopant exhibits a blue phase, a uniform blue phase without the co-existence of N* phase and isotropic phase is easily formed. That is, the compound (5) easily exhibits a uniform blue phase.

When the right terminal group $X^7$ is fluorine, chlorine, —$SF_5$, —$CF_3$, —$OCF_3$ or —CH=CH—$CF_3$, the dielectric anisotropy is large. When $X^7$ is fluorine, —$CF_3$ or —$OCF_3$, the compound is chemically stable.

5-2. Synthesis of Compound (5)

The synthesis of the compound (5) is described below. A compound (5) can be synthesized by a suitable combination of organic synthesis methods. The methods for introducing target terminal groups, rings and linking groups in the starting compound are described in, for example, *Organic Syntheses* (John Wiley & Sons, Inc.), *Organic Reactions* (John Wiley & Sons, Inc.), *Comprehensive Organic Synthesis* (Pergamon Press), and New Lecture on Experimental Chemistry (Maruzen).

For example, it is possible to use the method of Japanese Patent No. 2959526 to synthesize a compound of formula (5) of this invention.

6. Composition Having Optically Isotropic Liquid Crystal Phase

6.1 Components of Composition Having Optically Isotropic Liquid Crystal Phase The 6th aspect of this invention is a liquid crystal composition that includes an achiral component T and a chiral dopant and can be used in an optical device driven in an optically isotropic liquid crystal phase. The achiral component T includes the first component of formula (1), and a component A as an additional component selected from the compounds of formula (2) and (3). If required, the achiral component T may include, in addition to the component A, at least one compound selected from the group consisting of the fourth component expressed by formula (4) and the fifth component expressed by formula (5). The liquid crystal composition is a composition that exhibits an optically isotropic liquid crystal phase.

The compound of formula (1) has a high clearing point and a large dielectric anisotropy, and therefore has an amount of from about 0.5 wt % to about 50 wt %, preferably from about 1 wt % to about 30 wt % and more preferably from about 5 wt % to about 20 wt %, relative to the total weight of the achiral component T.

The compound of formula (2) has good compatibility, a large dielectric anisotropy and a large optical anisotropy, and therefore has an amount of from about 0.5 wt % to about 90 wt %, preferably from about 5 wt % to about 70 wt % and more preferably from about 10 wt % to about 50 wt %, relative to the total weight of the achiral component T.

The compound of formula (3) has a high clearing point, a large dielectric anisotropy and a large optical anisotropy, and therefore has an amount of from about 0.5 wt % to about 90 wt %, preferably from about 5 wt % to about 70 wt % and more preferably from about 10 wt % to about 50 wt %, relative to the total weight of the achiral component T.

The preferred amounts of the fourth component expressed by formula (4) and the fifth component expressed by formula (5) are as mentioned above.

Relative to the total weight of the liquid crystal composition, the amount of the chiral dopant is preferably from 1 wt % to 40 wt %, more preferably from 3 wt % to 25 wt %, and even more preferably from 5 wt % to 15 wt %. A liquid crystal composition containing the chiral dopant in an amount within such ranges easily exhibits an optically isotropic liquid crystal phase, and is therefore preferred.

The chiral dopant contained in the liquid crystal composition may include a single compound, or include two or more compounds.

6.2 Chiral Dopant

The chiral dopant contained in the optically isotropic liquid crystal composition is an optically active compound, and is preferably a compound having a large helical twisting power. With a compound having a large helical twisting power, the addition amount required for obtaining a desired pitch can be reduced, so that the driving voltage is prevented from being raised, which is advantageous in practice. Specifically, the compounds of formulae (K1)-(K5) are preferred.

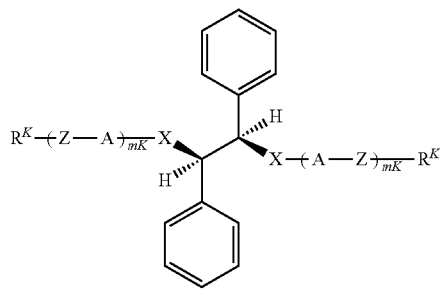
(K1)

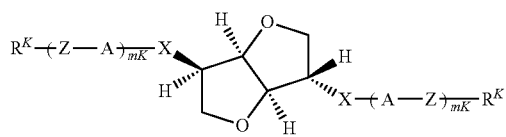
(K2)

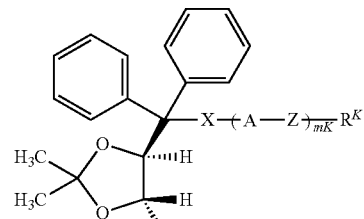
(K3)

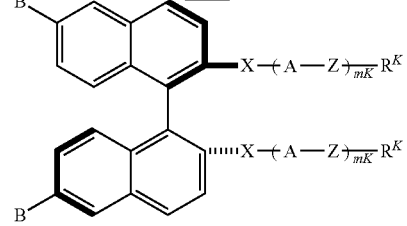
(K4)

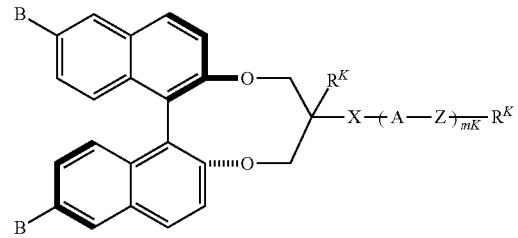
(K5)

In formulae (K1)-(K5), each $R^K$ is independently hydrogen, halogen, —C≡N, —N=C=O, —N=C=S, or $C_{1-20}$ alkyl in which arbitrary —$CH_2$— may be replaced by —O—, —S—, —COO— or —OCO—, arbitrary —$CH_2$—$CH_2$— may be replaced by —CH=CH—, —CF=CF— or —C≡C—, and arbitrary hydrogen may be replaced by halogen. Each A is independently an aromatic six- to eight-member ring, a non-aromatic three- to eight-member ring, or a fused ring of 9 or more carbons, wherein in these rings, arbitrary hydrogen may be replaced by halogen, $C_{1-3}$ alkyl or $C_{1-3}$ haloalkyl, —$CH_2$— may be replaced by —O—, —S— or —NH—, and —CH= may be replaced by —N=. Each B is independently hydrogen, halogen, $C_{1-3}$ alkyl, $C_{1-3}$ haloalkyl, an aromatic six- to eight-member ring, a non-aromatic three- to eight-member ring, or a fused ring of 9 or more carbons, wherein in these rings, arbitrary hydrogen may be replaced by halogen, $C_{1-3}$ alkyl or $C_{1-3}$ haloalkyl, —$CH_2$— may be replaced by —O—, —S— or —NH—, and —CH= may be replaced by —N=. Each Z is independently a single bond, or $C_{1-8}$ alkylene in which arbitrary —$CH_2$— may be replaced by —O—, —S—, —COO—, —OCO—, —CSO—, —OCS—, —N=N—, —CH=N— or —N=CH—, arbitrary —$CH_2$—$CH_2$— may be replaced by —CH=CH—, —CF=CF— or —C≡C—, and arbitrary hydrogen may be replaced by halogen. X is a single bond, —COO—, —OCO—, —$CH_2$O—, —O$CH_2$—, —$CF_2$O—, —O$CF_2$— or —$CH_2CH_2$—, and mK is an integer of 1-4.

Among the compounds of formulae (K1) to (K5), as a chiral dopant added in the liquid crystal composition, the compounds of formulae (K2-1) to (K2-8) in the scope of formula (K2), the compounds of formulae (K4-1) to (K4-6) in the scope of formula (K4) and the compounds of formulae (K5-1) to (K5-3) in the scope of formula (K5) are preferred, and those of formulae (K4-1) to (K4-6) and (K5-1) to (K5-3) more preferred.

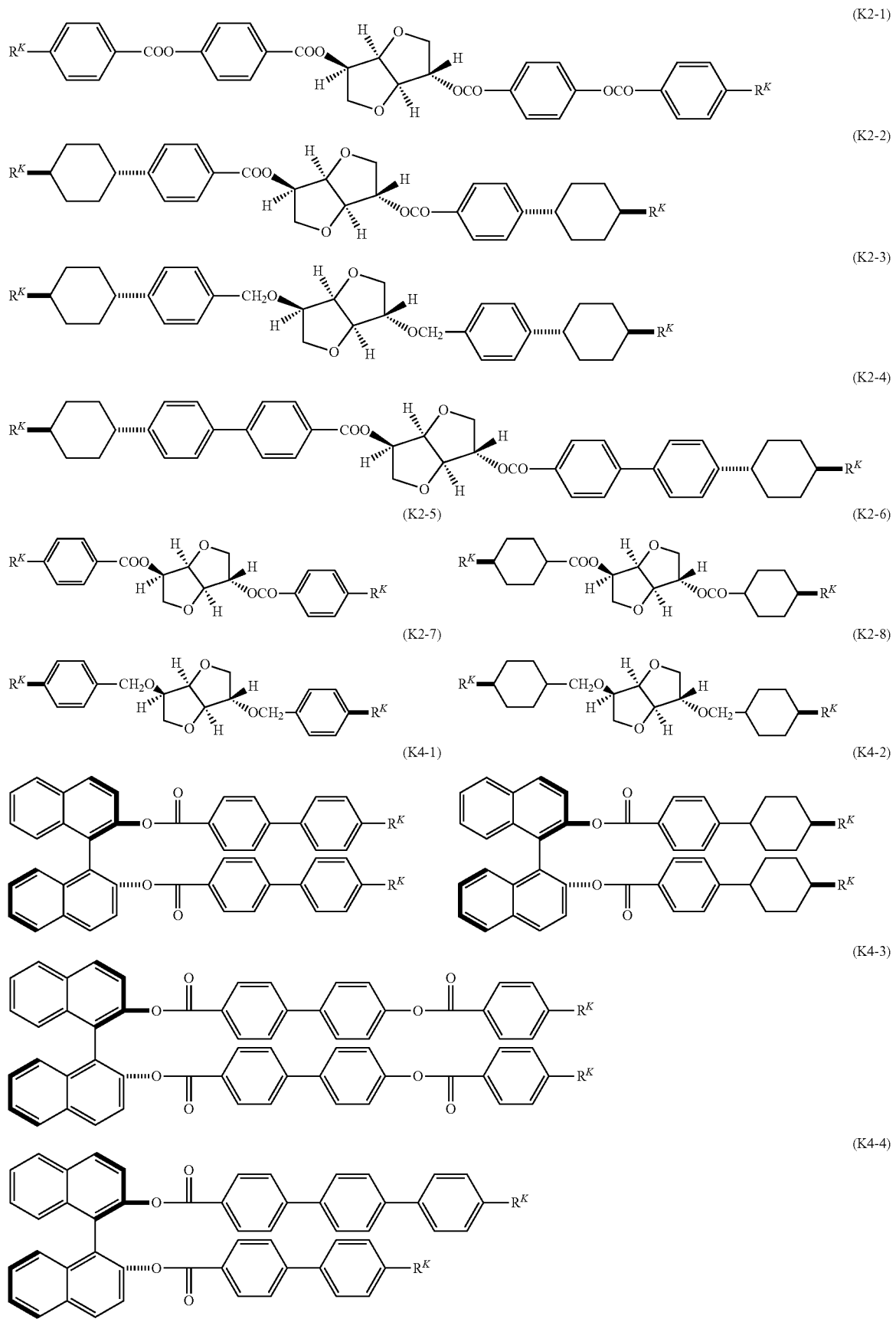

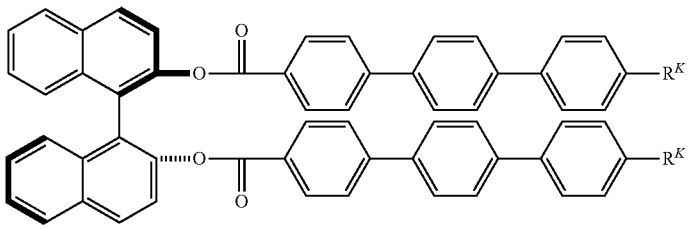

(K4-5)

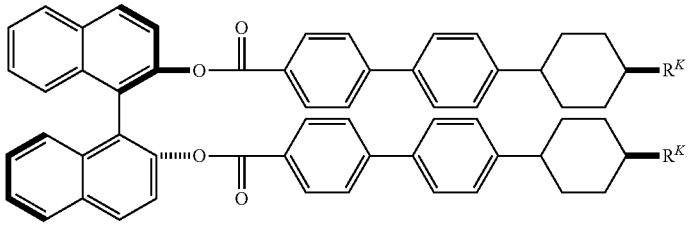

(K4-6)

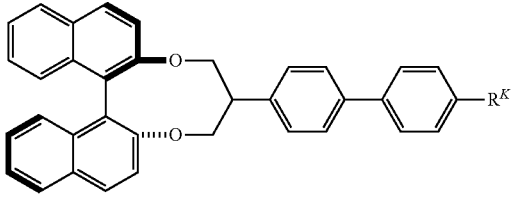

(K5-1)

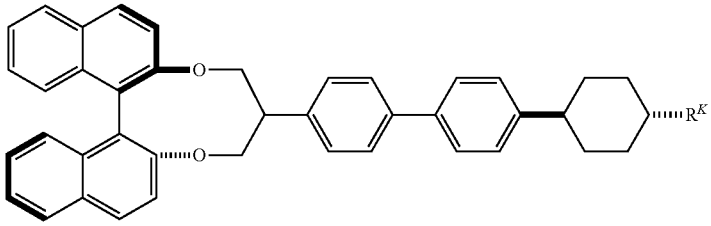

(K5-2)

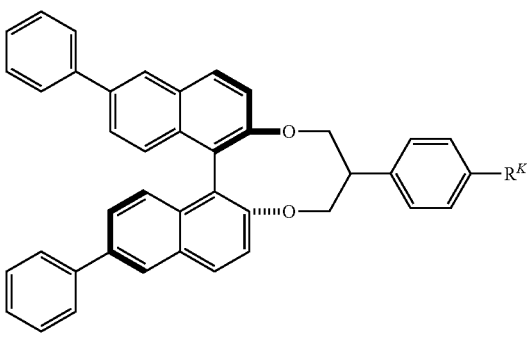

(K5-3)

In these formulae, each $R^K$ is independently $C_{3-10}$ alkyl in which the —$CH_2$— adjacent to a ring is optionally replaced by —O—, and arbitrary —$CH_2$— may be replaced by —CH=CH—.

6.3 Optically Isotropic Liquid Crystal Phase

That a liquid crystal composition has optical isotropy means that the composition exhibits optical isotropy because of macroscopically isotropic arrangement of the liquid crystal molecules but has microscopic liquid crystal order. The pitch corresponding to the microscopic liquid crystal order of the liquid crystal composition (often referred to as "pitch", hereinafter)" is preferably 700 nm or less, more preferably 500 nm or less, and even more preferably 350 nm or less.

Herein, the so-called "non-liquid crystal isotropic phase" refers to a commonly defined isotropic phase, i.e., a disorder phase, or a phase that still exhibits isotropy due to fluctuation even when a region with a non-zero local order parameter is generated. For example, an isotropic phase formed at the high temperature side of a nematic phase is equivalent to the non-liquid crystal isotropic phase in this specification. The chiral liquid crystal in this specification also has a similar definition. Moreover, the term "optically isotropic liquid crystal phase" in this specification means a liquid crystal phase that exhibits optical isotropy without fluctuation, an example of which is a phase exhibiting a platelet structure, i.e., a blue phase in narrow sense.

The optically isotropic liquid crystal composition of this invention has an optically isotropic liquid crystal phase. However, the typical platelet structure in a blue phase is not observed under a polarizing microscope. Therefore, in this specification, a phase exhibiting the platelet structure is designated as a blue phase, and an optically isotropic liquid crystal phase including a blue phase is designated as an optically isotropic liquid crystal phase. That is, the blue phase is included in the optically isotropic liquid crystal phase.

Generally, the blue phases can be divided into three types, blue phase I, blue phase II and blue phase III, which are all optically active and isotropic. In a blue phase I or II, two or more colors of diffracted light produced by Bragg reflection from different lattice planes are observed. The blue phase is generally observed between the isotropic phase and the chiral nematic phase.

That the optically isotropic liquid crystal phase does not exhibit two or more colors of diffracted light means that a platelet structure observed in a blue phase I or II is not observed and the phase substantially exhibits a single color in the entire plane. For an optically isotropic liquid crystal phase not exhibiting two or more colors of diffracted light, brightness/darkness of the color is not necessarily even in plane.

An optically isotropic liquid crystal phase not exhibiting two or more colors of diffracted light has a merit of inhibiting the intensity of the reflected light caused by Bragg reflection, or shifting toward the short wavelength side.

Further, when a liquid crystal material reflecting visible light is used in a display device, sometimes a color variation problem may occur. However, for a liquid crystal not exhibiting two or more colors of diffracted light, the reflection of visible light may be eliminated due to the pitch larger than that in a blue phase in narrow sense (a phase exhibiting the platelet structure), as a result of reflection wavelength shift toward the short wavelength side.

The optically isotropic liquid crystal composition of this invention may be obtained by adding a chiral dopant to a composition having a nematic phase, wherein the chiral dopant is preferably added in a concentration such that the pitch is 700 nm or less. Moreover, the composition having a nematic phase contains a compound of formula (1) and other necessary components. Furthermore, the optically isotropic liquid crystal composition of this invention may alternatively be obtained by adding a chiral dopant to a composition having a chiral nematic phase but no optically isotropic liquid crystal phase. The composition having a chiral nematic phase but no optically isotropic liquid phase contains a compound of formula (1), an optically active compound, and other necessary components, wherein the optically active compound is preferably added in a concentration such that the pitch is 700 nm or more to exhibit an optically isotropic liquid crystal phase. The optically active compounds to be added may be the above compounds with a large helical twisting power, that is, the compounds of formulae (K1) to (K5), and more preferably those of formulae (K2-1) to (K2-8), (K4-1) to (K4-6) and (K5-1) to (K5-3). Moreover, the optically active compound being added may not have a large helical twisting power. Such an optically active compound is, for example, one added in a liquid crystal composition for use of a device driven in a nematic phase (in TN mode or STN mode, etc.).

Examples of the compound without a large helical twisting power are the following optically active compound (Op-1) to (Op-13).

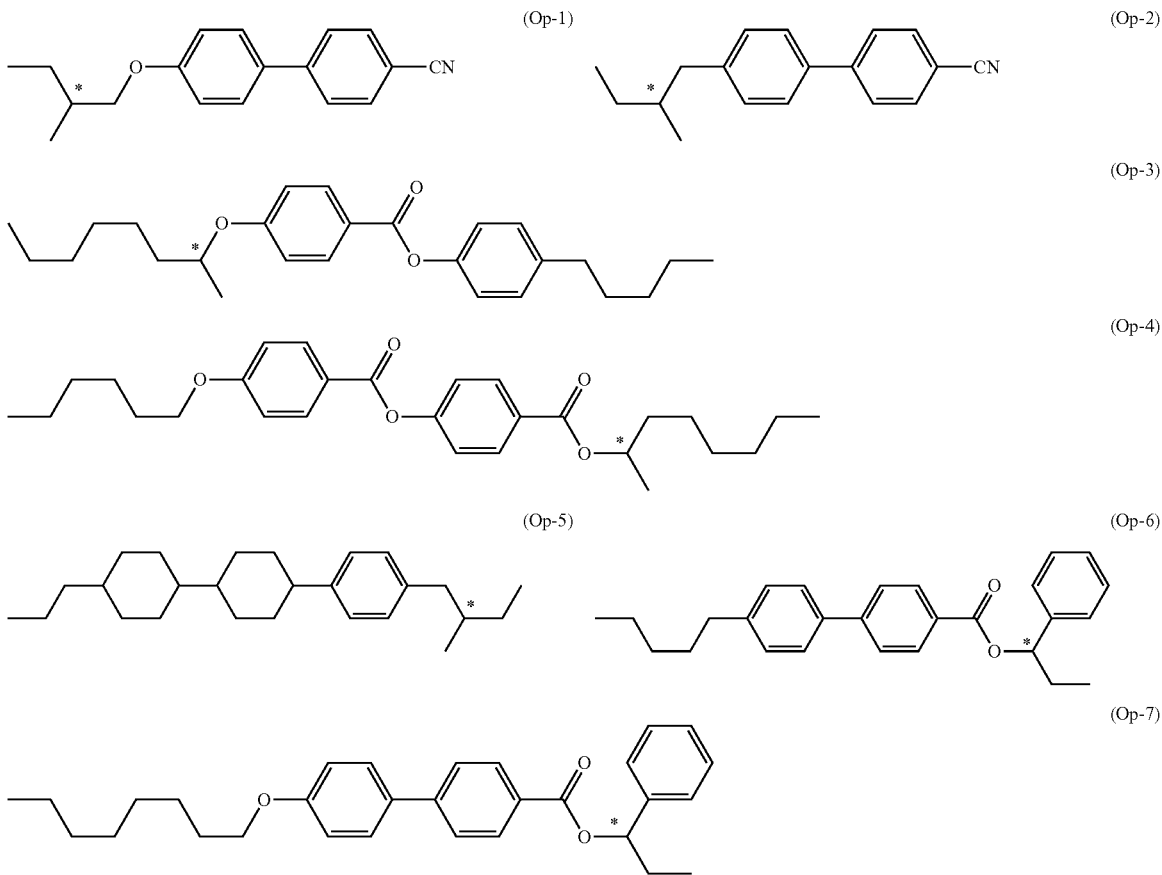

-continued

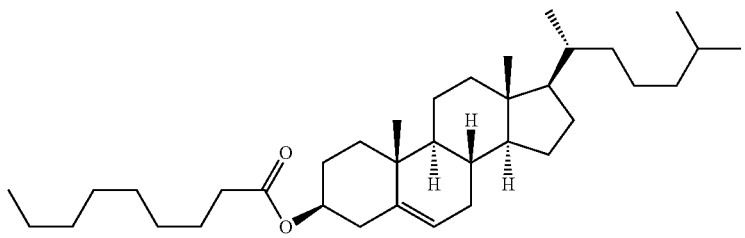
(Op-8)

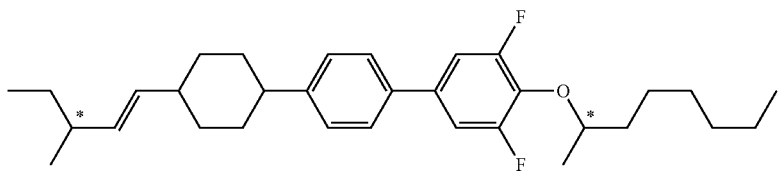
(Op-9)

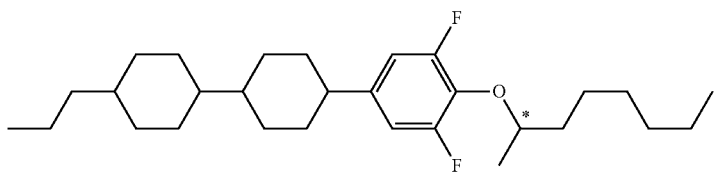
(Op-10)

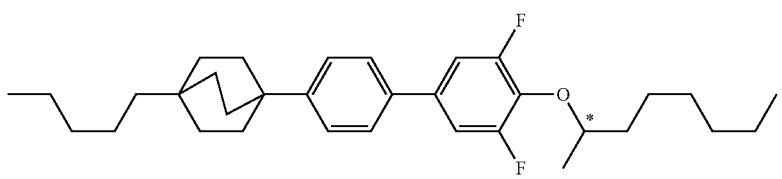
(Op-11)

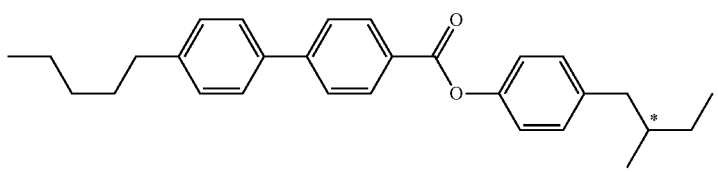
(Op-12)

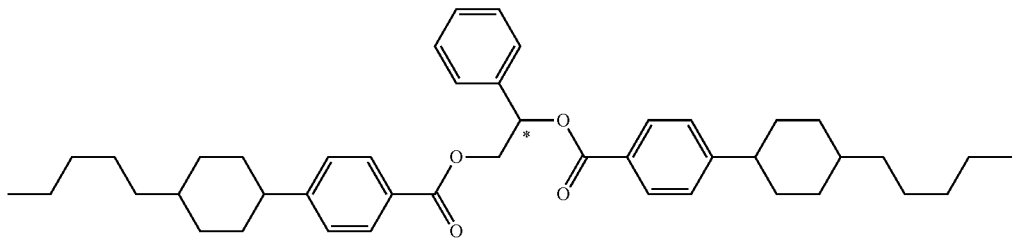
(Op-13)

Moreover, the temperature range of the optically isotropic liquid crystal composition of this invention can be broadened by adding a chiral dopant to a liquid crystal composition having a broad temperature range for the co-existence of a nematic phase or a chiral nematic phase and an isotropic phase for exhibiting an optically isotropic liquid crystal phase. For example, a composition exhibiting an optically isotropic liquid crystal phase in a broad temperature range can be prepared as follows. A liquid crystal compound having a high clearing point is mixed with a liquid crystal compound having a low clearing point to prepare a liquid crystal composition with a broad temperature range for the co-existence of a nematic phase and an isotropic phase. Then, a chiral dopant is added to the liquid crystal composition.

For a liquid crystal composition with a broad co-existence temperature range of a nematic or chiral nematic phase and an isotropic phase, the difference between the upper-limit temperature and the lower-limit temperature of the co-existence is preferably from 3° C. to 150° C., and more preferably from 5° C. to 150° C. Moreover, the liquid crystal composition preferably has a difference of 3° C. to 150° C. between the upper-limit temperature and the lower-limit temperature of the co-existence of the nematic phase and the isotropic phase.

When an electric field is applied to the liquid crystal medium of this invention in an optically isotropic liquid crystal phase, an electric-birefringence occurs but the Kerr effect does not necessarily occur.

Because the electric-birefringence of an optically isotropic liquid crystal phase increases with the pitch, the electric-birefringence can be increased by adjusting the species and content of the chiral dopant to increase the pitch, as long as other optical properties, such as transmittance and diffraction wavelength etc., could be satisfied.

6-4. Other Components

Other compounds, such as a polymer material, may be further added into the optically isotropic liquid crystal composition of this invention, so long as they do not affect the properties of the composition. In addition to the polymer material, the liquid crystal composition of this invention may also contain, for example, a dichroic dye or a photochromic compound. Examples of the dichroic dye include merocyanine dyes, styryl dyes, azo dyes, azomethine dyes, azoxy dyes, quinophthalone dyes, anthraquinone dyes, tetrazine dyes and so on.

7. Optically Isotropic Polymer/Liquid Crystal Composite Material

The $7^{th}$ aspect of this invention is a composite material of a polymer and a liquid crystal composition containing a compound of formula (1) and a chiral dopant, which exhibits optical isotropy. The polymer/liquid crystal composite material can be used in an optical device driven in an optically isotropic liquid crystal phase, which may include the liquid crystal composition (CLC) according to any of items [1]-[31] and a polymer.

The term "polymer/liquid crystal composite material" of this invention has no particular limitation, as long as it is a composite containing both a liquid crystal material and a polymeric compound, wherein the polymer may be partially or entirely not dissolved in the liquid crystal material so that the polymer is separated from the liquid crystal material. Further, in this specification, a nematic phase refers to one in narrow sense but does not include a chiral nematic phase, unless specifically indicated.

The optically isotropic polymer/liquid crystal composite material according to a preferred aspect of this invention can exhibit an optically isotropic liquid crystal phase in a broad temperature range. Moreover, the polymer/liquid crystal composite material according to a preferred aspect of this invention has very high response speed. Based on such effects, the polymer/liquid crystal composite material according to a preferred aspect of this invention is useful in an optical device such as a display device.

7-2 Polymer

Though the composite material of this invention can be produced by mixing an optically isotropic liquid crystal composition with a pre-polymerized polymer, it is preferably produced by mixing a low molecular weight monomer, macromonomer or oligomer, etc. (generally referred to as "monomer", hereinafter) as a raw material of the polymer with the liquid crystal composition CLC and then polymerizing the mixture. In this specification, the mixture containing the monomer and the liquid crystal composition is referred to as "polymerizable monomer/liquid crystal mixture", which may optionally contain a polymerization initiator, a curing agent, a catalyst, a stabilizer, a dichroic dye or a photochromic compound, etc., without compromising the effects of this invention. For example, if required, the polymerizable monomer/liquid crystal mixture of this invention may contain 0.1-20 weight parts of a polymerization initiator, relative to 100 weight parts of the polymerizable monomer.

The polymerization temperature is preferably such that the polymer/liquid crystal composite material exhibits high transparency and isotropy, and more preferably such that the mixture of the monomer and the liquid crystal material exhibits an isotropic phase or a blue phase, while the polymerization is carried out in the isotropic phase or optically isotropic liquid crystal phase. That is, the polymerization temperature is preferably set such that after the polymerization, the polymer/liquid crystal composite material substantially does not scatter light of wavelength greater than that of visible light and exhibit optical isotropy.

For example, a low molecular weight monomer, macromonomer or oligomer can be used as a raw material of the polymer constituting the composite material of this invention. In this specification, the raw-material monomer of the polymer covers low molecular weight monomers, macromonomers and oligomers, etc. Furthermore, the obtained polymer preferably has a three-dimensional cross-linked structure, and hence the raw-material monomer of the polymer is preferably a multi-functional monomer having two or more polymerizable functional groups. The polymerizable functional groups have no particular limitation; examples thereof include acryloyl, methacryloyl, glycidyl, epoxy, oxetanyl, vinyl and so on. In view of the polymerization rate, acryloyl and methacryloyl are preferred. It is preferred that the raw material monomers of the polymer contain 10 wt % or more of a monomer having two or more polymerizable functional groups, since the obtained composite material of this invention can easily exhibit high transparency and isotropy.

Moreover, in order to obtain a suitable composite material, the polymer preferably has mesogen moieties, and a part or all of the raw material monomers of the polymer used can have a mesogen moiety.

7-2-1. Mono- and Di-Functional Monomers Having a Mesogen Moiety

The mono- and di-functional monomers having a mesogen moiety has no particular limitation in structure, and can be, for example, the compounds of formula (M1) or (M2) below.

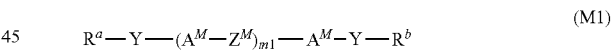

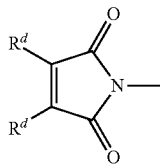
(M3-4)

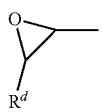
(M3-5)

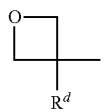
(M3-6)

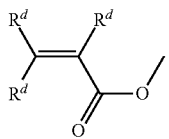
(M3-7)

In formula (M1), $R^a$ is hydrogen, halogen, —C≡N, —N═C═O, —N═C═S, or $C_{1-20}$ alkyl in which arbitrary —$CH_2$— may be replaced by —O—, —S—, —CO—, —COO— or —OCO—, arbitrary —$CH_2$—$CH_2$— may be replaced by —CH═CH—, —CF═CF— or —C≡C— and arbitrary hydrogen atom may be replaced by halogen or —C≡N. Each $R^b$ is independently a polymerizable functional group of one of formulae (M3-1) to (M3-7).

$R^a$ is preferably hydrogen, halogen, —C≡N, —$CF_3$, —$CF_2H$, —$CFH_2$, —$OCF_3$, —$OCF_2H$, $C_{1-20}$ alkyl, $C_{1-19}$ alkoxy, $C_{2-21}$ alkenyl or $C_{2-21}$ alkynyl, and is particularly preferably —C≡N, $C_{1-20}$ alkyl or $C_{1-19}$ alkoxy.

In formula (M2), each $R^b$ is independently a polymerizable functional group of one of formulae (M3-1) to (M3-7).

In formulae (M3-1) to (M3-7), each $R^d$ is independently hydrogen, halogen, or $C_{1-5}$ alkyl in which arbitrary hydrogen may be replaced by halogen. $R^d$ is preferably hydrogen, halogen or methyl, and is particularly preferably hydrogen, fluorine or methyl.

Moreover, the compounds of formulae (M3-2), (M3-3), (M3-4) and (M3-7) are preferably polymerized with free radicals. The compounds of formulae (M3-1), (M3-5) and (M3-6) are preferably polymerized with cations. The above polymerizations are all active polymerization, and are initiated as a small amount of free radical or cationic active species is generated in the reaction system. To accelerate generation of the active species, a polymerization initiator can be used. The active species can be generated with light or heat.

In formulae (M1) and (M2), each $A^M$ is independently an aromatic or non-aromatic five-member ring, six-member ring or fused ring of 9 or more carbons, in which —$CH_2$— may be replaced by —O—, —S—, —NH— or —$NCH_3$—, —CH═ may be replaced by —N═, and hydrogen may be replaced by halogen, $C_{1-5}$ alkyl or $C_{1-5}$ haloalkyl. Specific examples of preferred $A^M$ are 1,4-cyclohexylene, 1,4-cyclohexenylene, 1,4-phenylene, naphthalene-2,6-diyl, tetrahydronaphthalene-2,6-diyl, fluorene-2,7-diyl and bicyclo[2.2.2]octan-1,4-diyl. In these rings, arbitrary —$CH_2$— may be replaced by —O—, arbitrary —CH═ may be replaced by —N═, and arbitrary hydrogen may be replaced by halogen, $C_{1-5}$ alkyl or $C_{1-5}$ haloalkyl.

In consideration of the stability of the compound, —$CH_2$—O—$CH_2$—O— with two oxygen atoms not adjacent to one another is preferred to —$CH_2$—O—O—$CH_2$— with two oxygen atoms adjacent to one another. This also applies to the case of sulfur.

Among these rings, 1,4-cyclohexylene, 1,4-cyclohexenylene, 1,4-phenylene, 2-fluoro-1,4-phenylene, 2,3-difluoro-1,4-phenylene, 2,5-difluoro-1,4-phenylene, 2,6-difluoro-1,4-phenylene, 2-methyl-1,4-phenylene, 2-trifluoromethyl-1,4-phenylene, 2,3-bis(trifluoromethyl)-1,4-phenylene, naphthalene-2,6-diyl, tetrahydronaphthalene-2,6-diyl, fluorene-2,7-diyl, 9-methylfluorene-2,7-diyl, 1,3-dioxan-2,5-diyl, pyridine-2,5-diyl and pyrimidin-2,5-diyl are particularly preferred for $A^M$. Furthermore, the stereo configuration of 1,4-cyclohexylene and 1,3-dioxan-2,5-diyl above is in the trans-form superior to in the cis-form.

Because 2-fluoro-1,4-phenylene and 3-fluoro-1,4-phenylene are identical in the structure, the latter is not exemplified. This also applies to the case of the relationship between 2,5-difluoro-1,4-phenylene and 3,6-difluoro-1,4-phenylene, etc.

In formulae (M1) and (M2), each Y is independently a single bond, or $C_{1-20}$ alkylene in which arbitrary —$CH_2$— may be replaced by —O— or —S—, and arbitrary —$CH_2$—$CH_2$— may be replaced by —CH═CH—, —C≡C—, —COO— or —OCO—. Y is preferably a single bond, —$(CH_2)_{m2}$—, —$O(CH_2)_{m2}$— or —$(CH_2)_{m2}O$—, wherein m2 is an integer of 1 to 20. Y is particularly preferably a single bond, —$(CH_2)_{m2}$—, —$O(CH_2)_{m2}$— or —$(CH_2)_{m2}O$—, wherein m2 is an integer of 1 to 10. In consideration of the stability of the compound, —Y—$R^a$ and —Y—$R^b$ preferably include no —O—O—, —O—S—, —S—O— or —S—S—.

In formulae (M1) and (M2), each $Z^M$ is independently a single bond, —$(CH_2)_{m3}$—, —$O(CH_2)_{m3}$—, —$(CH_2)_{m3}O$—, —$O(CH_2)_{m3}O$—, —CH═CH—, —C≡C—, —COO—, —OCO—, —$(CF_2)_2$—, —$(CH_2)_2$—COO—, —OCO—$(CH_2)_2$—, —CH═CH—COO—, —OCO—CH═CH—, —C≡C—COO—, —OCO—C≡C—, —CH═CH—$(CH_2)_2$—, —$(CH_2)_2$—CH═CH—, —CF═CF—, —C≡C—CH═CH—, —CH═CH—C≡C—, —$OCF_2$—$(CH_2)_2$—, —$(CH_2)_2$—$CF_2O$—, —$OCF_2$— or —$CF_2O$—, wherein m3 is an integer of 1-20.

$Z^M$ is preferably a single bond, —$(CH_2)_{m3}$—, —$O(CH_2)_{m3}$—, —$(CH_2)_{m3}O$—, —CH═CH—, —C≡C—, —COO—, —OCO—, —$(CH_2)_2$—COO—, —OCO—$(CH_2)_2$—, —CH═CH—COO—, —OCO—CH═CH—, —$OCF_2$— or —$CF_2O$—.

In formulae (M1) and (M2), m1 is an integer of 1-6, preferably an integer of 1-3. When m1 is 1, they are bicyclic compounds with two rings such as six-member rings. When m1 is 2 or 3, they are tricyclic or tetracyclic compounds. For example, when m1 is 1, the two $A^M$'s can be identical or different. Moreover, when m1 is 2, the three $A^M$'s (or two $Z^M$'s) can be identical or different. When m1 is from 3 to 6, it is also the case. This also applies to respective cases of $R^a$, $R^b$, $R^d$, $Z^M$, $A^M$ and Y.

Even when the compound (M1) of formula (M1) or the compound (M2) of formula (M2) contains an isotope, such as $^2H$ (deuterium) and $^{13}C$, in an amount higher than the natural abundance, it is useful due to the identical properties thereof.

More preferred examples of the compounds (M1) and (M2) are compounds (M1-1) to (M1-41) and (M2-1) to (M2-27) of formulae (M1-1) to (M1-41) and (M2-1) to (M2-27). In these compounds, $R^a$, $R^b$, $R^d$, $Z^M$ and Y are defined as in the cases of formulae (M1) and (M2) in the above aspects of this invention.

The following partial structures of the compounds (M1-1) to (M1-41) and (M2-1) to (M2-27) are described now. The partial structure (a1) represents 1,4-phenylene in which arbitrary hydrogen is replaced by fluorine. The partial structure (a2) represents 1,4-phenylene in which arbitrary hydrogen may be replaced by fluorine. The partial structure (a3) represents 1,4-phenylene in which arbitrary hydrogen may be replaced by fluorine or methyl. The partial structure (a4) represents fluorenylene in which the hydrogen at position 9 may be replaced by methyl.

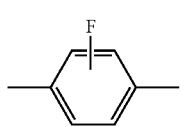
(a1)

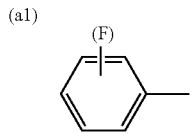
(a2)

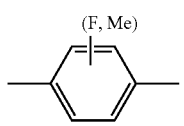
(a3)

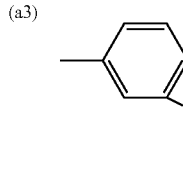
(a4)

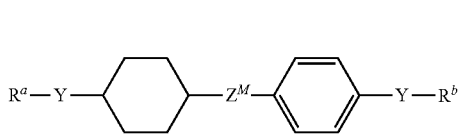
(M1-1)

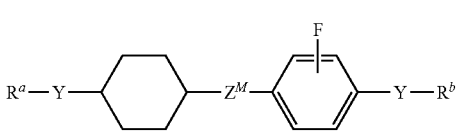
(M1-2)

(M1-3)

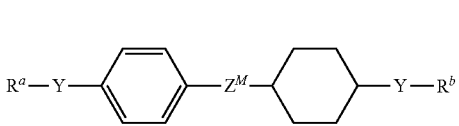
(M1-4)

(M1-5)

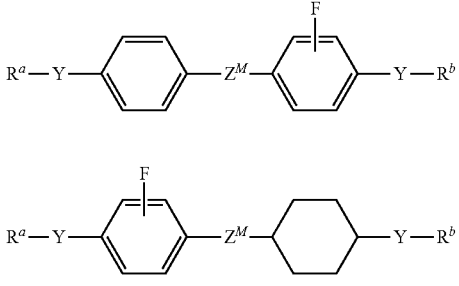
(M1-6)

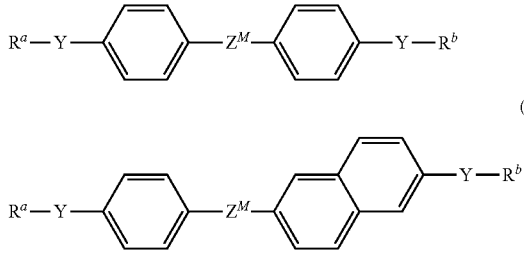
(M1-7)

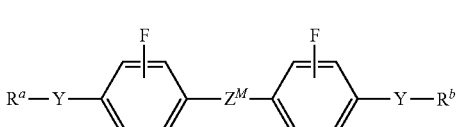
(M1-8)

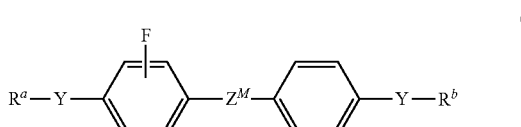
(M1-9)

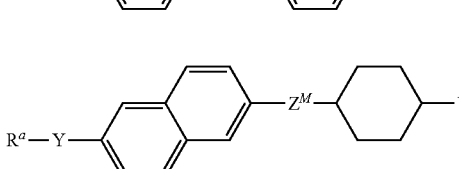
(M1-10)

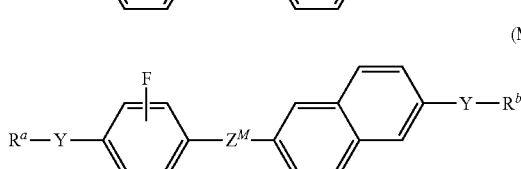
(M1-11)

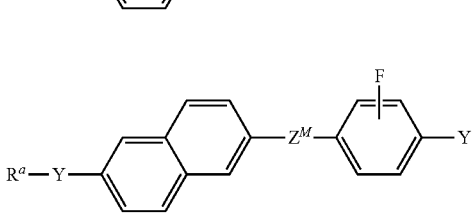
(M1-12)

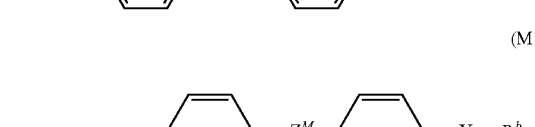
(M1-13)

(M1-14)

-continued
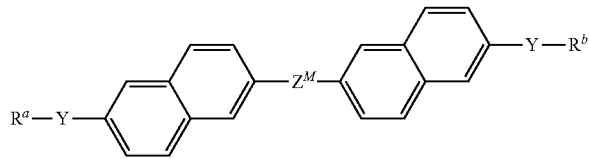
(M1-15)
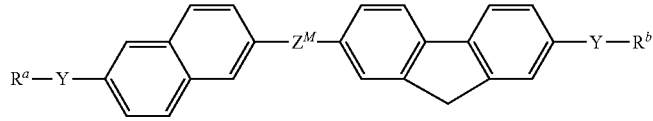
(M1-16)
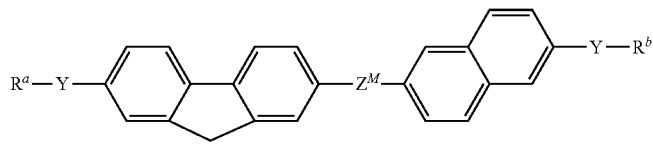
(M1-17)
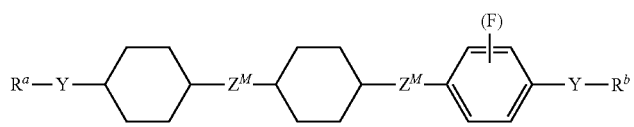
(M1-18)
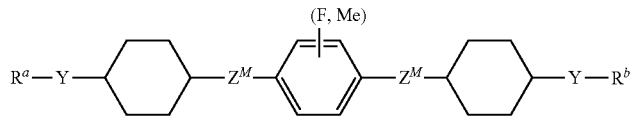
(M1-19)
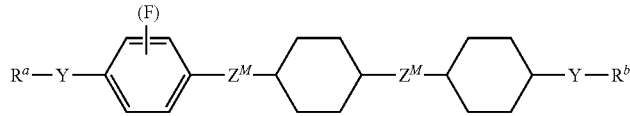
(M1-20)
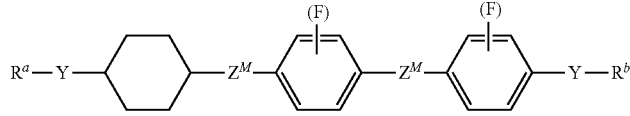
(M1-21)
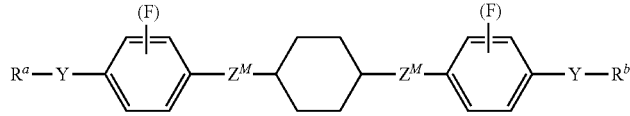
(M1-22)
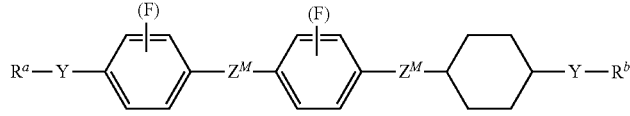
(M1-23)
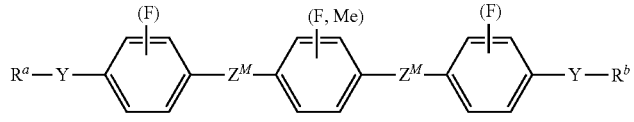
(M1-24)
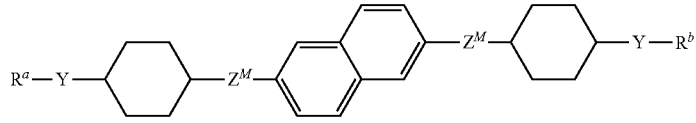
(M1-25)

-continued
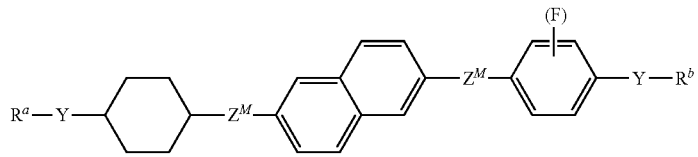
(M1-26)
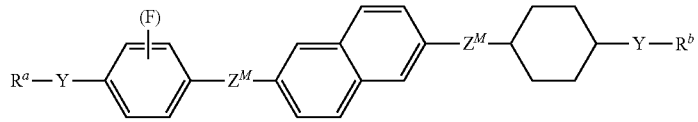
(M1-27)
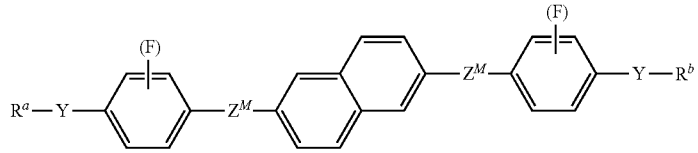
(M1-28)
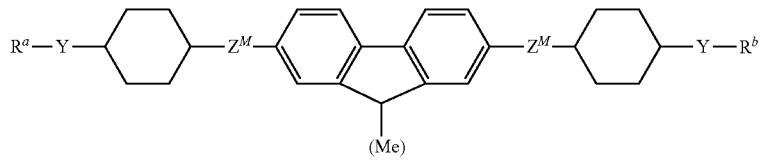
(M1-29)
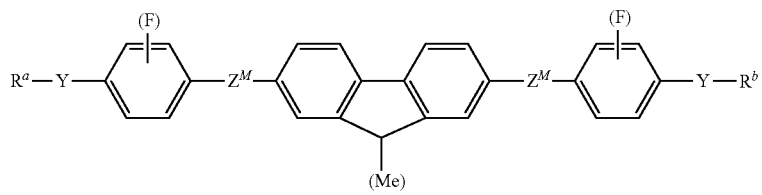
(M1-30)
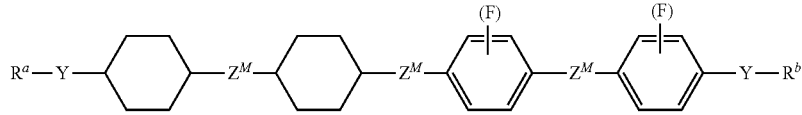
(M1-31)
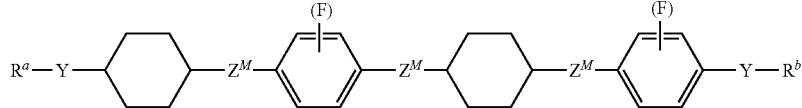
(M1-32)
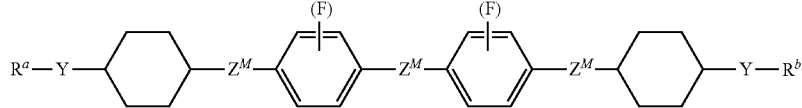
(M1-33)
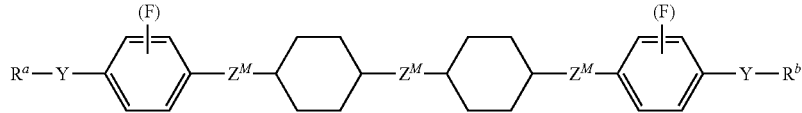
(M1-34)
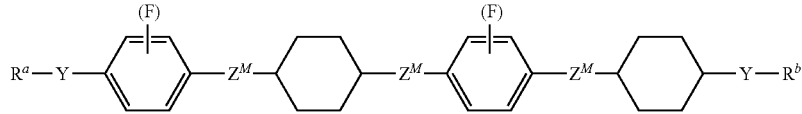
(M1-35)
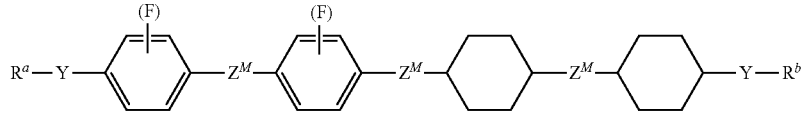
(M1-36)

(M1-37) 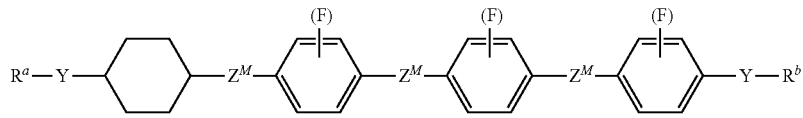
(M1-38) 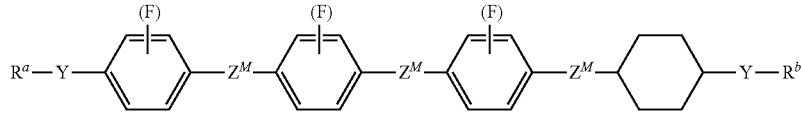
(M1-39) 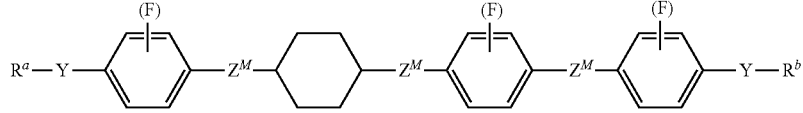
(M1-40) 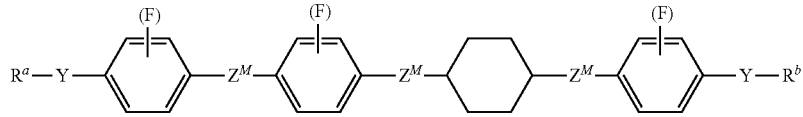
(M1-41) 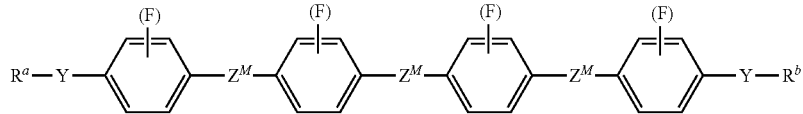
(M2-1) 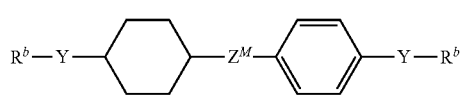
(M2-2) 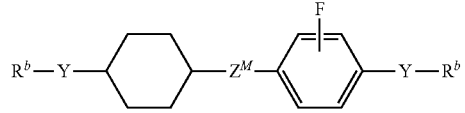
(M2-3) 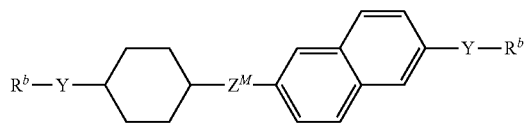
(M2-4) 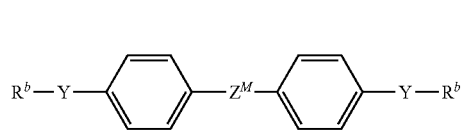
(M2-5) 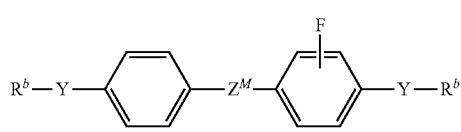
(M2-6) 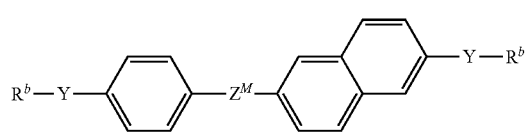
(M2-7) 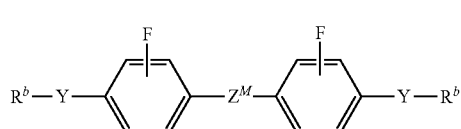
(M2-8) 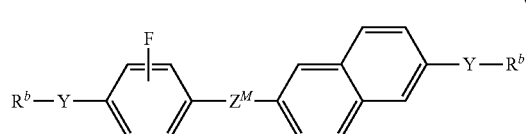
(M2-9) 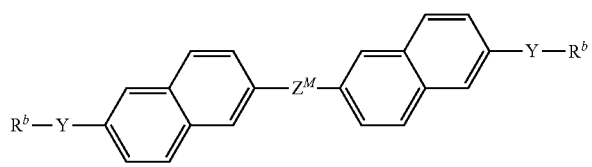
(M2-10) 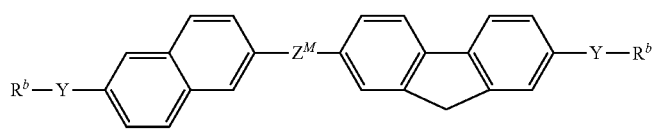

-continued
(M2-11)
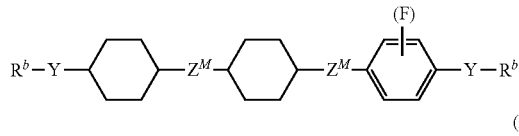
(M2-12)
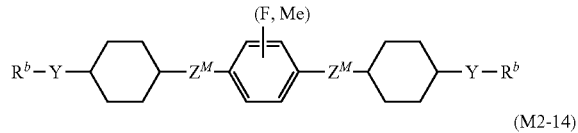
(M2-13)
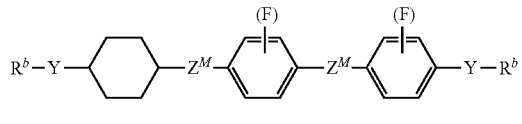
(M2-14)
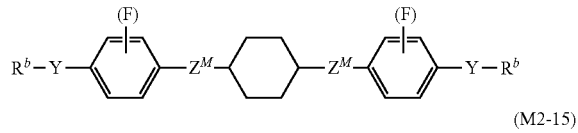
(M2-15)
(M2-16)
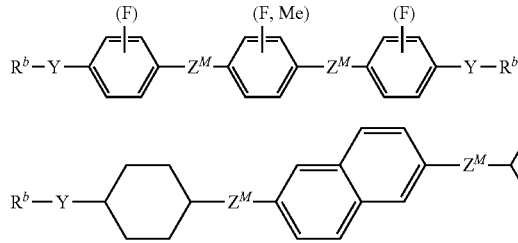
(M2-17)
(M2-18)
(M2-19)
(M2-20)
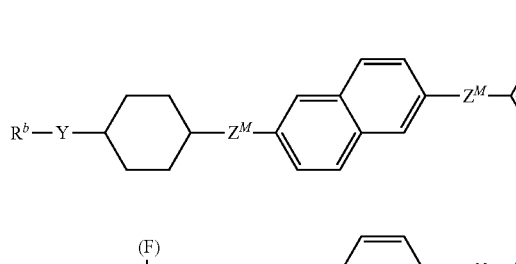
(M2-21)
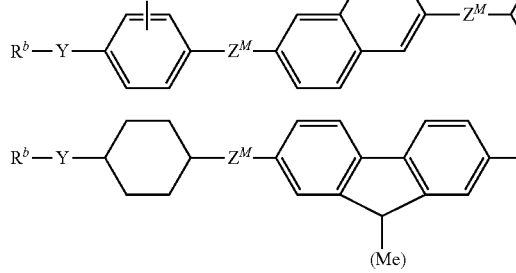
(M2-22)
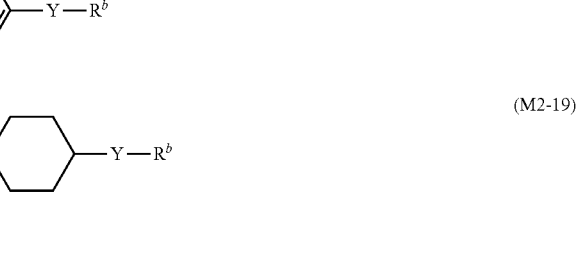
(M2-23)
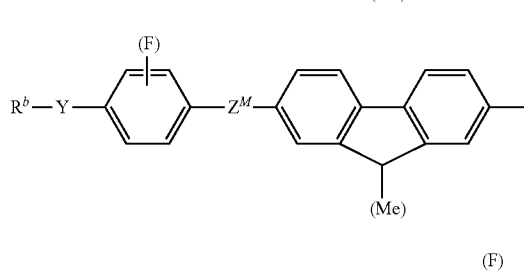
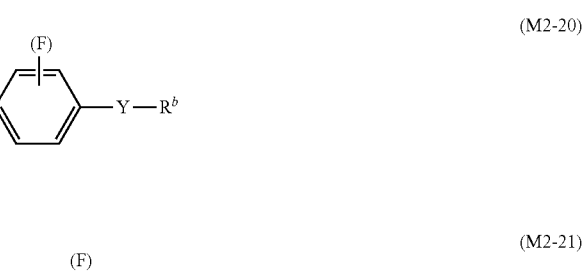

-continued

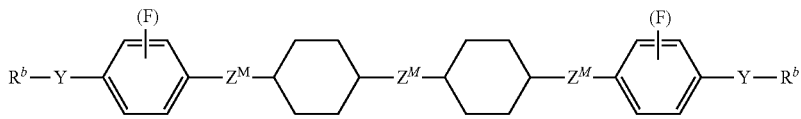
(M2-24)

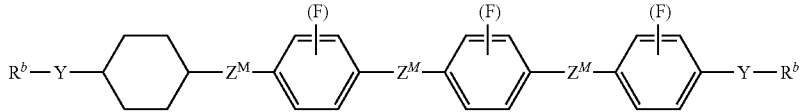
(M2-25)

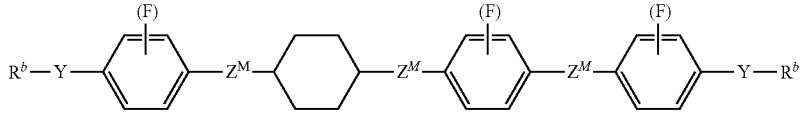
(M2-26)

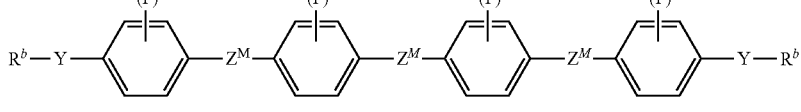
(M2-27)

A monomer having no aforementioned mesogen moiety, and a polymerizable compound having a mesogen moiety other than the monomers (M1) and (M2) can be used, if required.

In order to optimize the optical isotropy of the polymer/liquid crystal composite material of this invention, a monomer having a mesogen moiety and three or more polymerizable functional groups can be used. Such a monomer may be a well-known compound, for example, one of formulae (M4-1) to (M4-3), and more specifically a compound described in Japanese Patent Publication Nos. 2000-327632, 2004-182949 and 2004-59772. In formulae (M4-1)-(M4-3), $R^b$, Za, Y and (F) are defined as above.

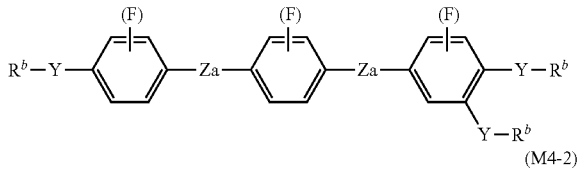
(M4-1)

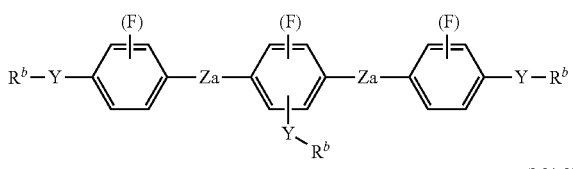
(M4-2)

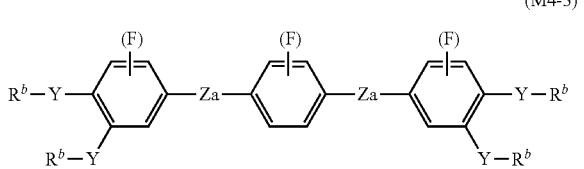
(M4-3)

8-2-2. Monomer Having No Mesogen Moiety and Having Polymerizable Functional Groups Examples of the monomer having no mesogen moiety and having polymerizable groups are straight and branched acrylates of 1-30 carbon atoms, straight and branched diacrylates of 1-30 carbon atoms, and monomers having three or more polymerizable groups. Examples of the monomers having three or more polymerizable groups are, but not limited to, glycerol.propoxylate (1PO/OH) triacrylate, pentaerythritol-.propoxylate.triacrylate, pentaerythritol.triacrylate, trimethylolpropane.ethoxylate.triacrylate, trimethylolpropane.propoxylate.triacrylate, trimethylolpropane.triacrylate, di(trimethylolpropane)tetraacrylate, pentaerythritol.tetraacrylate, di(pentaerythritol)pentaacrylate, di(pentaerythritol)hexaacrylate and trimethylolpropane.triacrylate.

7-2-3. Polymerization Initiator

The polymerization reaction for producing the polymer constituting the composite material of this invention is not particularly limited, and may be, e.g., photo-radical polymerization, thermo-radical polymerization or photo-cationic polymerization, etc.

The polymerization initiators useful for photo-radical polymerization are, for example, DAROCUR™ 1173 and 4265 (both are trade names, from BASF Japan Ltd.) and IRGACURE™ 184, 369, 500, 651, 784, 819, 907, 1300, 1700, 1800, 1850 and 2959 (all are trade names, from BASF Japan Ltd.).

Preferred examples of the initiators causing radical polymerization with heat and being useful in thermo-radical polymerization are: benzoyl peroxide, diisopropyl peroxydicarbonate, t-butyl peroxy2-ethylhexanoate, t-butyl peroxypivalate, t-butyl peroxydiisobutyrate, lauroyl peroxide, dimethyl 2,2'-azobisisobutyrate (MAIB), di-t-butyl peroxide (DTBPO), azobisisobutyronitrile (AIBN) and azobiscyclohexanecarbonitrile (ACN), etc.

Examples of polymerization initiators useful in photo-cationic polymerization are diaryliodonium salt (referred to as "DAS", hereinafter) and triarylsulfonium salt (referred to as "TAS", hereinafter), etc.

Examples of DAS are diphenyliodonium tetrafluoroborate, diphenyliodonium hexafluorophosphonate, diphenyliodonium hexafluoroarsenate, diphenyliodonium trifluoromethanesulfonate, diphenyliodonium trifluoroacetate, diphenyliodonium p-toluenesulfonate, diphenyliodonium tetrakis(pentafluorophenyl)borate, 4-methoxyphenylphenyliodonium tetrafluoroborate, 4-methoxyphenylphenyliodonium hexafluorophosphonate, 4-methoxyphenylphenyliodonium hexafluoroarsenate, 4-methoxyphenylphenyliodonium trifluoromethanesulfonate, 4-methoxyphenylphenyliodonium trifluoroacetate, and 4-methoxyphenylphenyliodonium p-toluenesulfonate.

DAS can be sensitized by adding a photosensitizer, such as thioxanthone, phenothiazine, chlorothioxanthone, xanthone, anthracene, diphenyl anthracene or rubrene, etc.

Examples of TAS are triphenylsulfonium tetrafluoroborate, triphenylsulfonium hexafluorophosphonate, triphenylsulfonium hexafluoroarsenate, triphenylsulfonium trifluoromethanesulfonate, triphenylsulfonium trifluoroacetate, triphenylsulfonium p-toluenesulfonate, triphenylsulfonium tetrakis(pentafluorophenyl)borate, 4-methoxyphenyldiphenylsulfonium tetrafluoroborate, 4-methoxyphenyldiphenylsulfonium hexafluorophosphonate, 4-methoxyphenyldiphenylsulfonium hexafluoroarsenate, 4-methoxyphenyldiphenylsulfonium trifluoromethanesulfonate, 4-methoxyphenyldiphenylsulfonium trifluoroacetate, and 4-methoxyphenyldiphenylsulfonium p-toluenesulfonate, etc.

Specific examples of the photo-cationic polymerization initiator are Cyracure™ UVI-6990, UVI-6974 and UVI-6992 (all are trade names, from UCC Corporation), ADEKA OPTOMER™ SP-150, SP-152, SP-170 and SP-172 (all are trade names, from ADEKA Corporation), Rhodorsil Photoinitiator™2074 (trade name, from Rhodia Japan Corporation), IRGACURE™250 (trade name, from BASF Japan Ltd.) and UV-9380C (trade name, from GE/Toshiba Silicone Co. Ltd.), etc.

7-2-4. Curing Agents and Others

In preparing the polymer constituting the composite material of this invention, in addition to the monomers and polymerization initiator mentioned above, other suitable component(s), for example, curing agent, catalyst and/or stabilizer may also be added.

The well-known latent curing agents commonly used for epoxy resins can be used. Examples of the latent curing agents for epoxy resins are amine curing agents, Novolac curing agents, imidazole curing agents and anhydride curing agents, etc. Examples of amine curing agents are aliphatic polyamines such as diethylenetriamine, triethylenetetraamine, tetraethylenepentaamine, m-xylenediamine, trimethyl hexanediamine, 2-methyl-pentanediamine and diethylaminopropylamine; alicyclic polyamines such as isophorone diamine, 1,3-diaminomethylcyclohexane, bis(4-aminocyclohexyl)methane, norbornenediamine, 1,2-diaminocyclohexane and Laromin; and aromatic polyamines such as diaminodiphenylmethane, diaminodiphenylethane and m-phenylenediamine, etc.

Examples of the Novolac curing agents are phenol/Novolac resin, bisphenol/Novolac resin, etc. Examples of the imidazole curing agents are 2-methylimidazole, 2-ethylhexylimidazole, 2-phenylimidazole and 1-cyanoethyl-2-phenylimidazolium trimellitate, etc.

Examples of the anhydride curing agents are tetrahydrophthalic anhydride, hexahydrophthalic anhydride, methyltetrahydrophthalic anhydride, methylhexahydrophthalic anhydride, methylcyclohexene tetracarboxylic dianhydride, phthalic anhydride, trimellitic anhydride, pyromellitic anhydride, and benzophenonetetracarboxylic dianhydride, etc.

Furthermore, a curing promoter may also be used to facilitate the curing reaction of a polymerizable compound with glycidyl, epoxy or oxetanyl and the curing agent. Examples of the curing promoter are tertiary amines such as benzyldimethylamine, tris(dimethylaminomethyl)phenol and dimethylcyclohexylamine; imidazoles such as 1-cyanoethyl-2-ethyl-4-methylimidazole and 2-ethyl-4-methylimidazole; organophosphorus compounds such as triphenylphosphine; quaternary phosphosium salts such as tetraphenylphosphosium bromide; diazobicyclo alkenes such as 1,8-diazobicyclo-[5.4.0]undecene-7 or an organic acid salt thereof; quaternary ammonium salts such as tetraethylammonium bromide and tetrabutylammonium bromide; boron compounds such as boron trifluoride and triphenyl borate, etc. These curing promoters can be used alone, or in a combination of two or more.

Moreover, a stabilizer is preferably added to prevent unwanted polymerization, for example, during storage. The stabilizer can be any compound well known to a person of ordinary skill in the art; representative examples thereof are 4-ethoxyphenol, hydroquinone and butylated hydroxytoluene (BHT), etc.

7-3. Content of Liquid Crystal Composition, Etc

The content of the liquid crystal composition in the polymer/liquid crystal composite material of this invention is preferably as high as possible, so long as it is within a range in which the composite material can exhibit an optically isotropic liquid crystal phase. This is because the electric-birefringence of the composite material of this invention is greater when the content of the liquid crystal composition is higher.

In the polymer/liquid crystal composite material of this invention, the content of the liquid crystal composition is preferably 60-99 wt %, more preferably 60-95 wt % and particularly preferably 65-95 wt %, relative to the composite material. The content of the polymer is preferably 1-40 wt %, more preferably 5-40 wt % and particularly preferably 5-35 wt %, relative to the composite material.

7-4. Other Components

The polymer/liquid crystal composite material of this invention may also contain, for example, a dichroic dye and a photochromic compound, without compromising the effects of this invention.

This invention is further described with reference to the examples, but is not limited thereto. Furthermore, "%" denotes "wt %", unless specifically indicated.

8. Optical Device

The $8^{th}$ aspect of this invention is an optical device, which contains the liquid crystal composition or the polymer/liquid crystal composite material (both referred to as "liquid crystal medium" hereinafter) and is driven in an optically isotropic liquid crystal phase.

The liquid crystal medium is optically isotropic in absence of an electric field but exhibits an optical anisotropy in presence of an electric field, so that optical modulation can be achieved with an electric field.

The structure of the liquid crystal display device is, for example, shown in FIG. 1, in which the electrodes on the comb-like electrode substrate are arranged such that parts of the electrode 1 extending from the left side and parts of the electrode 2 extending from the right side are alternatively arranged. When there is a potential difference between the electrodes 1 and 2, the comb-like electrode substrate is provided with an electric field in two directions (upward and downward), as shown in FIG. 1.

EXAMPLES

An obtained compound was characterized with the proton nuclear magnetic resonance ($^1$H-NMR) spectrum and the gas chromatogram obtained from the gas chromatography (GC) analysis. The analysis methods are firstly described below.

$^1$H-NMR analysis: $^1$H-NMR analysis was carried out using DRX-500 (made by Bruker BioSpin). In the measurement, a sample prepared in an example was dissolved in a deuterated solvent capable of dissolving the sample, such as $CDCl_3$, and was then measured with the NMR apparatus of 500 MHz at room temperature in 24 times of accumulation. In the resulting NMR spectrum, "s" denotes singlet, "d" denotes doublet, "t" denotes triplet, "q" denotes quartet and "m" denotes multiplet. Tetramethylsilane (TMS) was used as the standard of zero chemical shift (5).

GC analysis: GC analysis was carried out using a GC apparatus Model GC-14B (made by Shimadzu Corporation). The column was the capillary column CBP1-M25-025 (length=25 m, inner diameter=0.22 mm, film thickness=0.25 m) made by Shimadzu Corporation, and the stationary liquid phase was dimethylpolysiloxane (without polarity). The carrier gas was helium, in a flow rate adjusted to 1 ml/min. The sample evaporation chamber was set at 300° C., and the detector (flame ionization detector, FID) was set at 300° C.

A sample was dissolved in toluene to give a solution of 1 wt %, and then 1 μl of the solution was injected into the sample evaporation chamber.

The recorder used was Chromatopac Model C-R6A made by Shimadzu Corporation, or an equivalent thereof. The resulting gas chromatogram showed peak retention times and peak areas corresponding to the component compounds.

The solvent for diluting the sample was, for example, chloroform or hexane, etc. The column used was, for example, capillary column DB-1 (length=30 m, inner diameter=0.32 mm, film thickness=0.25 μm) made by Agilent Technologies Inc., HP-1 (length=30 m, inner diameter=0.32 mm, film thickness=0.25 μm) made by Agilent Technologies Inc., Rtx-1 (length=30 m, inner diameter=0.32 mm, film thickness=0.25 μm) made by Restek Corporation, or BP-1 (length=30 m, inner diameter=0.32 mm, film thickness=0.25 μm) made by SGE International Pty. Ltd.

The area ratios of the peaks in the gas chromatogram correspond to the ratios of the component compounds. Generally, the weight percentages of the component compounds in the analyzed sample are not completely identical to the area percentages of the peaks. In this invention, however, when the above columns are used, the correction coefficient is substantially equal to one, and therefore the weight percentages of the component compounds in the analyzed sample are substantially equivalent to the area percentages of the peaks. This is because there is no significant difference among the correction coefficients of the component compounds. In order to more accurately calculate the ratios of the liquid crystal compounds in the liquid crystal composition with GC, the internal standard method for GC can be used, wherein GC measurements were simultaneously performed on an accurately weighed specified amount of a liquid crystal compound component (detected component) and a liquid crystal compound as standard (standard), and a relative intensity was calculated in advance as a peak area ratio of the detected component to the standard. If a correction was done using the relative intensity expressed as peak area ratio of each component to the standard, the ratios of the liquid crystal compounds in the liquid crystal composition can be more accurately calculated with GC analysis.

Samples for Determining Characteristic Values of Liquid Crystal Compounds

Upon measuring the characteristic values, there are two methods, i.e., taking a pure compound as a sample, and mixing a compound in a mother liquid crystal to form a sample.

When a sample prepared by mixing a compound with a mother liquid crystal is measured, the following method is used for the measurement. Firstly, 15 wt % of the obtained liquid crystal compound was mixed with 85 wt % of the mother liquid crystal to prepare a sample, and then the characteristic value of the compound is calculated from the measured value with the extrapolation method according to the equation below.

[Extrapolated Value]=(100×[measured value of the sample]−[wt % of the mother liquid crystal]×[measured value of the mother liquid crystal])/[wt % of the liquid crystal compound]

While a smectic phase or crystal might be separated at the above ratio of the liquid crystal compound to the mother liquid crystal at 25° C., the ratio of the liquid crystal compound and the mother liquid crystal was changed to 10 wt %:90 wt %, 5 wt %:95 wt % and 1 wt %:99 wt % in order. The composition without separation of a smectic phase or crystal at 25° C. was measured for a characteristic value, and the characteristic value of the liquid crystal compound is calculated by extrapolation based on the above equation.

There are numerous mother liquid crystals that can be used for the measurement. For example, the composition of the mother liquid crystal A is as follows (wt %).

Mother Liquid Crystal A:

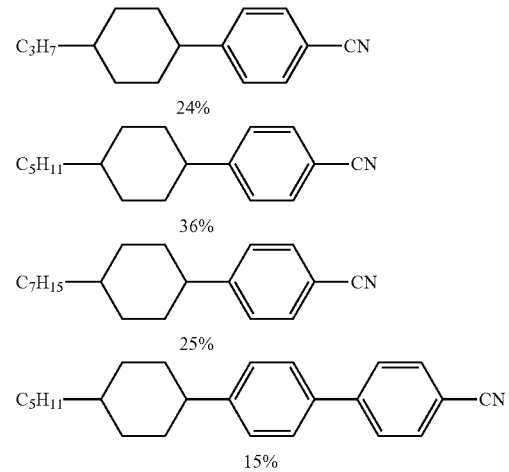

Method for Measuring Characteristic Values of Liquid Crystal Compounds

The measurement of the characteristic values was carried out with the methods below. These methods are mainly those described in EIAJ•ED-2521A of the Standard of Electric Industries Association of Japan, or modifications of the same. Moreover, the TN device used in the measurement was not equipped with TFT.

With respect to the determined values, in case that the liquid crystal compound itself is used as a sample, the obtained values are recorded as experiment data. In case that a mixture of the liquid crystal compound and a mother liquid crystal is a sample, the extrapolated values obtained with extrapolation are recorded as experiment data.

The phase structure and the phase transition temperature (° C.) were measured using the methods (1) and (2) below.
(1) A compound was placed on a hot plate (Hot Stage FP-52 by Mettler, Corp.) in a melting point measuring apparatus equipped with a polarizing microscope, and the phase behaviour and its change were observed by the polarizing microscope while the sample is heated at a rate of 3° C./min, to determine the type of the liquid crystal phase.
(2) A scanning calorimetry DSC-7 system or Diamond DSC system (made by Perkin Elmer Corp.) is used, in a heating or cooling rate of 3° C./min, and the on-set temperature of the endothermic or exothermic peak accompanying with the phase change of the sample was calculated with extrapolation to determine the phase transition temperature.

Hereinafter, a crystal is represented by "K". In a case where two crystals are distinguished from each other, they are represented by "$K_1$" and "$K_2$". A smectic phase is represented by "Sm", a nematic phase is represented by "N", and a liquid (isotropic phase) is represented by "I". In case that a smectic B phase and a smectic A phase are distinguished from each other in the smectic phase, they are expressed as "SmB" and "SmA". "BP" represents a blue phase or an optically isotropic liquid crystal phase. A biphase co-existence is sometimes represented by (N*+I) or (N*+BP). Specifically, (N*+I) represents a phase in which an isotropic phase and a chiral nematic phase coexist, and (N*+BP) represents a phase in which a BP phase or an optically isotropic liquid crystal phase and a chiral nematic phase coexist. "Un" represents a non-optically isotropic unidentified phase. For the expression of the phase transition temperature, for example, "K 50.0 N 100.0 I" means that the phase transition temperature ($T_{KN}$) from the crystal to the nematic phase is 50.0° C. and that ($T_{NI}$) from the nematic phase to the liquid is 100.0° C. This also applies to the cases of other expressions.

The upper-limit temperature of a nematic phase ($T_{NI}$, ° C.): a sample as a mixture of a liquid crystal compound and a mother liquid crystal was placed on a hot plate (Hot Stage FP-52 by Mettler Corp.) in a melting point measuring apparatus equipped with a polarizing microscope, and was observed by the polarizing microscope while heated at a rate of 1° C./min. The temperature at which a part of the sample began to change from a nematic phase to an isotropic liquid was recorded as the upper-limit temperature of the nematic phase, which is sometimes abbreviated to "upper-limit temperature" hereinafter.

Low-temperature compatibility: samples were prepared by mixing a mother liquid crystal with a liquid crystal compound such that the content of the latter was 20 wt %, 15 wt %, 10 wt %, 5 wt %, 3 wt % or 1 wt %, and then placed into glass bottles. The glass bottles were kept in a freezer at −10° C. or −20° C. for a certain period, and the presence or absence of crystal or a smectic phase was observed.

Viscosity (η, determined at 20° C., mPa·s): the viscosity of a mixture of a liquid crystal compound and a mother liquid crystal was measured with an E-type viscometer.

Optical anisotropy (Δn): the measurement was done at 25° C. utilizing light of 589 nm, with an Abbe refractometer having a polarizing plate mounted on the ocular lens. After the surface of the main prism is rubbed in a direction, a sample as a mixture of a liquid crystal compound and a mother liquid crystal was dropped onto the main prism. The refractive index $n_∥$ was determined when the polarizing direction was parallel to the rubbing direction, and the refractive index $n_⊥$ was determined when the polarizing direction was perpendicular to the rubbing direction. The optical anisotropy (Δn) was calculated according to the equation of "Δn=$n_∥$−$n_⊥$".

Dielectric anisotropy (Δ∈: determined at 25° C.): a sample as a mixture of a liquid crystal compound and a mother liquid crystal was fed into a liquid crystal cell with a distance (cell gap) of 9 μm between two glass substrates and a twist angle of 80°. The liquid crystal cell was applied with a voltage of 20 V, and the dielectric constant ($∈_∥$) in the major-axis direction of the liquid crystal molecule was determined. Then, a voltage of 0.5 V was applied, and the dielectric constant ($∈_⊥$) in the minor axis direction of the liquid crystal molecule was determined. The dielectric anisotropy (Δ∈) was calculated according to the equation of "Δ∈=$∈_∥$−$∈_⊥$".

Pitch (p, determined at 25° C., m)

The pitch length was measured with selective reflection (Handbook of Liquid Crystal, p. 196, 2000, from Maruzen). For the selective reflection wavelength λ, the relationship <n>p/λ=1 exists, wherein <n> denotes the average refractive index and can be calculated from the equation of "<n>={($n_∥^2$+$n_⊥^2$)/2}$^{1/2}$". The selective reflection wavelength can be determined by a microspectrophotometer MSV-350 made by Japan Electronics Co., Ltd. The pitch was calculated by dividing the obtained reflection wavelength with the average refractive index <n>. When the concentration of the optically active compound is low, the pitch of a cholesteric liquid crystal having a reflection wavelength at the long wavelength side of visible light is proportional to the reciprocal of the concentration. Therefore, multiple points were measured in the pitch length of the liquid crystal having a selective reflection wavelength in the visible light region, and then the pitch was calculated using linear extrapolation method. Herein, the "optically active compound" is equivalent to the chiral dopant in this invention.

Synthesis Example 1

Synthesis of 1-(4'-(difluoro(3,4,5-trifluorophenoxy)-methyl)-2,3',5'-trifluoro-[1,1'-biphenyl]-4-yl)-4-pentyl-2,6,7-trioxabicyclo[2.2.2]octane

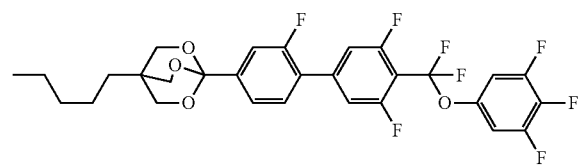

(1-3-1a)

The synthesis scheme is shown as follows.

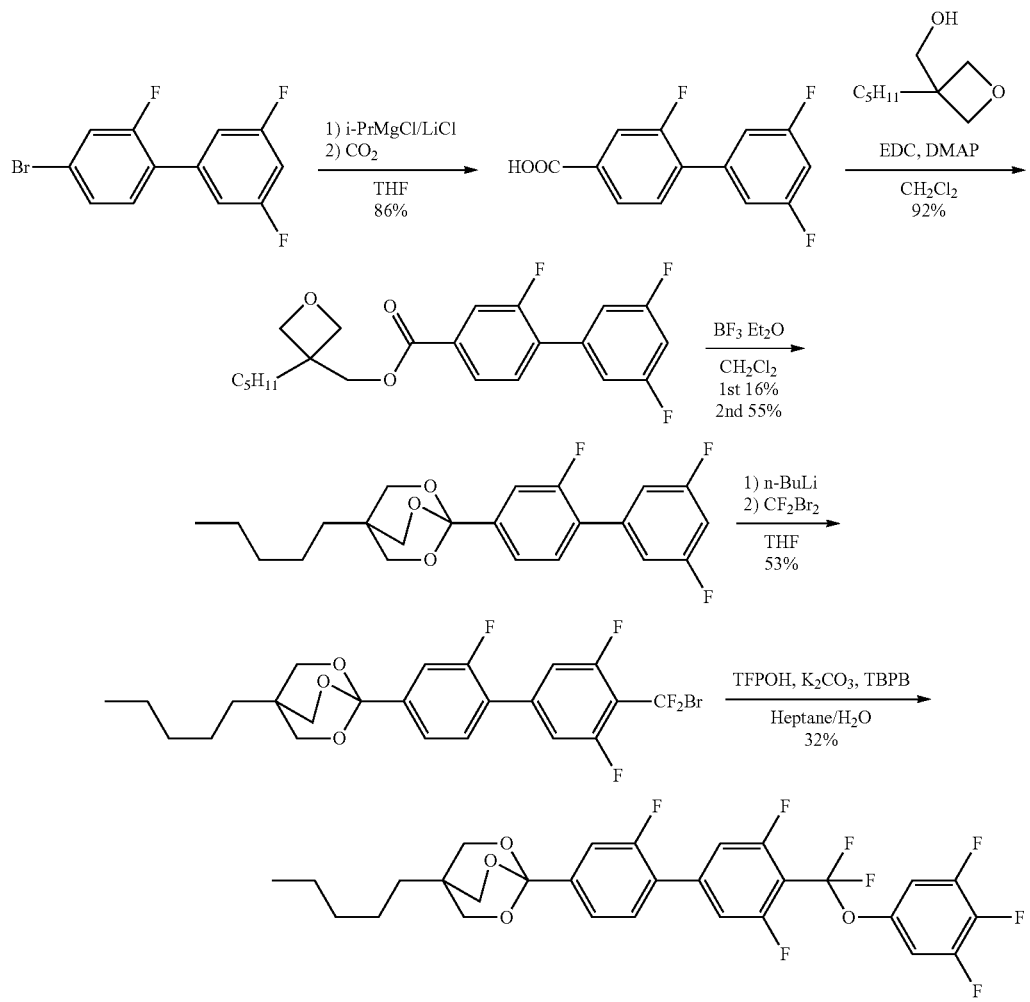

First Process

In a reactor under an $N_2$-atmosphere, 100 ml of a 1.3M THF solution of isopropyl magnesium chloride/lithium chloride complex (130 mmol) was added and then stirred at room temperature, 28.7 g (100 mmol) of 4-bromo-2,3',5'-trifluoro-1,1'-biphenyl was slowly added, and then the mixture was stirred at room temperature for 2 hours. Next, while the mixture was cooled to 5-15° C. by an ice bath, dried $CO_2$ gas was blown in without heat generation. The reaction solution was poured in 200 ml of 2N $HCl_{(aq)}$ and extracted by diethyl ether. After the organic layer was collected, washed by saturated saline and dried by anhydrous magnesium sulfate, it was filtered to remove the insoluble substance and concentrated under a reduced pressure. The residue was purified by a fractionation operation utilizing column chromatography, with ethyl acetate as an eluent solvent and silica gel as a filler. The product was further purified by recrystallization using heptane/ethanol in a volume ratio of 30/70, so that 10.3 g of 2,3',5'-trifluoro-1,1'-biphenyl-4-carboxylic acid was obtained as a white solid.

Second Process

In a reactor under an $N_2$-atmosphere, 10.3 g (40.7 mmol) of 2,3',5'-trifluoro-1,1'-biphenyl-4-carboxylic acid that was obtained in the first process, 6.40 g (40.7 mmol) of 3-pentyl-3-hydroxymethyloxetane, 0.5 g (4 mmol) of 4-dimethylaminopyridine and 100 ml of dichloromethane were added, a 30 ml dichloromethane solution of 8.8 g (42.8 mmol) of dicyclohexylcarbodiimide was added dropwise at room temperature, and the mixture was stirred at room temperature for 15 hours. After the insoluble substance was filtered away and the solvent was removed by distillation, the residue was purified by a fractionation operation utilizing column chromatography, with a mixed solvent of heptane and ethyl acetate in a volume ratio of 1:4 (ethyl acetate:heptane) as an eluent solvent and silica gel as a filler, to obtain 13.7 g of (3-pentyloxetane-3-yl)methyl 2,3',5'-trifluoro-[1,1'-biphenyl]-4-carboxylate as a colourless liquid.

Third Process

In a reactor under an $N_2$-atmosphere, 13.7 g (34.9 mmol) of (3-pentyloxetane-3-yl)-methyl 2,3',5'-trifluoro-[1,1'-biphenyl]-4-carboxylate obtained in the second process and 100 ml of dichloromethane were added and cooled to −70° C., and then 1.1 ml (8.8 mmol) of boron trifluoride-diethyl ether complex was added dropwise. After being heated to room temperature, the mixture was stirred for 20 hours. After 1.5 ml (11 mmol) of triethylamine was added, the mixture was concentrated by a rotary evaporator. Thereafter, the mixture was added with 100 ml of diethyl ether, washed with saturated saline, dried by anhydrous magnesium sulfate, filtered to remove the insoluble substance, and then concentrated under a reduced pressure. The residue was purified by a fractionation operation utilizing column chromatography, with a mixed solvent of heptane and ethyl acetate in a volume ratio of 1:4 (ethyl acetate:heptane) as an eluent solvent and silica gel as a filler, to obtain 10.9 g of 4-pentyl-1-(2,3',5'-trifluoro-[1,1'-biphenyl]-4-yl)-2,6,7-trioxabicyclo[2.2.2]octane as a white solid.

Fourth Process

In a reactor under an $N_2$-atmosphere, 2.0 g (5.1 mmol) of 4-pentyl-1-(2,3',5'-trifluoro-[1,1'-biphenyl]-4-yl)-2,6,7-trioxabicyclo[2.2.2]octane obtained in the third process and 70 ml of THF were added and cooled to −70° C., 4.1 ml of a 1.62 M hexane solution of n-butyl lithium (6.6 mmol) was added dropwise, and the mixture was stirred at −70° C. for 1 hour. Next, a 10 ml THF solution of 1.6 g (7.7 mmol) of dibromodifluoromethane was added dropwise at −70° C., and the mixture was stirred at −70° C. for 1 hour. The mixture was poured in 100 ml of ice water, extraction was performed with toluene, and then the organic layer was collected, washed by saturated saline, dried over anhydrous magnesium sulfate, filtered to remove insoluble substance, and concentrated under a reduced pressure. The residue was purified by a fractionation operation utilizing column chromatography, with a mixed solvent of heptane and ethyl acetate in a volume ratio of 1:4 (ethyl acetate:heptane) as an eluent solvent and silica gel as a filler, to obtain 2.4 g of 1-(4'-(bromodifluoromethyl)-2,3',5'-trifluoro-[1,1'-biphenyl]-4-yl)-4-pentyl-2,6,7-trioxabicyclo[2.2.2]octane as a white solid.

Fifth Process

In a reactor under an $N_2$-atmosphere, 2.4 g (4.6 mmol) of 1-(4'-(bromodifluoro-methyl)-2,3',5'-trifluoro-[1,1'-biphenyl]-4-yl)-4-pentyl-2,6,7-trioxabicyclo[2.2.2]octane obtained in the fourth process, 0.68 g (4.6 mmol) of 3,4,5-trifluorophenol, 1.9 g (14 mmol) of potassium carbonate and 40 ml of DMF were added, and the mixture was stirred at 85° C. for 2 hours. After being cooled to room temperature, the mixture was added with 100 ml of toluene and 100 ml of water, the organic layer was separated, and then the water layer was subjected to extraction with toluene. The organic layer was collected, washed by saturated saline, dried over anhydrous magnesium sulfate, filtered to remove insoluble substance, and concentrated at a reduced pressure. The residue was purified by a fractionation operation utilizing column chromatography, with a mixed solvent of heptane and ethyl acetate in a volume ratio of 1:4 (ethyl acetate:heptane) as an eluent solvent and silica gel as a filler. The product was further purified by recrystallization using heptane/ethyl acetate in a volume ratio of 80/20, so that 0.7 g of 1-(4'-(difluoro-(3,4,5-trifluorophenoxy)methyl)-2,3',5'-trifluoro-[1,1'-biphenyl]-4-yl)-4-pentyl-2,6,7-trioxabicyclo[2.2.2]octane was obtained as a white solid.

The data of chemical shift δ (ppm) of $^1$H-NMR analysis are shown as follows, from which the obtained compound could be characterised as 1-(4'-(difluoro-(3,4,5-trifluorophenoxy) methyl)-2,3',5'-trifluoro-[1,1'-biphenyl]-4-yl)-4-pentyl-2,6, 7-trioxabicyclo[2.2.2]octane. Moreover, the solvent for the measurement was $CDCl_3$.

The data of chemical shift δ (ppm): 7.51 (m, 1H), 7.47 (m, 1H), 7.41 (m, 1H), 7.19 (m, 2H), 6.99 (m, 2H), 4.13 (s, 6H), 1.4-1.2 (m, 8H), 0.90 (t, 3H).

The phase transition temperatures of the obtained compound (1-3-1a) are expressed by "C 71.4 C2 107.4 N 147.9 I".

Synthesis Example 2

Synthesis of 1-(4-(difluoro(3,4,5-trifluorophenoxy)-methyl)-3,5-difluorophenyl)-4-propyl-2,6,7-trioxabicyclo[2.2.2]octane

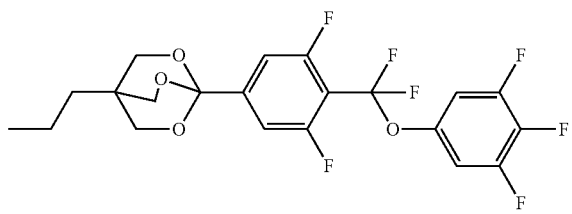

(1-2-1a)

First Process

In a reactor under an $N_2$-atmosphere, 22.7 g (933 mmol) of magnesium flakes were added and stirred at room temperature for 3 days. Then, 80 ml of THF and an iodine flake were added, a 100 ml THF solution of 150 g (777 mmol) of 1-bromo-3,5-difluorobenzene was slowly added at room temperature, and then the mixture was refluxed for 1 hour. Next, the mixture was cooled to 10° C., slowly added with 75 g (1710 mmol) of dry ice and stirred at room temperature for 1 hour. The reaction solution was poured in 500 ml of 1N $HCl_{(aq)}$ and then subjected to extraction with ethyl acetate. The organic layer was collected, washed with water, dried over anhydrous magnesium sulfate, filtered to remove insoluble substance, and concentrated under a reduced pressure. The residue was washed using n-heptane to obtain 66.3 g of 3,5-difluorobenzoic acid as a white solid.

Second Process

In a reactor under an $N_2$-atmosphere, 35.0 g of 3,5-difluorobenzoic acid obtained in the first process, 28.8 g (221 mmol) of 3-propyl-3-hydroxymethyloxetane, 2.7 g (22 mmol) of 4-dimethylaminopyridine and 325 ml of dichloromethane were added, a 175 ml dichloromethane solution of 48.0 g (232 mmol) of dicyclohexylcarbodiimide was added dropwise at room temperature, and the mixture was stirred at room temperature for 3 hours. After the insoluble substance was filtered away, the solution was washed by 1N $HCl_{(aq)}$, an aqueous solution of sodium hydrogen carbonate, and water in sequence, dried over anhydrous magnesium sulfate, filtered to remove insoluble substance, and then concentrated under a reduced pressure. The residue was purified by a fractionation operation utilizing column chromatography, with a mixed solvent of heptane and ethyl acetate in a volume ratio of 1:4 (ethyl acetate:heptane) as an eluent solvent and silica gel as a filler, to obtain 52.2 g of (3-propyloxetane-3-yl)methyl 3,5-difluorobenzoate as a yellowish liquid.

Third Process

In a reactor under an $N_2$-atmosphere, 52.2 g (193 mmol) of (3-propyloxetane-3-yl)methyl 3,5-difluorobenzoate obtained in the second process, and 350 ml of dichloromethane were added and cooled to −70° C., and then 6.1 ml (48 mmol) of boron trifluoride-diethyl ether complex was added dropwise. The mixture was heated to room temperature and stirred for 24 hours. After 10 ml (72 mmol) of triethylamine was added, the mixture was concentrated by a rotary evaporator. Thereafter, the mixture was added with 300 ml of diethyl ether, washed with water, dried over anhydrous magnesium sulfate, filtered to remove insoluble substance, and concentrated under a reduced pressure. The residue was purified by a fractionation operation utilizing column chromatography, with a mixed solvent of heptane and ethyl acetate in a volume ratio of 1:4 (ethyl acetate:heptane) as an eluent solvent and silica gel as a filler, to obtain 37.5 g of 4-propyl-1-(3,5-difluorophenyl)-2,6,7-trioxabicyclo[2.2.2]octane as a white solid.

Fourth Process

In a reactor under an $N_2$-atmosphere, 37.5 g (139 mmol) of 4-propyl-1-(3,5-difluorophenyl)-2,6,7-trioxabicyclo[2.2.2]octane obtained in the third process and 830 ml of THF were added and cooled to −70° C., 83 ml of a 1.67 M hexane solution of n-butyl lithium (139 mmol) was added dropwise, and then the mixture was stirred at −70° C. for 1 hour. Next, a 100 ml THF solution of 34.9 g (166 mmol) of dibromodifluoromethane was added dropwise at −70° C., and the mixture was stirred at −70° C. for 1 hour. The mixture was poured in 1000 ml of ice water, an extraction was performed with toluene, and then the organic layer was collected, washed by saturated saline and water in sequence, dried over anhydrous magnesium sulfate, filtered to remove insoluble substance, and concentrated under a reduced pressure. The residue was purified by a fractionation operation utilizing column chromatography, with a mixed solvent of heptane and ethyl acetate in a volume ratio of 1:4 (ethyl acetate:heptane) as an eluent solvent and silica gel as a filler, to obtain 50.9 g of 1-(4-(bromodifluoromethyl)-3,5-difluorophenyl)-4-propyl-2,6,7-trioxabicyclo[2.2.2]octane as a white solid.

Fifth Process

In a reactor under an $N_2$-atmosphere, 10.0 g (25.1 mmol) 1-(4-(bromodifluoro-methyl)-3,5-difluorophenyl)-4-propyl-2,6,7-trioxabicyclo[2.2.2]octane, 4.5 g (30 mmol) of 3,4,5-trifluorophenol, 3.5 g (25 mmol) of potassium carbonate, 2.6 g (7.5 mmol) of tetrabutylphosphonium bromide, 50 ml of $H_2O$ and 5 ml of n-heptane were added, and the mixture was refluxed at 82-85° C. for 10 hours. After being cooled to room temperature, the mixture was added with 100 ml of toluene and 100 ml of water, the organic layer was separated, and then the water layer was subjected to extraction with toluene. The organic layer was collected, washed by an aqueous solution of sodium hydrogen carbonate and water in sequence, dried over anhydrous magnesium sulfate, filtered to remove insoluble substance, and concentrated at a reduced pressure. The residue was purified by a fractionation operation utilizing column chromatography, with a mixed solvent of heptane and ethyl acetate in a volume ratio of 1:4 (ethyl acetate:heptane) as an eluent solvent and silica gel as a filler. The product was further purified by recrystallization using isopropanol/ethyl acetate in a volume ratio of 80/20, so that 5.9 g of 1-(4-(difluoro(3,4,5-trifluorophenoxy)methyl)-3,5-difluorophenyl)-4-propyl-2,6,7-trioxabicyclo[2.2.2]octane was obtained as a white solid.

The data of chemical shift δ (ppm) of $^1$H-NMR analysis are shown as follows, from which the obtained compound could be characterised as 1-(4-(difluoro(3,4,5-trifluorophenoxy)methyl)-3,5-difluorophenyl)-4-propyl-2,6,7-trioxabicyclo[2.2.2]octane (1-2-1a). Moreover, the solvent for the measurement was $CDCl_3$.

The data of chemical shift δ (ppm): 7.25 (m, 2H), 6.94 (m, 2H), 4.10 (s, 6H), 1.3-1.2 (m, 4H), 0.94 (t, 3H).

The phase transition temperatures of the obtained compound (1-2-1a) are expressed by "C 94.5 I".

Physical Properties of Liquid Crystal Compounds (1-2-1a) & (1-3-1a)

A mother liquid crystal A was prepared by mixing the four compounds described as the aforementioned mother liquid crystal A. The physical properties of the mother liquid crystal A are as follows:

Upper-limit temperature $(T_{NI})$=71.7° C.; dielectric anisotropy (Δ∈)=11.0; optical anisotropy (Δn)=0.137.

A liquid crystal composition Z1, which includes 85 wt % of the mother liquid crystal A and 15 wt % of (1-3-1a) obtained in Synthesis Example 1, was prepared. The values of the physical properties of the obtained liquid crystal composition Z1 were measured, and the extrapolated values of the physical properties of the liquid crystal compound (1-3-1a) were calculated from the measured values through extrapolation. The values are as follows:

Upper-limit temperature $(T_{NI})$=109.7° C.; dielectric anisotropy (Δ∈)=53.2; optical anisotropy (Δn)=0.144.

It is known that such obtained liquid crystal compound (1-3-1a) is a compound having a high clearing point, a large dielectric anisotropy (Δ∈) and a large optical anisotropy (Δn).

A liquid crystal composition Z2, which includes 90 wt % of the mother liquid crystal A and 10 wt % of (1-2-1a) obtained in Synthesis Example 2, was prepared. The values of the physical properties of the obtained liquid crystal composition Z2 were measured, and the extrapolated values of the physical properties of the liquid crystal compound (1-2-1a) were calculated from the measured values through extrapolation. The values are as follows:

Upper-limit temperature $(T_{NI})$=15.7° C.; dielectric anisotropy (Δ∈)=46.1; optical anisotropy (Δn)=0.087.

It is known that such obtained liquid crystal compound (1-3-1a) is a compound having a high clearing point, a large dielectric anisotropy (Δ∈) and a large optical anisotropy (Δn).

In this invention, the characteristic values of a liquid crystal composition were measured by the methods below, which are mainly the methods described in EIAJ•ED-2521A of the Standard of Electric Industries Association of Japan, or modifications of the same. The TN device used in the measurement was not equipped with TFT.

Upper-limit temperature of a nematic phase (NI, ° C.): a sample was placed on a hot plate in a melting point measuring apparatus equipped with a polarizing microscope and heated at a rate of 1° C./min. The temperature at which a part of the sample began to change from a nematic phase to an isotropic liquid was recorded as the upper-limit temperature of the nematic phase, which is sometimes abbreviated as "upper-limit temperature" below.

Lower-limit temperature of a nematic phase $(T_C,$ ° C.): a sample having a nematic phase was kept in a freezer at 0° C., −10° C., −20° C., −30° C. or −40° C. for 10 days, and observed for the liquid crystal phase. For example, in a case where the sample exhibits a nematic phase at −20° C. but changes to crystal or a smectic phase at −30° C., the $T_C$ is recorded as "≤−20° C.". Hereinafter, the lower-limit temperature of a nematic phase is often abbreviated to "lower-limit temperature".

Transition temperature of an optically isotropic liquid crystal phase: a sample was placed on a hot plate in a melting point measuring apparatus equipped with a polarizing microscope with crossed Nicols, which was initially heated to a temperature allowing formation of an isotropic phase, and then cooled in a rate of 1° C./min until a chiral nematic phase or an optically isotropic liquid crystal phase was completely formed. The phase transition temperature during this cooling process was measured. Then, the temperature was raised in a rate of 1° C./min, and the phase transition temperature during this heating process was measured. In this invention, unless specifically indicated, the phase transition temperature in the heating process was recorded as the phase transition temperature. When it was difficult to determine the phase transition temperature of the optically isotropic liquid crystal phase in the dark field under crossed Nicols, the phase transition temperature could be determined after the polarizing plate is deviated from the crossed Nicol state by 1 to 100.

Viscosity (η, determined at 20° C., mPa·s): The viscosity was measured with an E-type viscometer.

Rotation viscosity (γl, determined at 25° C., mPa·s):

1) For a sample with a positive dielectric anisotropy: the measurement was done following the method described in M. Imai et al., *Molecular Crystals and Liquid Crystals, Vol.* 259, 37 (1995). The sample was placed into a TN device with a twist angle of 0° and a distance (cell gap) of 5 μm between two glass substrates. The TN device was applied with a voltage in a range of 16 to 19.5 V, stepwise by 0.5 V. After a period of 0.2 second with no application of voltage, a voltage application was repeated with a rectangular wave (rectangular pulse of 0.2 second) followed by a period of 2 seconds of no voltage. The peak current and the peak time of the transient current resulting from the application of the voltage were measured. Then, the value of rotation viscosity was calculated based on the measurements and Equation (8) described in page 40 of the paper of M. Imai et al. The dielectric anisotropy required for this calculation was obtained by using the device used in the measurement of the rotation viscosity, following the later-described method for determining dielectric anisotropy.

2) For a sample with a negative dielectric anisotropy: the measurement was done following the method described in M. Imai et al., *Molecular Crystals and Liquid Crystals, Vol.* 259, 37 (1995). The sample was placed into a vertical alignment device with a distance (cell gap) of 20 μm between two glass substrates. The device was applied with a voltage in a range of 30 to 50 V, stepwise by 1 V. After a period of 0.2 second without voltage application, a voltage application was repeated with a rectangular wave (rectangular pulse of 0.2 second) followed by a period of 2 seconds of no voltage. The peak current and the peak time of the transient current resulting from the voltage application were measured. Then, the value of rotation viscosity was calculated based on the measurements and Equation (8) described in page 40 of the paper of M. Imai et al. The dielectric anisotropy value required for this calculation was obtained by using the method described below.

Optical anisotropy (Δn, determined at 25° C.): the measurement was done using light of 589 nm, with an Abbe refractometer having a polarizing plate mounted on the ocular lens. After the surface of the main prism was rubbed in a direction, the sample was dropped onto the main prism. The refractive index $n_\parallel$ was determined when the polarizing direction was parallel to the rubbing direction, and the refractive index $n_\perp$ was determined when the polarizing direction was perpendicular to the rubbing direction. The optical anisotropy was calculated according the equation "$\Delta n = n_\parallel - n_\perp$". When the sample was a composition, the above process could be used to determine the optical anisotropy.

Dielectric Anisotropy (Δ∈, Determined at 25° C.):

1) For a composition with a positive dielectric anisotropy: a sample was placed into a liquid crystal cell with a distance (cell gap) of 9 μm between two glass substrates and a twist angle of 80°. The liquid crystal cell was applied with a voltage of 20 V to determine the dielectric constant ($\in_\parallel$) in the major-axis direction of the liquid crystal molecule. Then, a voltage of 0.5 V was applied to determine the dielectric constant ($\in_\perp$) in the minor axis direction of the liquid crystal molecule. The dielectric anisotropy was calculated according to the equation of "$\Delta\in = \in_\parallel - \in_\perp$".

2) For a composition with a negative dielectric anisotropy: a sample was placed into a liquid crystal cell processed into homeotropic alignment, and applied with a voltage of 0.5 V to determine the dielectric constant $\in_\parallel$. Then, the sample was placed into a liquid crystal cell processed into homogeneous alignment, and applied with a voltage of 0.5 V to determine dielectric constant $\in_\perp$. The dielectric anisotropy was calculated according to the equation of "$\Delta\in = \in_\parallel - \in_\perp$".

Threshold Voltage (Vth, Determined at 25° C., V):

1) For a composition with a positive dielectric anisotropy: a sample was placed into a liquid crystal display device of a normally white mode with a distance of (0.5/Δn) μm between two glass substrates and a twist angle of 80°, in which Δn was the optical anisotropy determined using the above method. A rectangular wave with a frequency of 32 Hz was applied to the device. Then, the magnitude of rectangular wave was increased, and the voltage value at which the transmittance of light through the device reached 90% was determined.

2) For a composition with a negative dielectric anisotropy: a sample was placed into a liquid crystal display device of a normally black mode, which has a distance (cell gap) of 9 μm between two glass substrates and was processed into homeotropic alignment. A rectangular wave with a frequency of 32 Hz was applied to the device. Then, the magnitude of the rectangular wave was increased, and the voltage value at which the transmittance of light through the device reached 10% was determined.

Voltage holding ratio (VHR, determined at 25° C., %): the TN device used for the determination had a polyimide alignment film, and had a distance (cell gap) of 6 μm between two glass substrates. The sample was placed into the device, which was then sealed with a UV-polymerizable adhesive. Then, the TN device was charged by applying a pulse voltage (5V, 60 ms). The voltage decay was determined using a high-speed voltmeter at an interval of 16.7 ms, and the area A between the voltage curve and the horizontal axis per unit cycle was calculated. The voltage holding ratio was the percentage of the area A relative to the non-decayed area B.

Helical pitch (determined at 20° C., μm): The helical pitch was measured by a conoscope. A sample was injected into a conoscope, and then the distance (a, μm) between the disclination lines observed from the wedge-type liquid crystal cell was measured. The helical pitch (p) could be calculated according to the formula p=2·a·tan θ, wherein θ is the angle between the two glass plates in the wedge-type cell.

Alternatively, the pitch length can be determined with selective reflection (Handbook of Liquid Crystal, p. 196, 2000, by Maruzen). For the selective reflection wavelength λ, the relationship <n>p/λ=1 exists, wherein <n> denotes the average refractive index and can be calculated following the equation "$<n> = \{(n_\parallel^2 + n_\perp^2)/2\}^{1/2}$", The selective reflection wavelength was determined by a microspectrophotometer MSV-350 manufactured by Japan Electronics Co., Ltd. The pitch was obtained by dividing the measured reflection wavelength with the average refractive index.

When the concentration of the chiral reagent is low, the pitch of a cholesteric liquid crystal having a reflection wavelength at the long wavelength side of visible light is proportional to the reciprocal of the concentration. Therefore, multiple points were measured in the pitch length of the liquid crystal having selective reflection wavelength in the visible light region, and the pitch was calculated with linear extrapolation.

The proportion (percentage) of a component or a liquid crystal compound is a weight percentage (wt %). The proportions of the respective components in the achiral component T are weight percentages relative to the total weight of T. The composition can be prepared by mixing the components including liquid crystal compounds etc. after they are weighted. Thus, the wt % of each component can be easily calculated.

Example 1

A liquid crystal composition A was prepared, which corresponds to an achiral component T obtained by mixing the liquid crystal compounds below in the following weight percentages. The corresponding general formulae are recited at the right side of the structural formulae.

Liquid Crystal Composition A:

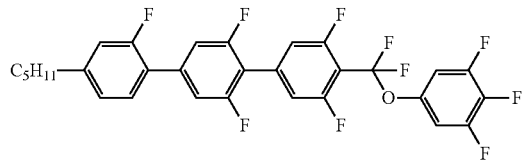

3.0 wt %   (3-3-1)

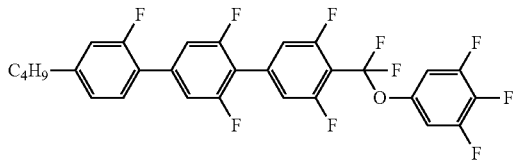

3.0 wt %   (3-3-1)

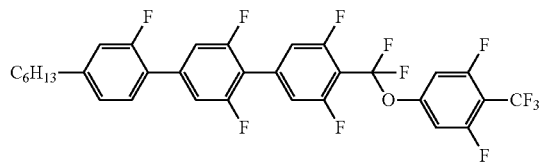

4.1 wt %   (3-3-1)

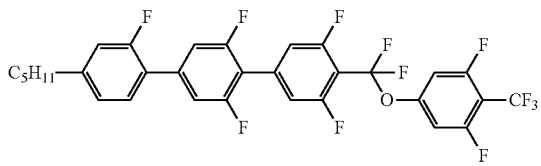

4.1 wt %   (3-3-1)

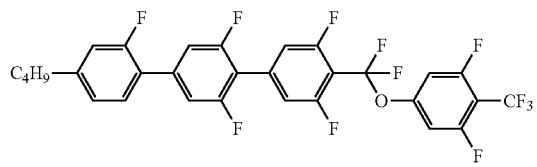

4.1 wt %   (3-3-1)

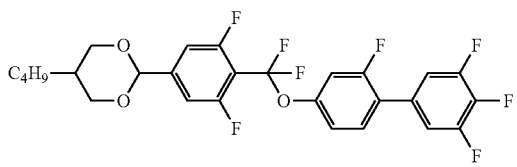

10.0 wt %   (3-4-1)

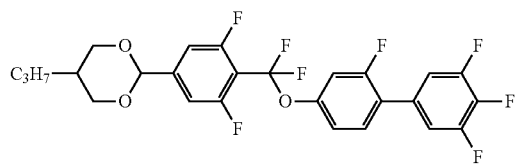

10.0 wt %   (3-4-1)

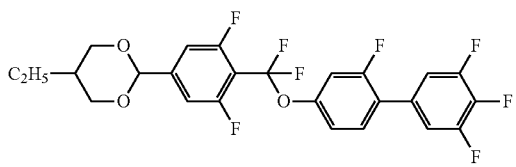

10.0 wt %   (3-4-1)

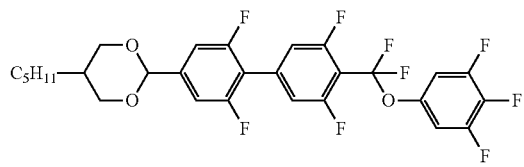

3.0 wt %   (3-5-2)

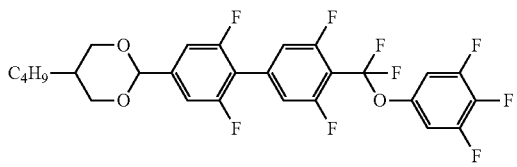

3.0 wt %   (3-5-2)

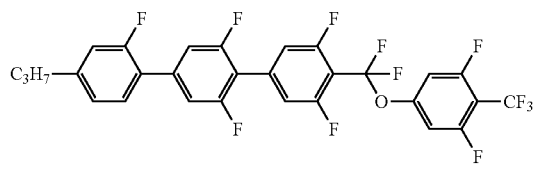

4.1 wt %   (3-3-1)

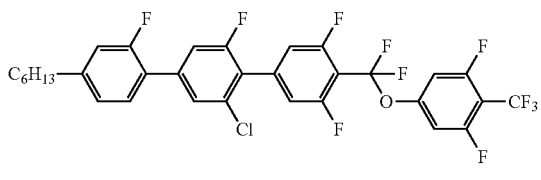

2.5 wt %   (2-1-4-3)

-continued
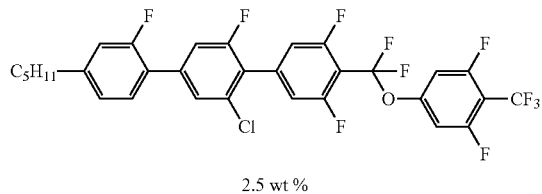
2.5 wt % (2-1-4-3)
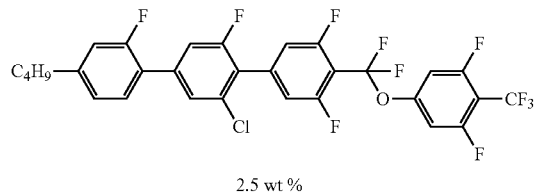
2.5 wt % (2-1-4-3)
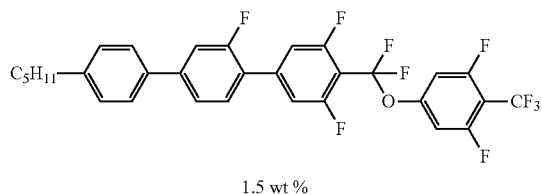
1.5 wt % (4-4)
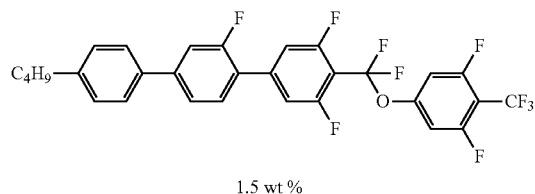
1.5 wt % (4-4)
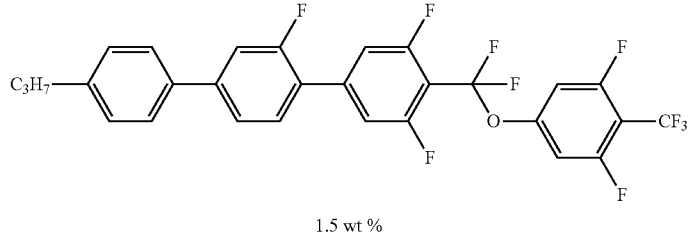
1.5 wt % (4-4)
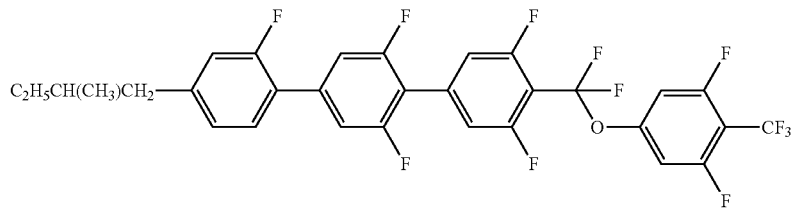
10.0 wt % (4-4)
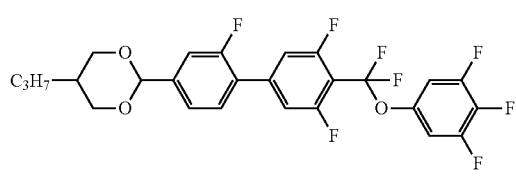
3.0 wt % (3-5-2)
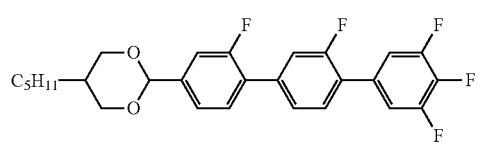
3.6 wt % (5-2-2)
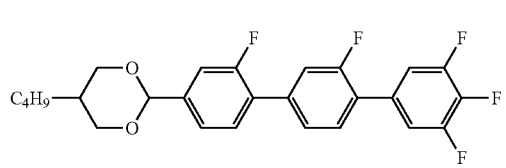
3.5 wt % (5-2-2)
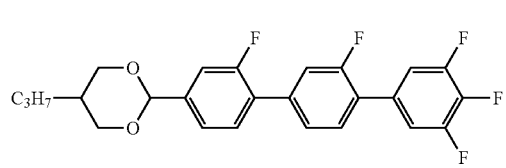
3.5 wt % (5-2-2)
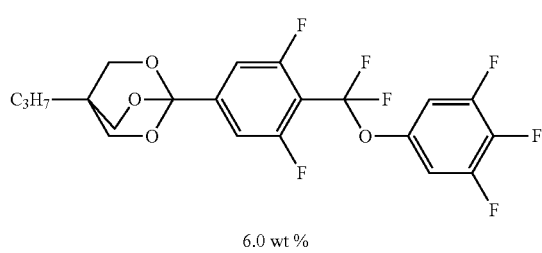
6.0 wt % (1-2-1a)

The phase transition temperature (° C.) of the liquid crystal composition A is expressed by "N 77.6 I".

Example 2

A liquid crystal composition B was prepared, which corresponds to an achiral component T obtained by mixing the liquid crystal compounds below in the following weight percentages. The corresponding general formulae are recited at the right side of the structural formulae.

Liquid crystal composition B

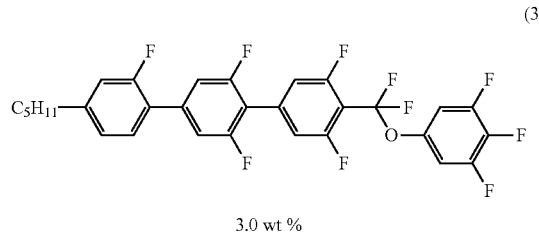
(3-3-1)
3.0 wt %

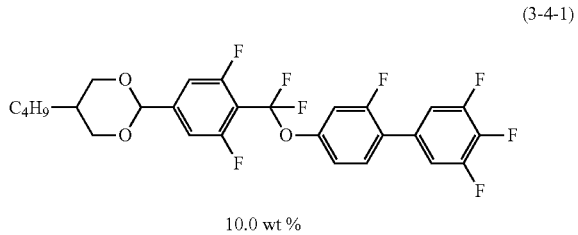
(3-4-1)
10.0 wt %

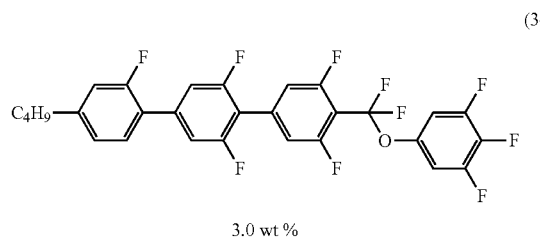
(3-3-1)
3.0 wt %

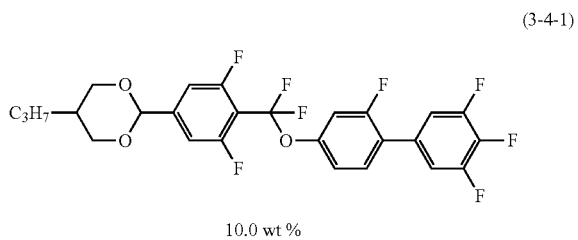
(3-4-1)
10.0 wt %

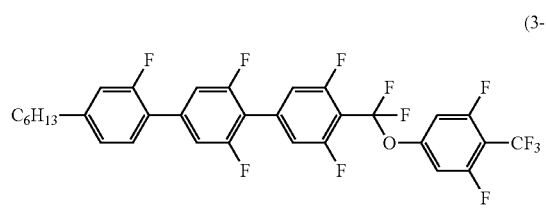
(3-3-1)
4.1 wt %

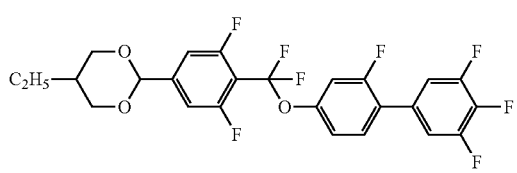
(3-4-1)
10.0 wt %

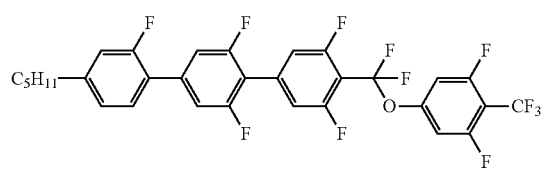
(3-3-1)
4.1 wt %

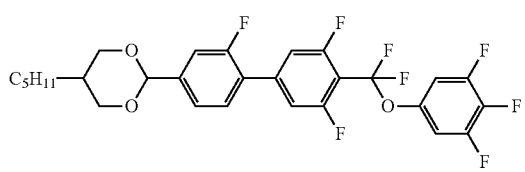
(3-5-2)
3.0 wt %

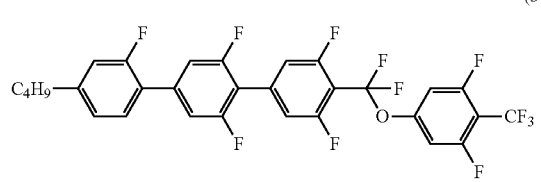
(3-3-1)
4.1 wt %

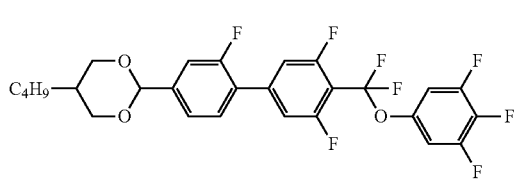
(3-5-2)
3.0 wt %

-continued
(3-3-1)
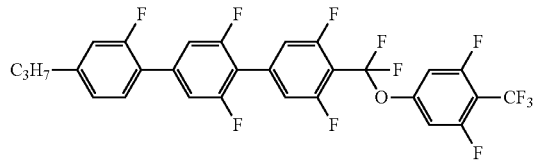
4.1 wt %
(3-5-2)
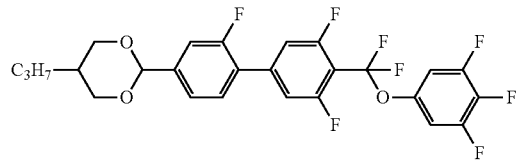
3.0 wt %
(2-1-4-3)
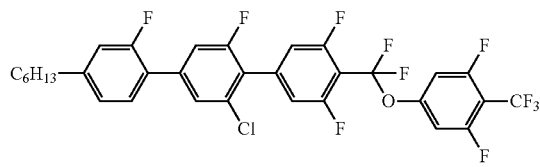
3.7 wt %
(1-3-1a)
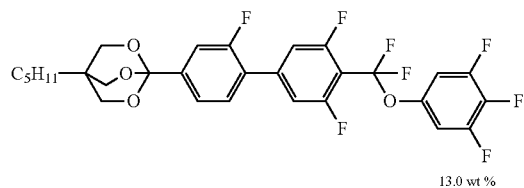
13.0 wt %
(2-1-4-3)
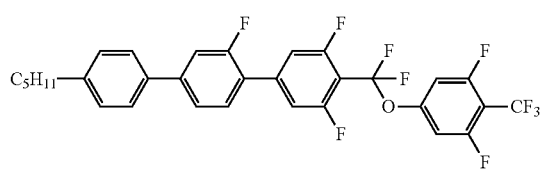
1.5 wt %
(2-1-4-3)
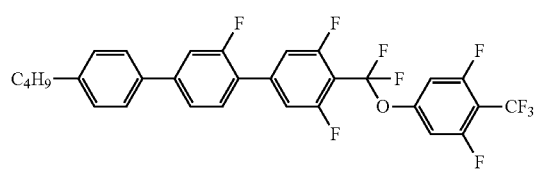
1.5 wt %
(4-4)
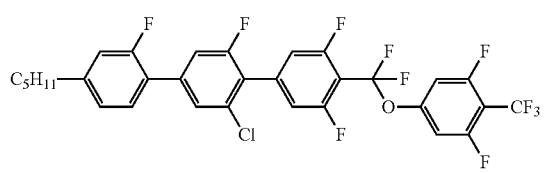
3.7 wt %
(4-4)
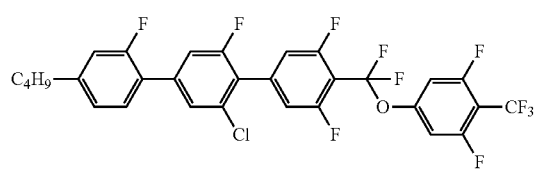
3.7 wt %
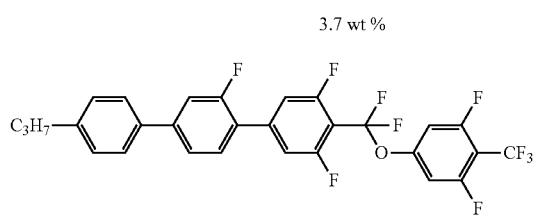
1.5 wt %
(4-4)
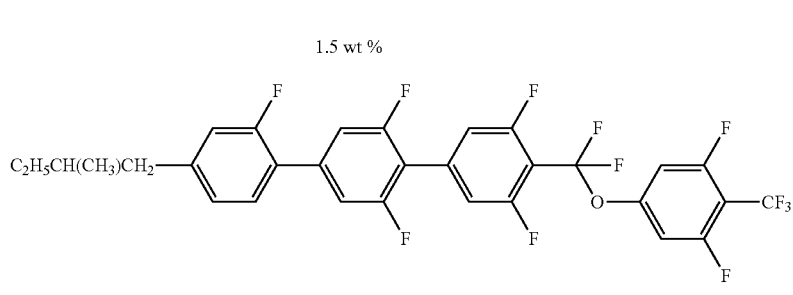
10.0 wt %

The phase transition temperature (° C.) of the liquid crystal composition B is expressed by "N 78.9 I".

Example 3

A liquid crystal composition C was prepared, which corresponds to an achiral component T obtained by mixing the liquid crystal compounds below in the following weight percentages. The corresponding general formulae are recited at the right side of the structural formulae.

Liquid Crystal Composition C

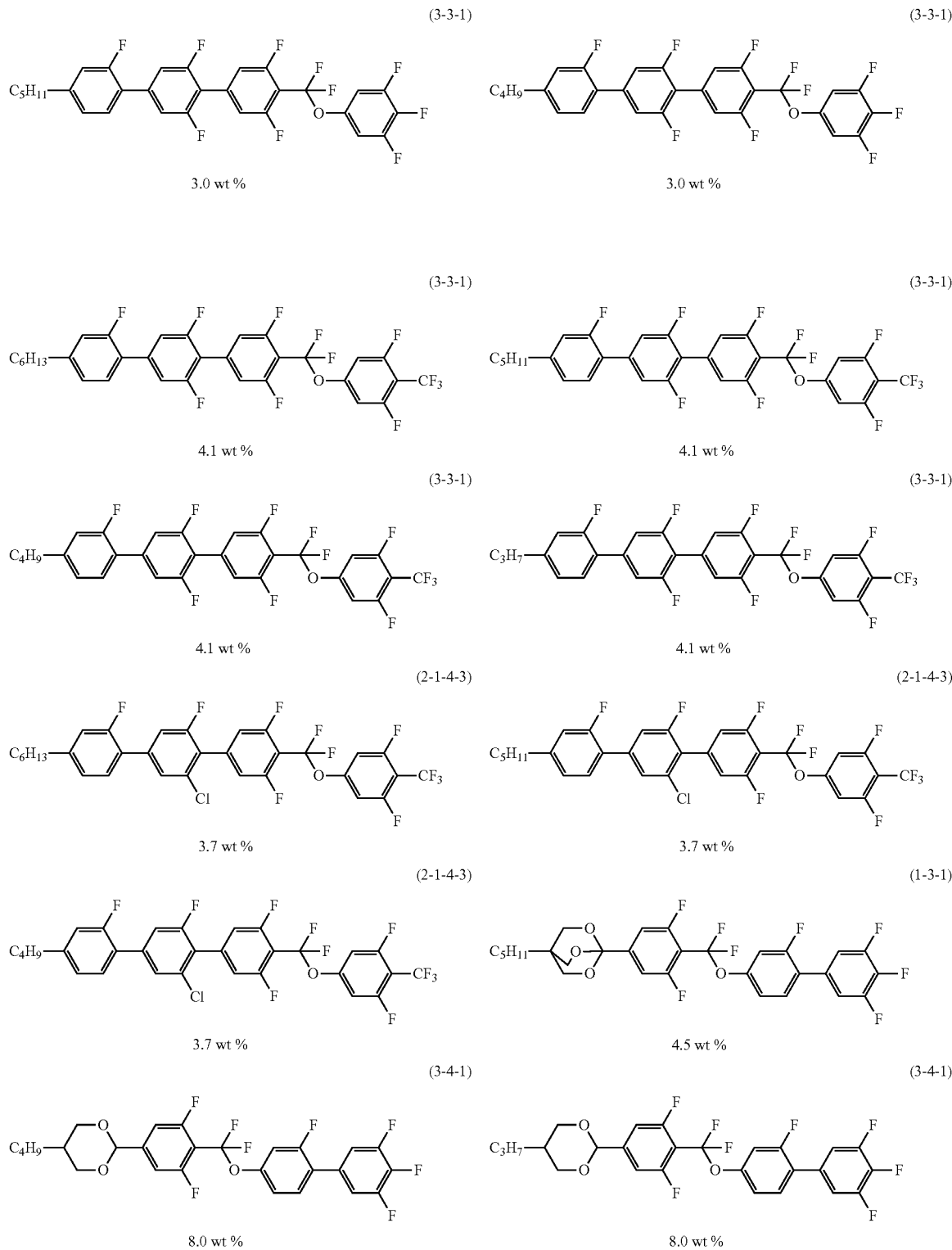

-continued
(3-4-1)
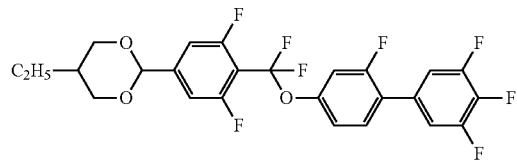
8.0 wt %
(3-5-2)
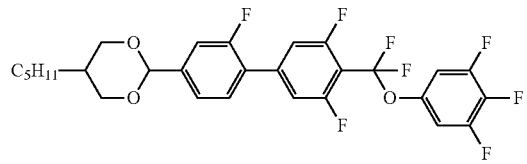
3.0 wt %
(3-5-2)
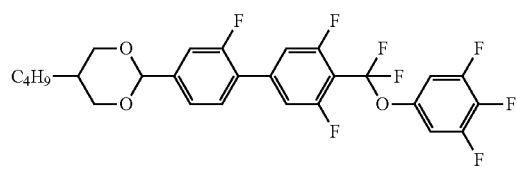
3.0 wt %
(3-5-2)
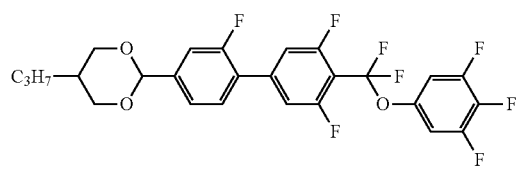
3.0 wt %
(5-2-2)
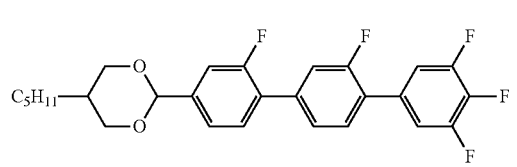
2.0 wt %
(5-2-2)
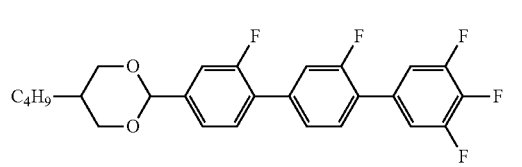
2.0 wt %
(5-2-2)
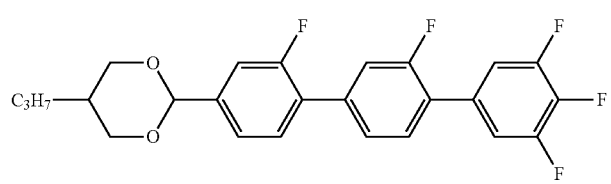
2.0 wt %
(1-2-1a)
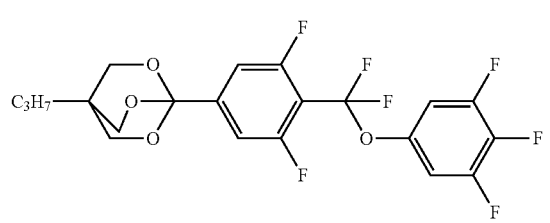
13.0 wt %
(4-4)
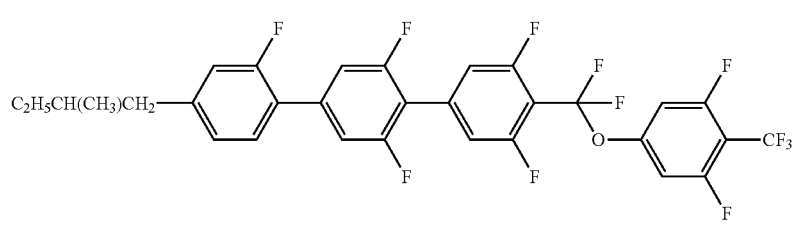
10.0 wt %

The phase transition temperature (° C.) of the liquid crystal composition C is expressed by "N 79.3 I".

Example 4

A liquid crystal composition D was prepared, which corresponds to an achiral component T obtained by mixing the liquid crystal compounds below in the following weight percentages. The corresponding general formulae are recited at the right side of the structural formulae.

Liquid Crystal Composition D

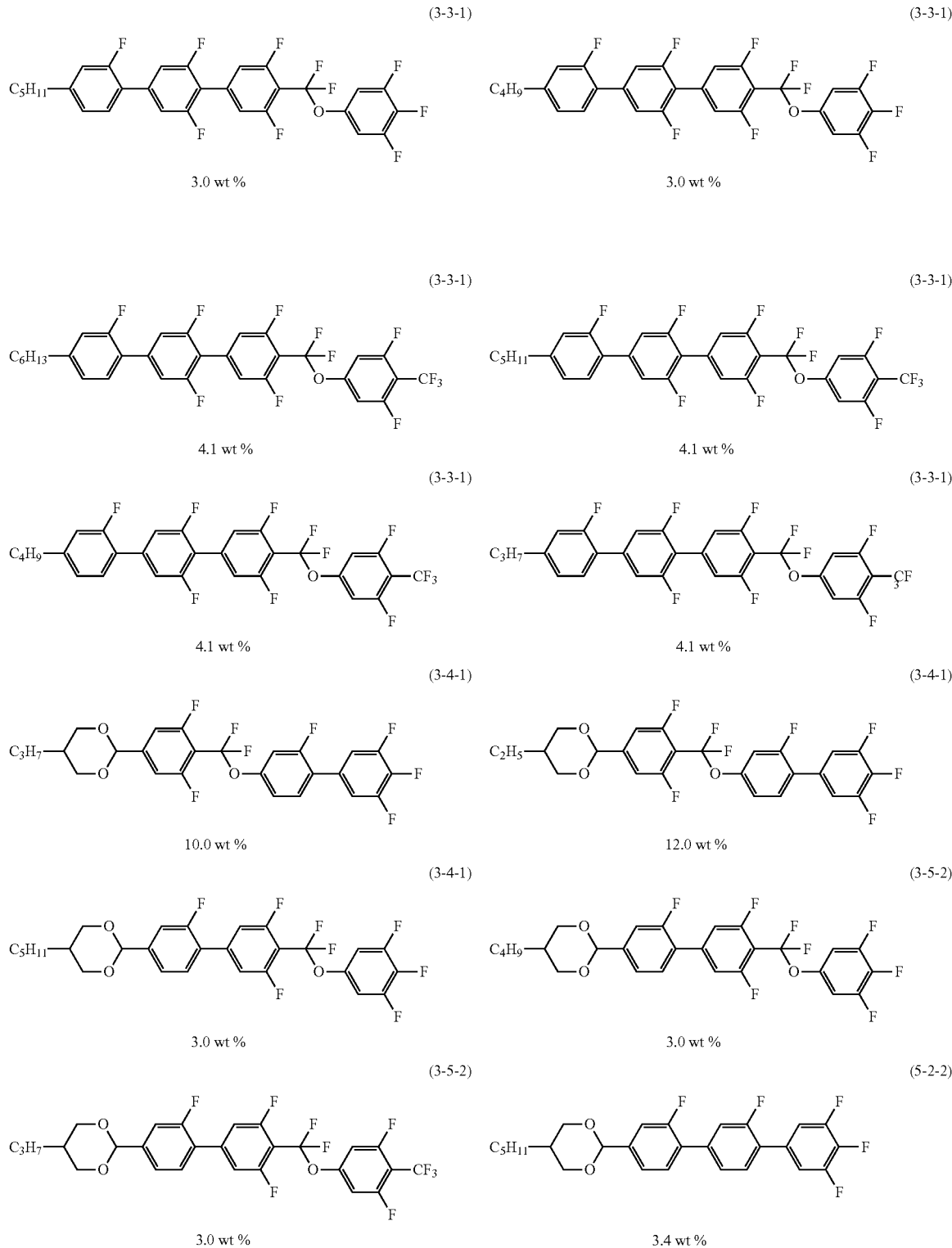

-continued
(2-1-4-3)
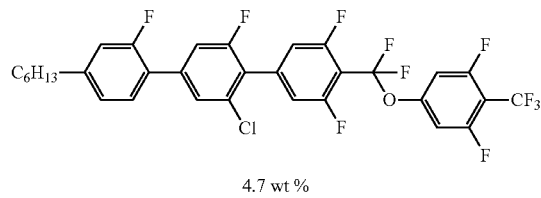
4.7 wt %
(2-1-4-3)
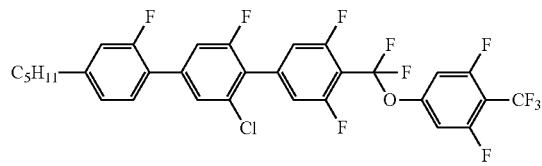
4.7 wt %
(2-1-4-3)
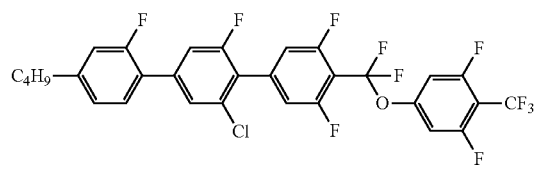
4.7 wt %
(4-4)
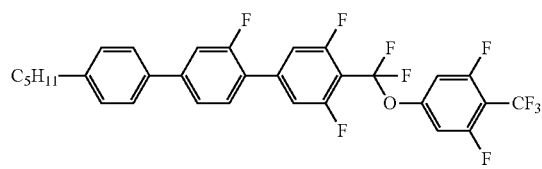
1.5 wt %
(4-4)
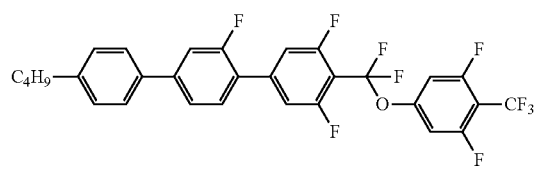
1.5 wt %
(4-4)
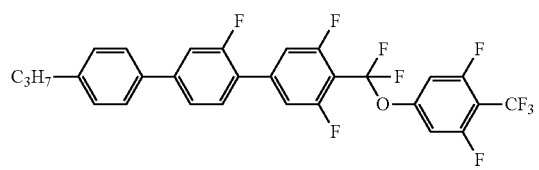
1.5 wt %
(4-4)
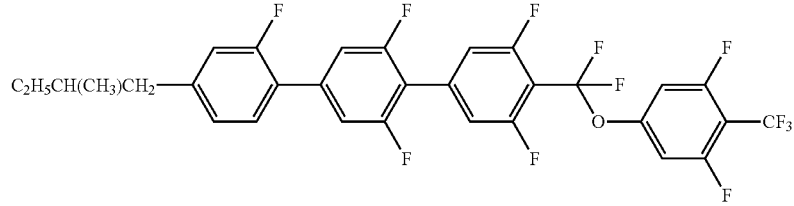
10.0 wt %
(5-2-2)
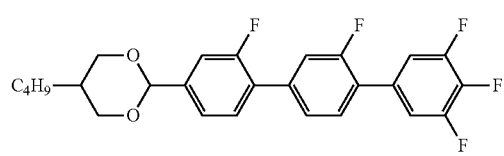
3.3 wt %
(5-2-2)
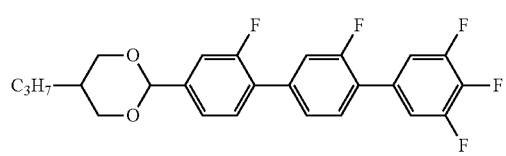
3.3 wt %
(1-3-1)
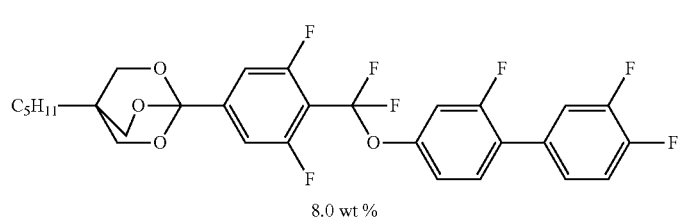
8.0 wt %

The phase transition temperature (° C.) of the liquid expressed by "N 81.6 I".

Example 5

A liquid crystal composition E was prepared, which corresponds to an achiral component T obtained by mixing the liquid crystal compounds below in the following weight percentages. The corresponding general formulae are recited at the right side of the structural formulae.

Liquid crystal composition E

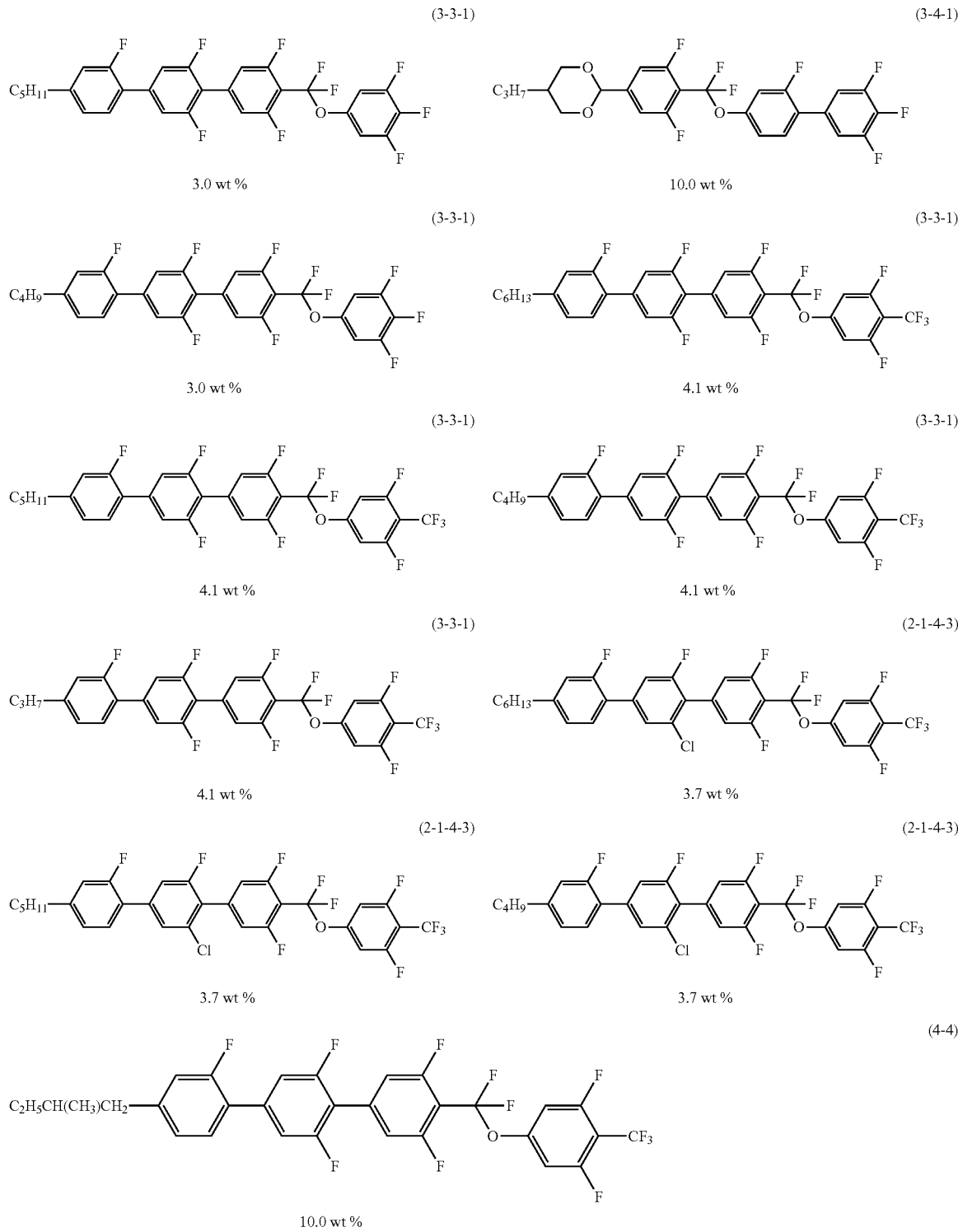

-continued
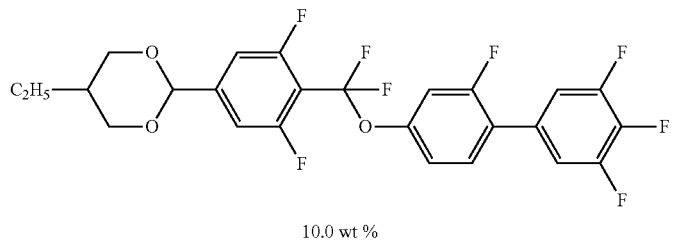
(3-4-1)
10.0 wt %
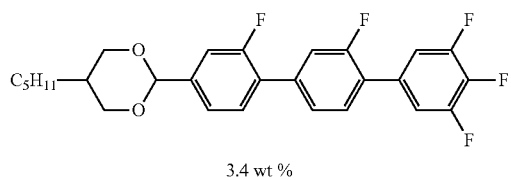
(5-2-2)
3.4 wt %
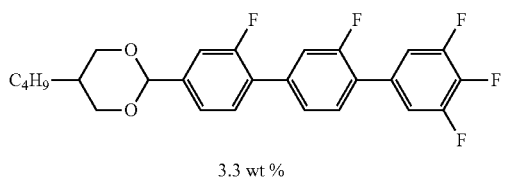
(5-2-2)
3.3 wt %
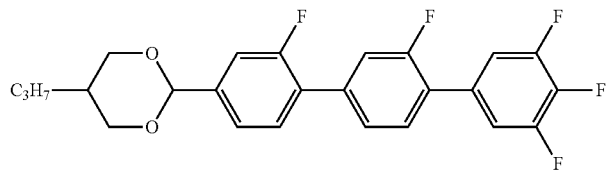
(5-2-2)
3.3 wt %
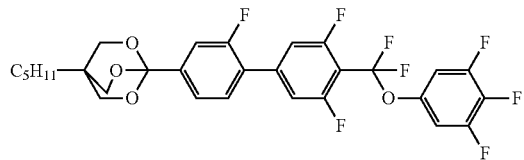
(1-3-1a)
10.0 wt %
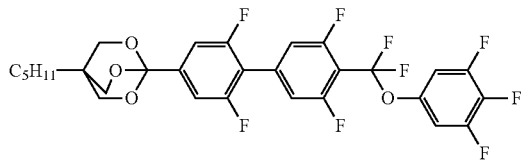
(1-3-1)
10.0 wt %
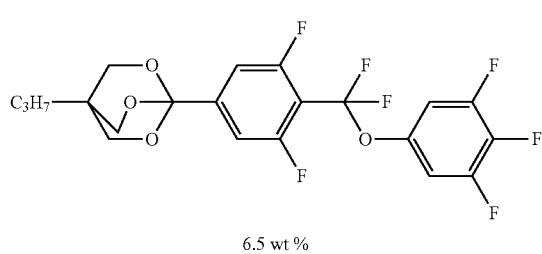
(1-2-1a)
6.5 wt %

The phase transition temperature (° C.) of the liquid crystal composition E is expressed by "N 78.3 I".

Example 6

A liquid crystal composition F was prepared, which corresponds to an achiral component T obtained by mixing the liquid crystal compounds below in the following weight percentages. The corresponding general formulae are recited at the right side of the structural formulae.

Liquid Crystal Composition F

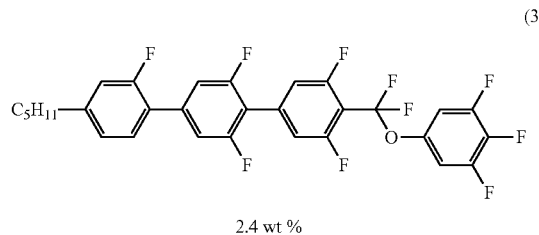

(3-3-1)

2.4 wt %

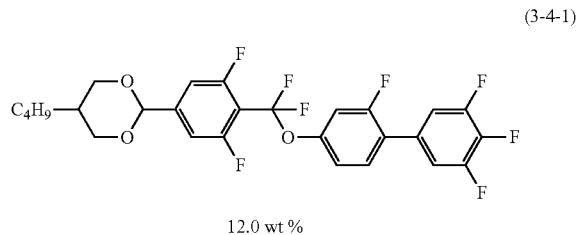

(3-4-1)

12.0 wt %

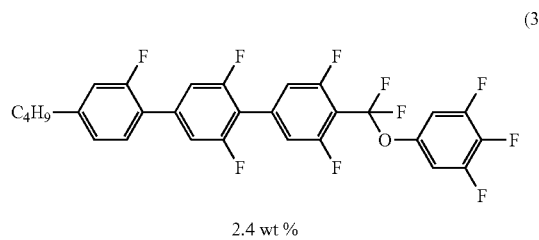

(3-3-1)

2.4 wt %

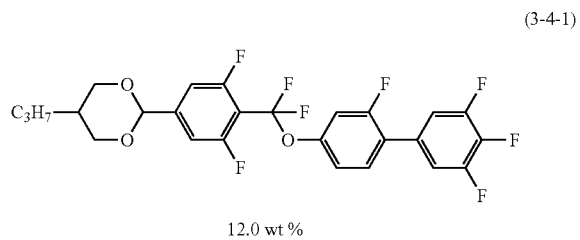

(3-4-1)

12.0 wt %

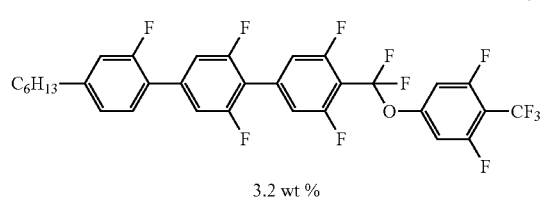

(3-3-1)

3.2 wt %

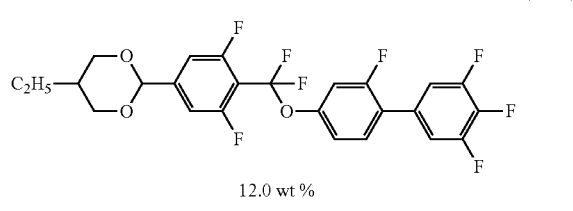

(3-4-1)

12.0 wt %

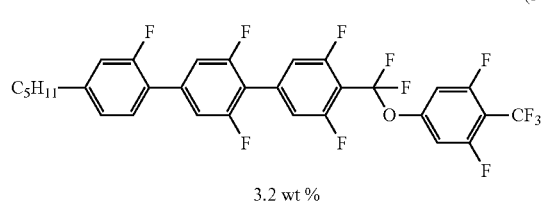

(3-3-1)

3.2 wt %

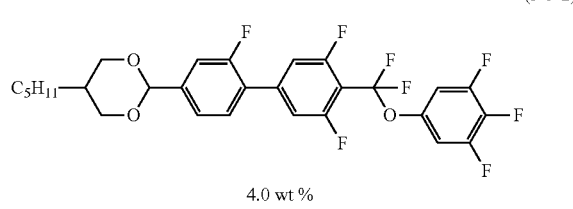

(3-5-2)

4.0 wt %

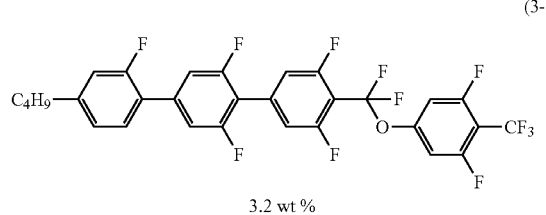

(3-3-1)

3.2 wt %

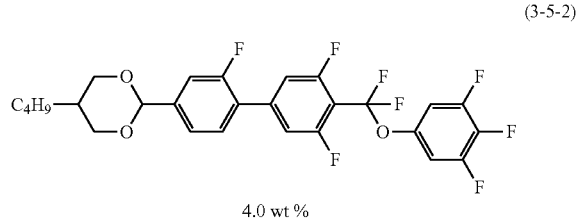

(3-5-2)

4.0 wt %

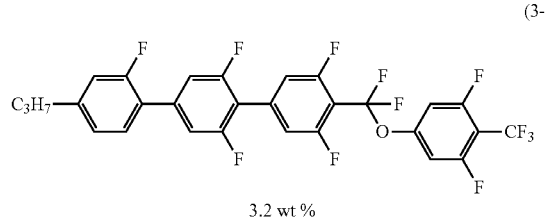

(3-3-1)

3.2 wt %

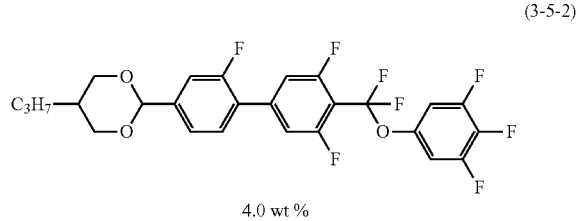

(3-5-2)

4.0 wt %

-continued

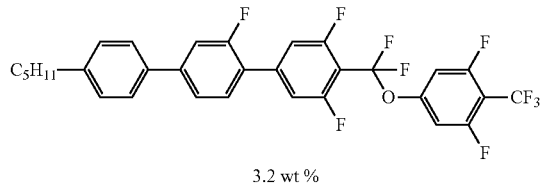

3.2 wt % (4-4)

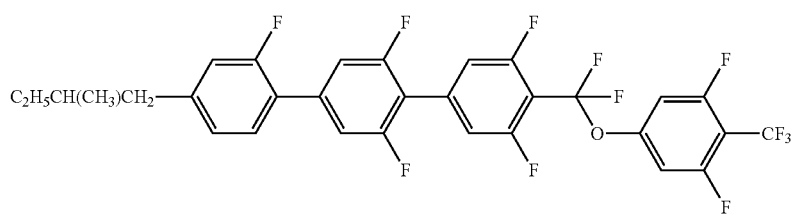

8.0 wt % (4-4)

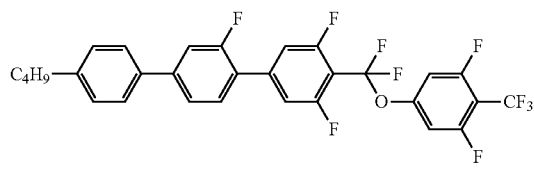

3.2 wt % (4-4)

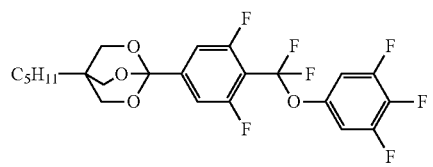

20.0 wt % (1-2-1)

The phase transition temperature (° C.) of the liquid crystal composition F is expressed by "N 60.3 I".

Example 7

A liquid crystal composition G was prepared, which corresponds to an achiral component T obtained by mixing the liquid crystal compounds below in the following weight percentages. The corresponding general formulae are recited at the right side of the structural formulae.

Liquid Crystal Composition G

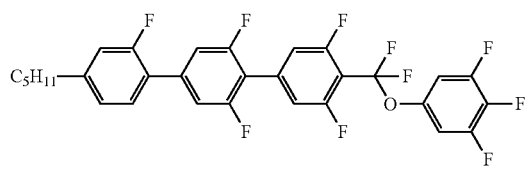

2.4 wt % (3-3-1)

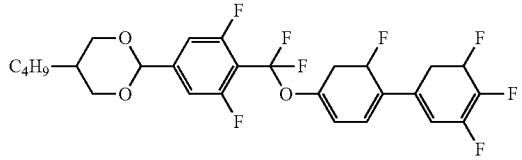

12.0 wt % (3-4-1)

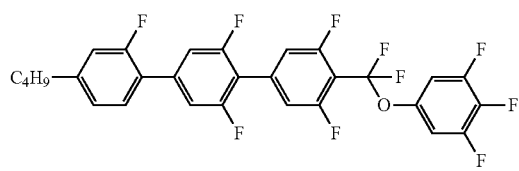

2.4 wt % (3-3-1)

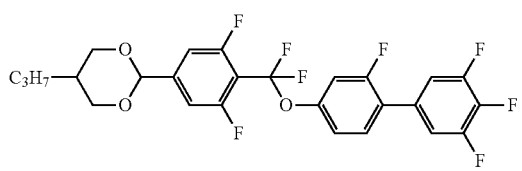

12.0 wt % (3-4-1)

-continued
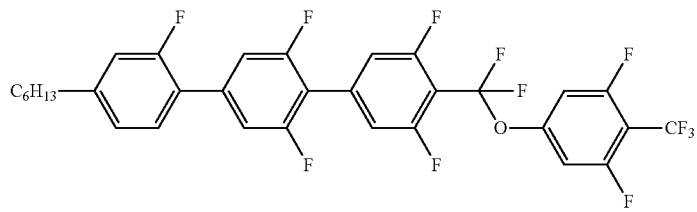
(3-3-1)
3.2 wt %
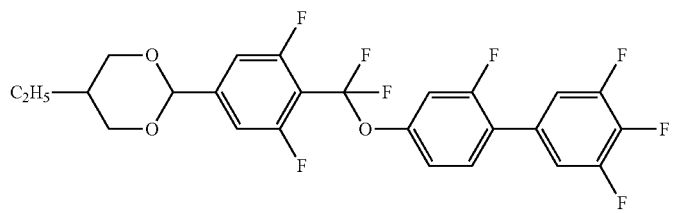
(3-4-1)
12.0 wt %
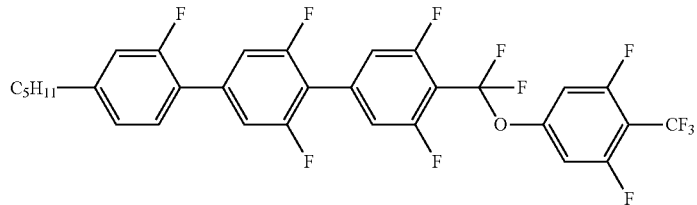
(3-3-1)
3.2 wt %
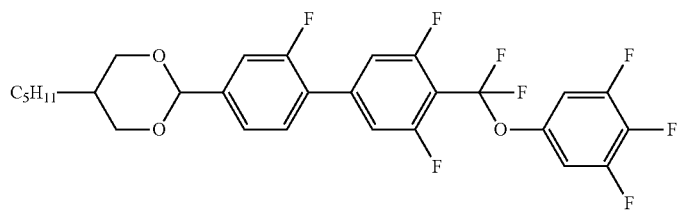
(3-5-2)
4.0 wt %
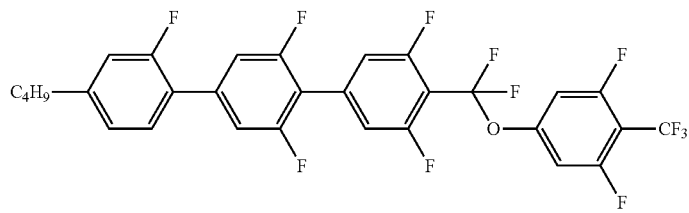
(3-3-1)
3.2 wt %
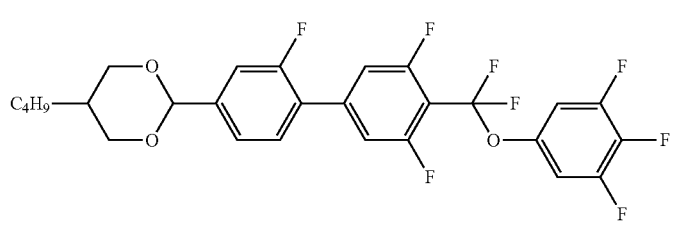
(3-5-2)
4.0 wt %

-continued
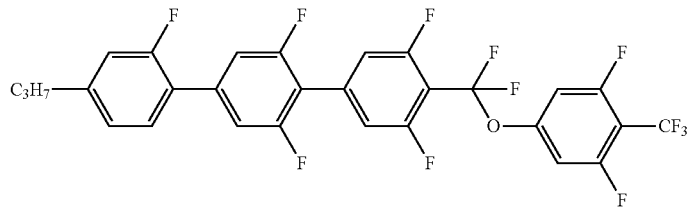
3.2 wt % (3-3-1)
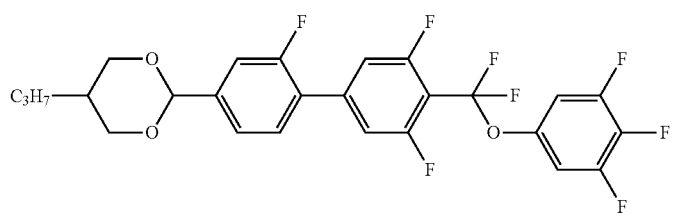
4.0 wt % (3-5-2)
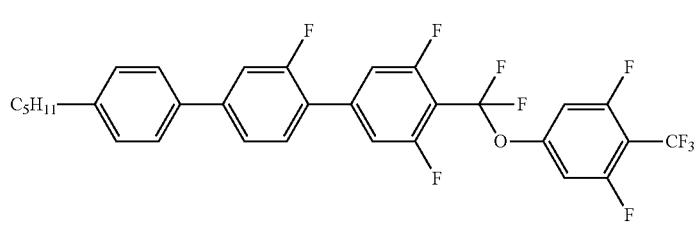
3.2 wt % (4-4)
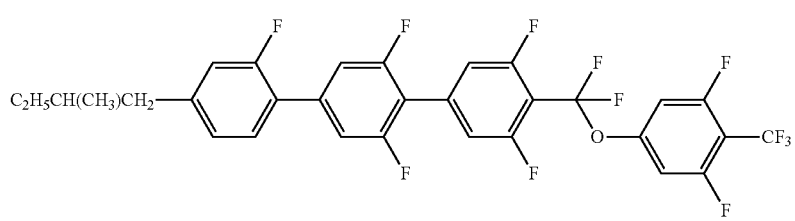
8.0 wt % (4-4)
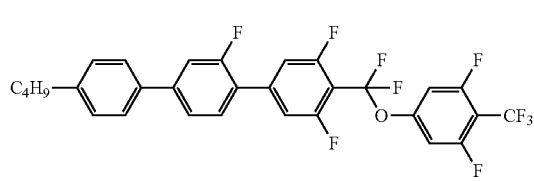
3.2 wt % (4-1)
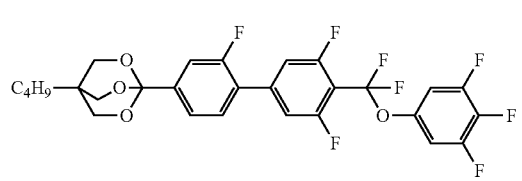
20.0 wt % (1-3-1)

The phase transition temperature (° C.) of the liquid crystal composition G is expressed by "N 90.0 I".
Example 8
Liquid Crystal Composition H
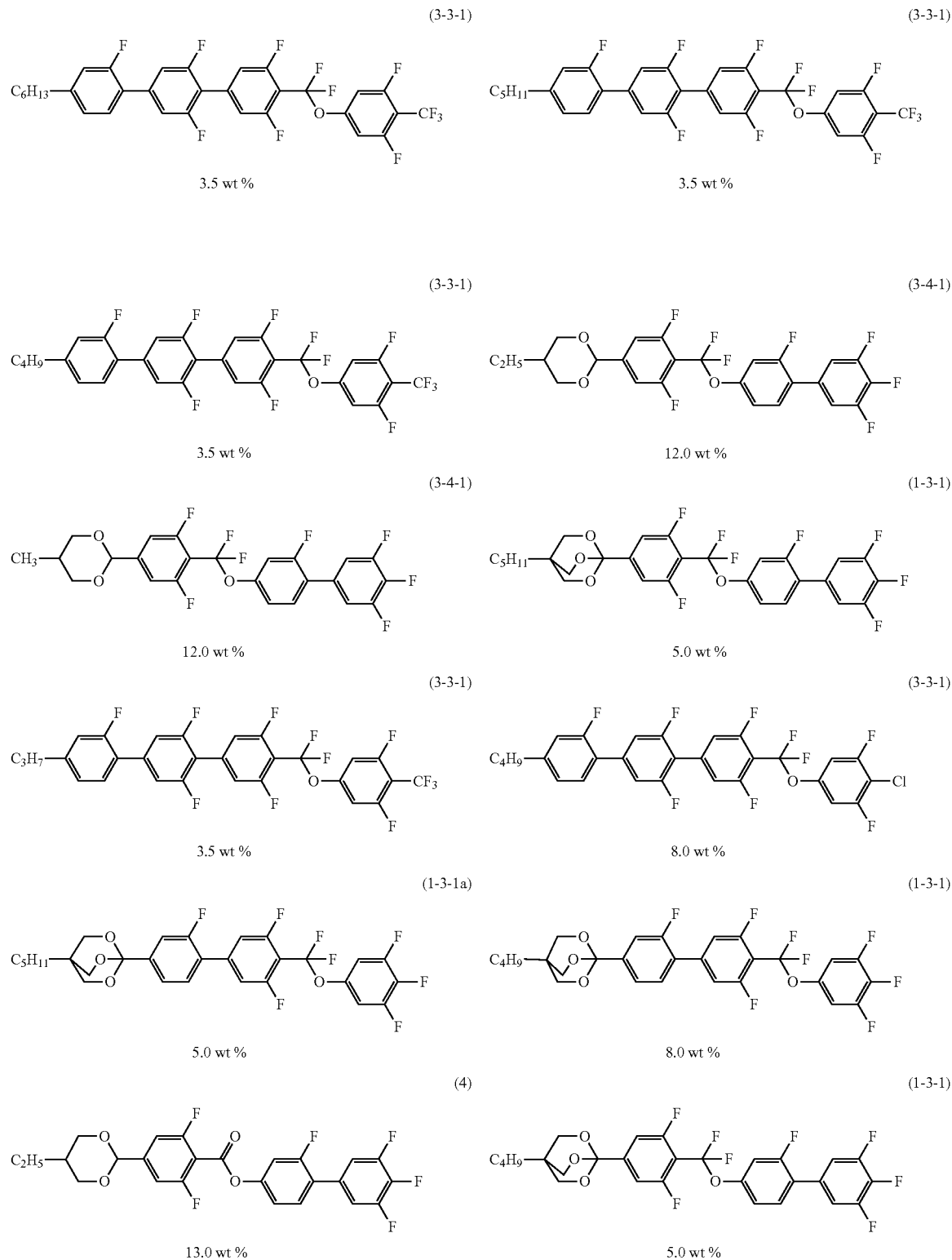

-continued
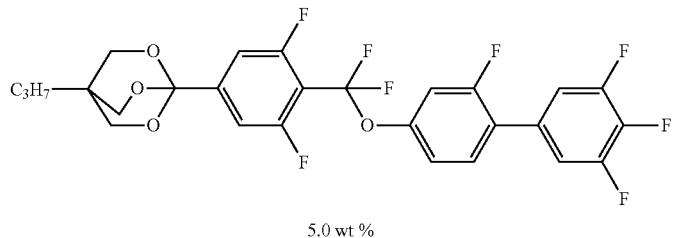
5.0 wt %
(1-3-1)
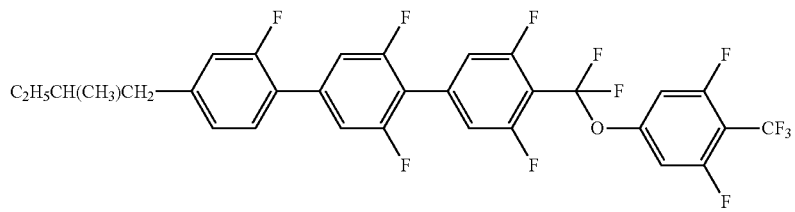
8.0 wt %
(4-4)
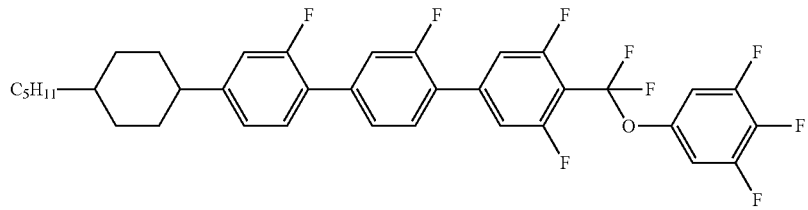
5.0 wt %
(4)
The phase transition temperature (° C.) of the liquid crystal composition H is expressed by "N 79.4 I".
Liquid Crystal Composition I
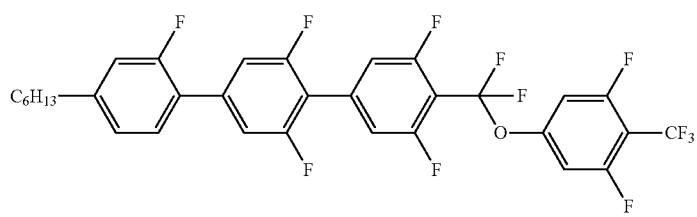
3.5 wt %
(3-3-1)
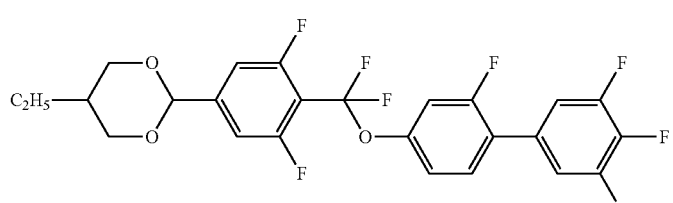
10.0 wt %
(3-4-1)

-continued
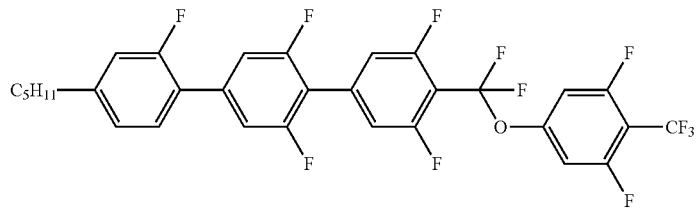
3.5 wt % (3-3-1)
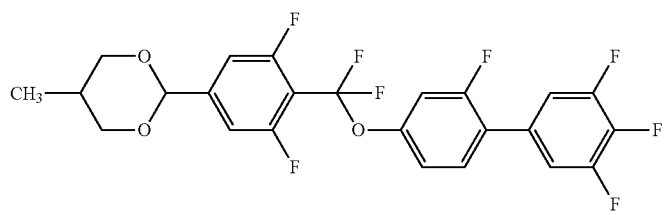
10.0 wt % (3-4-1)
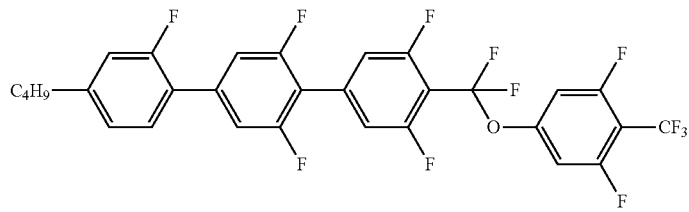
3.5 wt % (3-3-1)
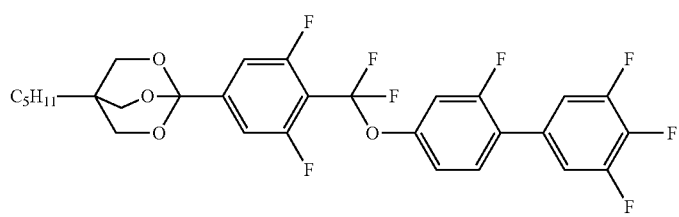
4.0 wt % (1-3-1)
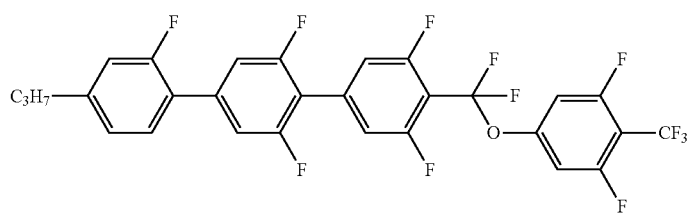
3.5 wt % (3-3-1)
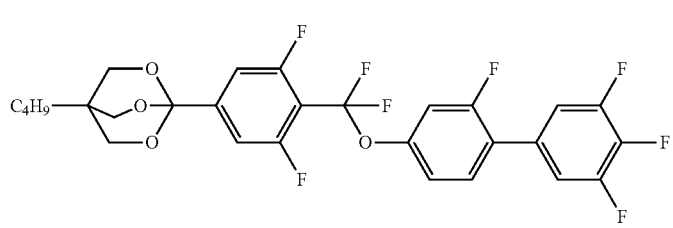
4.0 wt % (1-3-1)

(3-3-1)
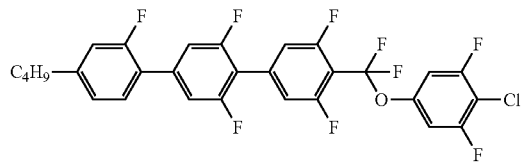
10.0 wt %
(1-3-1)
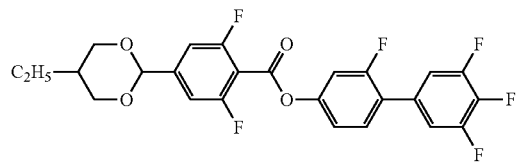
15.0 wt %
(1-3-1a)
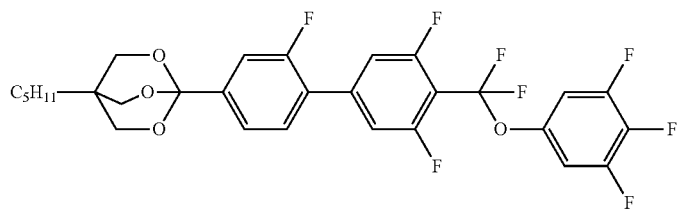
5.0 wt %
(4-4)
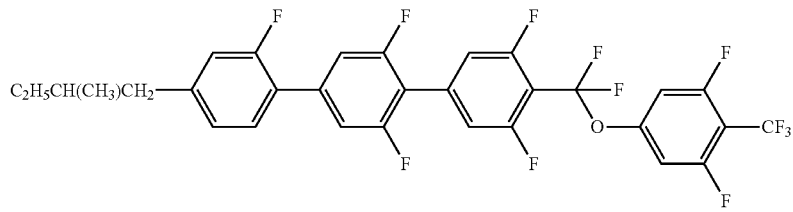
3.0 wt %
(1-3-1)
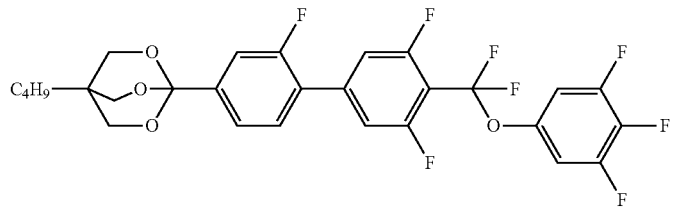
10.0 wt %
(4)
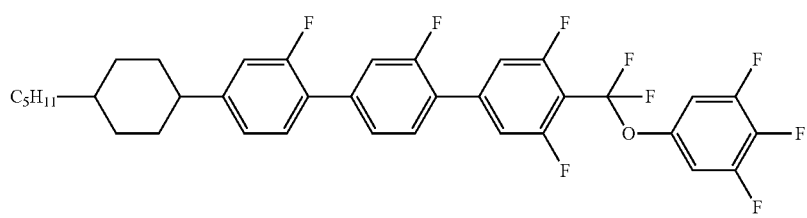
15.0 wt %

The phase transition temperature (° C.) of the liquid crystal composition I is expressed by "N 103.2 I".

Next, liquid crystal compositions A1 to G1 each including one of the liquid crystal compositions A to G (94.7 wt %) and the chiral dopants BN-H4 (2.65 wt %) and BN-H5 (2.65 wt %) of the formula below, and liquid crystal compositions H1 and I1 each including the liquid crystal composition H or I (92.0 wt %) and the chiral dopants BN-H4 (2.9 wt %) and BN-H5 (2.9 wt %), were prepared.

The phase transition temperatures (° C.) of the liquid crystal compositions A1 to I1 are respectively expressed as follows:

A1: N* 68.4 BP 75.7 I;
B1: N* 69.7 BP 71.7 I;
C1: N* 70.3 BP 71.9 BP+I 72.5 I;
D1: N* 72.7 BP 74.3 I;
E1: N* 69.3 BP 71.1 BP+I71.9 I;
F1: N* 52.1 BP 52.3 BP+I–I;
G1: N* 81.1 BP 82.5 BP+I 83.2 I;
H1: N* 72.6 BP 74.5 I;
I1: N* 96.8 BP 99.7 I.

Moreover, BN-H4 or BN-H5 was obtained from (R)-(+)-1,1'-bi(2-naphthol) and a corresponding carboxylic acid, with an esterification using dicyclohexylcarbodiimide (DCC).

BN-H4:

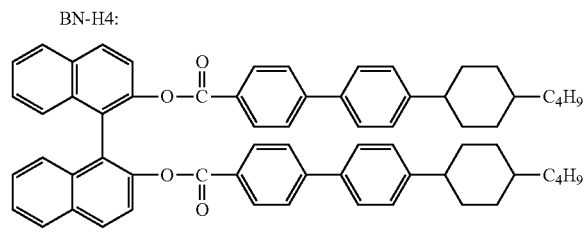

Example 9

Preparation of Mixture of Monomer and Liquid Crystal Composition

The liquid crystal composition A1 of 88.8 wt %, n-dodecyl acrylate of 6.0 wt %, 1,4-di(4-(6-(acryloyloxy)hexyloxy)benzoyloxy)-2-methylbenzene (LCA-6) of 4.8 wt %, and 2,2'-dimethoxyphenylacetophenone as a photo-polymerization initiator of 0.4 wt % were mixed to prepare a mixture A1-1M as a mixture of a liquid crystal composition and a monomer. Mixtures B1-1M to G1-1M were also prepared in the same way by replacing the liquid crystal composition A1 with B1 to G1. The phase transition temperatures (° C.) of the mixtures B1-1M to G1-1M are expressed below:

A1-1M: N* 38.7 BP 44.5 BP+I 50.6 I, I 49.3 BP+I 44.5 BP 36.0 N*;

B1-1M: N* 38.7 BP 43.8 BP+I 45.0 I, I 44.3 BP+I–BP 36.6 N*;

C1-1M: N* 39.2 BP 44.2 BP+I 46.1 I, I 47.0 BP+I 44.5 BP 36.5 N*;

D1-1M: N* 41.5 BP 46.7 BP+I 48.8 I, I 48.9 BP+I 46.2 BP 38.7 N*;

E1-1M: N* 37.4 BP 43.5 BP+I 46.6 I, I–BP+I 43.5 BP 35.2 N*;

F1-1M: N* 26.3 BP–I;

G1-1M: N* 47.6 BP–BP+I 54.4 I, I 53.2 BP+I–BP 45.9 N*.

The latter half of each expression is the phase transition temperatures observed in the cooling process, wherein a BP was also exhibited in the cooling process. Moreover, the symbol "-" means that the phase transition temperature could not be determined.

LCA-6

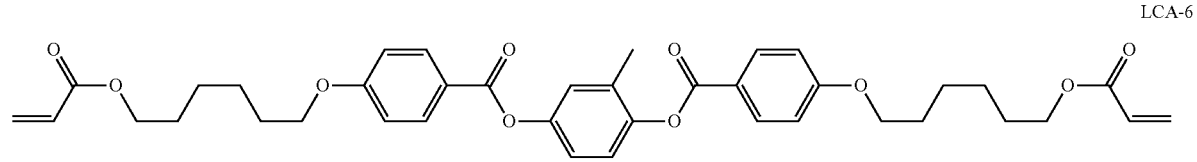 [SMILES: C=CC(=O)OCCCCCCOc1ccc(C(=O)Oc2ccc(OC(=O)c3ccc(OCCCCCCOC(=O)C=C)cc3)c(C)c2)cc1]

-continued

BN-H5

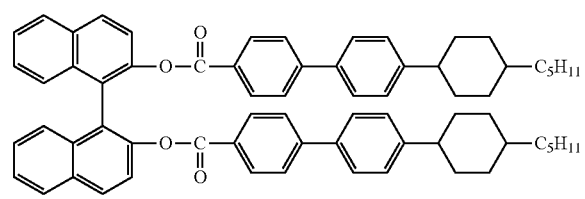

Example 10

Preparation of Mixture of Monomer and Liquid Crystal Composition

The liquid crystal composition A1 of 87.1 wt %, n-dodecyl acrylate of 7.0 wt %, 1,4-di(4-(8-(acryloyloxy)octyloxy)benzoyloxy)-2-methylbenzene (LCA-8) of 5.6 wt %, and 2,2'-dimethoxyphenylacetophenone as a photo-polymerization initiator of 0.4 wt % were mixed to prepare a mixture A1-2M as a mixture of a liquid crystal composition and a monomer.

The phase transition temperatures (° C.) of the mixture A1-2M are expressed by N* 39.7 BP 44.9 BP+I 45.8 I, I 45.4 BP+I 43.4 BP 35.9 N*.

The latter half of each expression is the phase transition temperatures observed in the cooling process, wherein a BP was also exhibited in the cooling process.

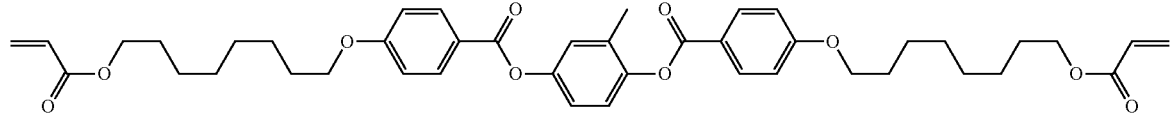

LCA-8

Example 11

Preparation of Mixture of Monomer and Liquid Crystal Composition

The liquid crystal composition H1 of 87.1 wt %, n-dodecyl acrylate of 7.0 wt %, 1,4-di(4-(8-(acryloyloxy)dodecyloxy) benzoyloxy)-2-methylbenzene (LCA-12) of 5.6 wt %, and 2,2'-dimethoxyphenylacetophenone as a photo-polymerization initiator of 0.4 wt % were mixed to prepare a mixture H1-3M as a mixture of a liquid crystal composition and a monomer. A mixture I1-3M was also prepared in the same way by replacing the liquid crystal composition H1 with I1.

The phase transition temperatures (° C.) of the mixture H1-3M and I1-3M are expressed as follows:

H1-3M: N* 57.5 BPI 61.4 BPII 64.3 BP+I 69.1 I, I 67.2 BP+I 63.1 BP 55.1 N*;

I1-3M: N* 36.0 BP 41.0 BP+I 44.5 I, I 43.1 BP+I–BP 34.7 N*.

The latter half of each expression is the phase transition temperatures observed in the cooling process, wherein a BP was also exhibited in the cooling process. Moreover, the symbol "–" means that the phase transition temperature could not be determined.

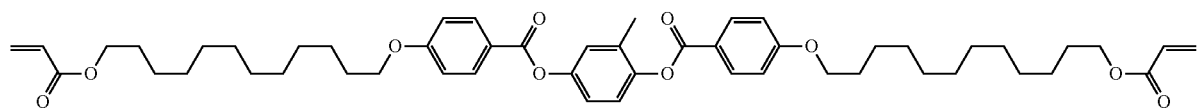

LCA-12

Example 12

Preparation of Polymer/Liquid Crystal Composite Material

Each of the mixtures A1-1M to G1-1M, A1-2M, H1-3M and I1-3M was held between a non-aligned comb-like electrode substrate and the opposite glass substrate (without electrode) with a cell gap of 8 μm, and then the resulting liquid crystal cell was heated until the liquid crystal became a blue phase at 39.2° C. for A1-1M, 39.2° C. for B1-1M, 37.7° C. for C1-1M, 41.8° C. for D1-1M, 37.9° C. for E1-1M, 26.5° C. for F1-1M, 47.8° C. for G1-1M, 40.2° C. for A1-2M, 58.2° C. for H1-3M, or 36.4° C. for I1-3M. In this state, the cell was irradiated with UV light of 365 nm in an intensity of 23 mW·cm$^{-2}$ for 1 min for polymerization.

The polymer/liquid crystal composite materials A1-1P to G1-1P, A1-2P, H1-3P and I1-3P thus prepared each maintained an optically isotropic liquid crystal phase even being cooled to room temperature.

Moreover, as shown in FIG. 1, the electrodes on the comb-like electrode substrate were arranged such that parts of the electrode 1 extending from the left side and parts of the electrode 2 from the right side were alternatively arranged. Therefore, when a potential difference is present between the electrodes 1 and 2, the comb-like electrode substrate is provided with an electric field in two (upward and downward) directions of the figure in the view of one electrode, as shown in FIG. 1.

Example 13

Figure 2:
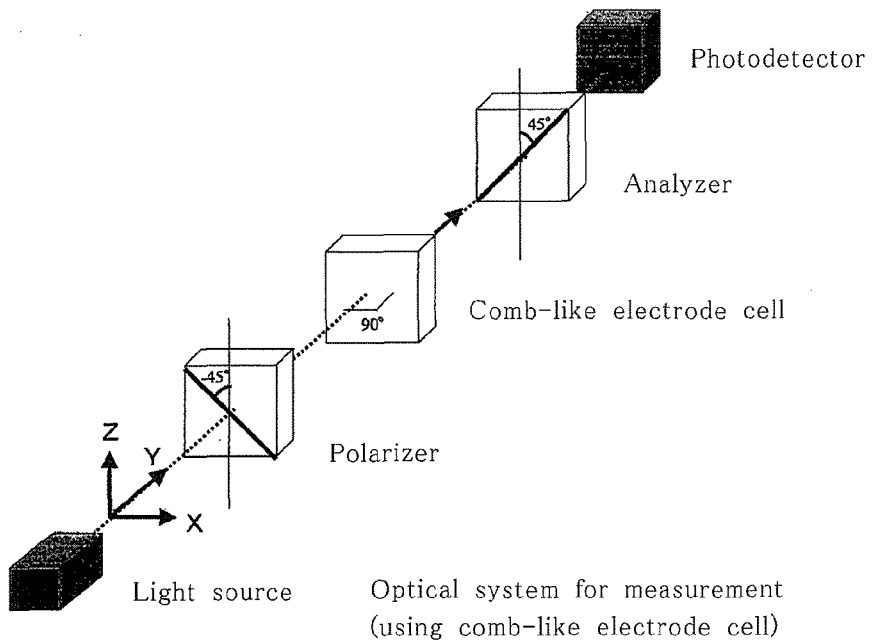
FIG. 2 shows an optical system used in an embodiment.

Each of the polymer/liquid crystal composite materials A1-1P to G1-1P, A1-2P, H1-3P and I1-3P obtained in Example 12 was held between a liquid crystal cell and arranged in the optical system of FIG. 2 to measure its electrooptical properties. The light source was the white light source of a polarizing microscope Eclipse LV100POL manufactured by Nikon. The above liquid crystal cell was arranged in the optical system in a manner such that the incident light on the cell was perpendicular to the surface of the cell, and the line direction of the comb-like electrode was at 45° with respect to the polarizer and the analyzer, respectively. The correlation of the voltage and the transmittance was investigated at room temperature. When a rectangular wave of 25 V to 40 V was applied, the transmittance was 80% or more and the transmitted light intensity was saturated.

Example 14

A liquid crystal cell holding the polymer/liquid crystal composite material A1-2P obtained in Example 12 was arranged in the optical system of FIG. 2 to measure its electrooptical properties. The light source was the white light source of a polarizing microscope Eclipse LV100POL manufactured by Nikon. The above liquid crystal cell was arranged in the optical system in a manner such that the incident light on the cell was perpendicular to the surface of the cell, and the line direction of the comb-like electrode was at 45° with respect to the polarizer and the analyzer, respectively. The correlation of the voltage and the transmittance was investigated at room temperature. When a rectangular wave of 40 V was applied, the transmittance was 81% and the transmitted light intensity was saturated. Regarding the electrooptical response, the rise time was 1.7 ms and the decay time was 0.8 ms.

Comparative Example 1
A liquid crystal composition J was prepared, which corresponds to an achiral component T obtained by mixing the liquid crystal compounds below in the following weight percentages. The corresponding general formulae are recited at the right side of the structural formulae.
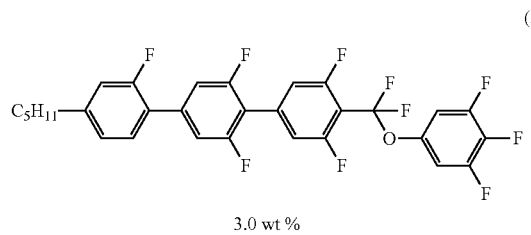
(3-3-1)
3.0 wt %
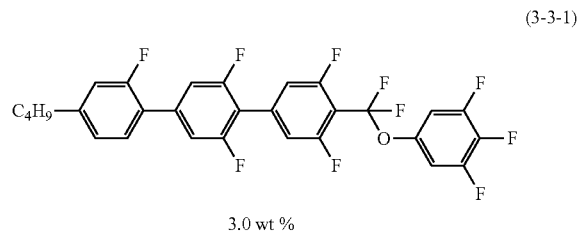
(3-3-1)
3.0 wt %
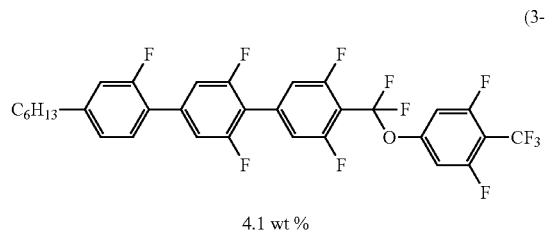
(3-3-1)
4.1 wt %
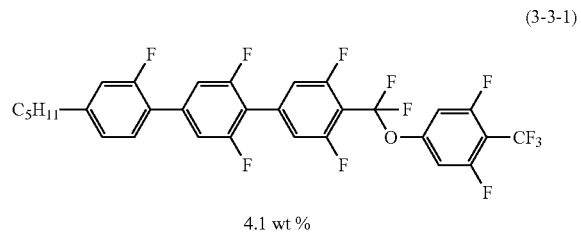
(3-3-1)
4.1 wt %
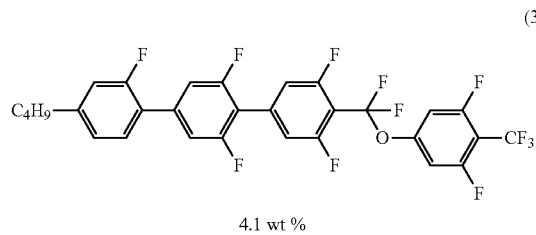
(3-3-1)
4.1 wt %
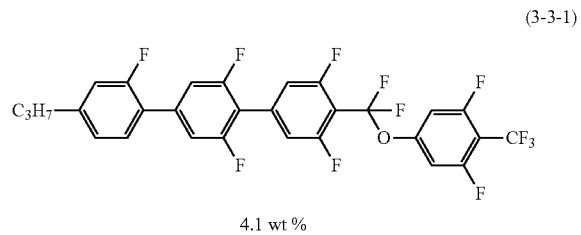
(3-3-1)
4.1 wt %
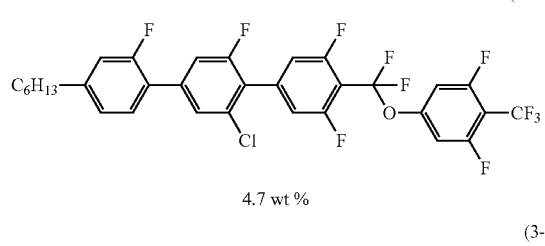
(2-1-4-3)
4.7 wt %
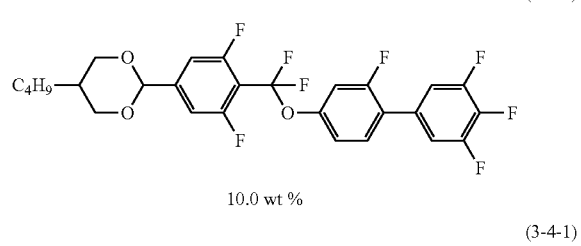
(3-4-1)
10.0 wt %
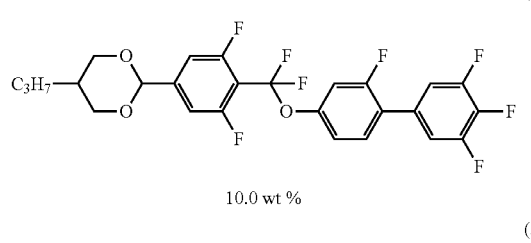
(3-4-1)
10.0 wt %
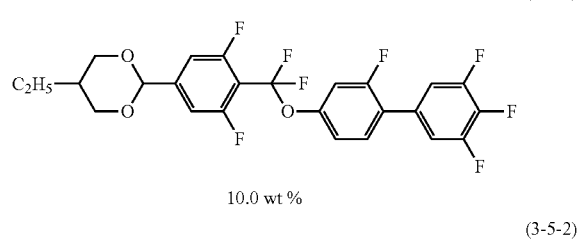
(3-4-1)
10.0 wt %
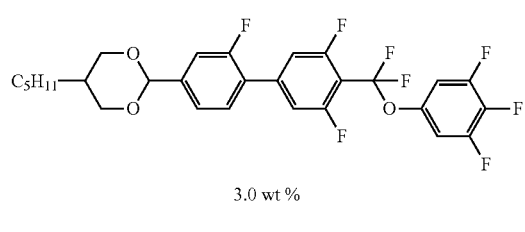
(3-5-2)
3.0 wt %
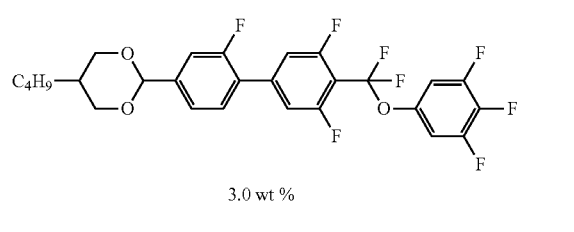
(3-5-2)
3.0 wt %

-continued (3-5-2)
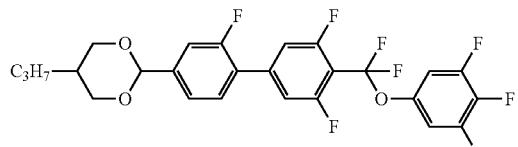
3.0 wt %

(5-2-2)
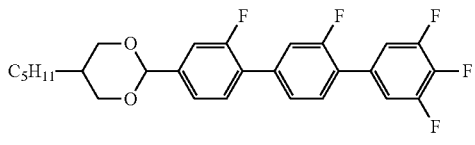
3.4 wt %

(2-1-4-3)
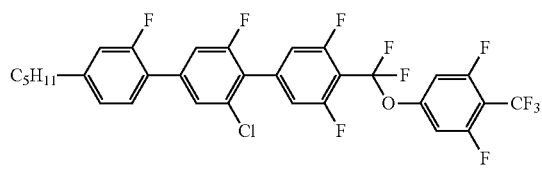
4.7 wt %

(2-1-4-3)
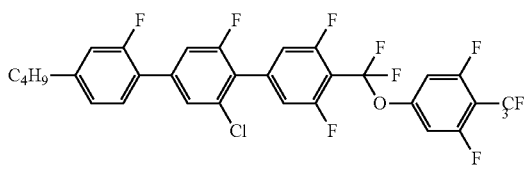
4.7 wt %

(4-4)
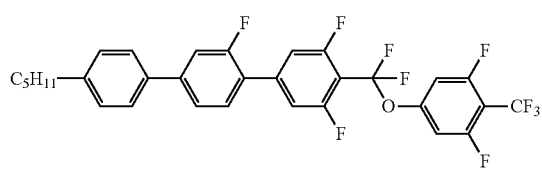
1.5 wt %

(4-4)
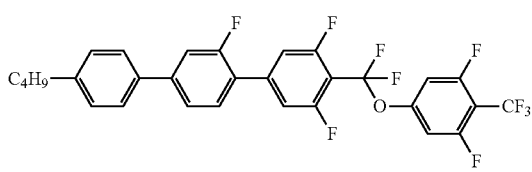
1.5 wt %

(4-4)
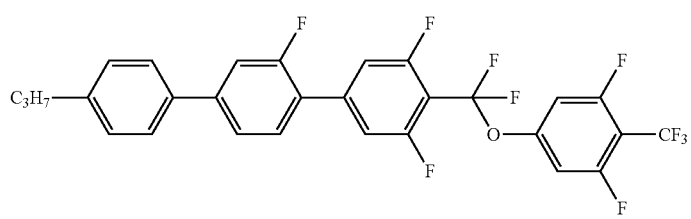
1.5 wt %

(4-4)
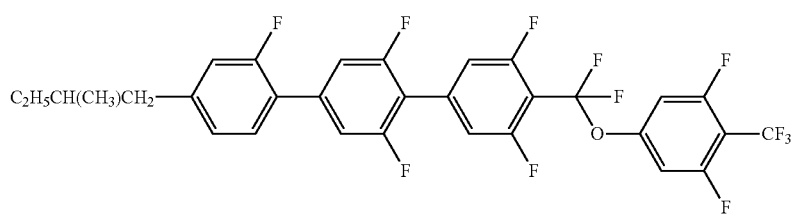
10.0 wt %

(5-2-2)
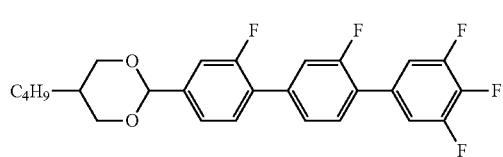
3.3 wt %

(5-2-2)
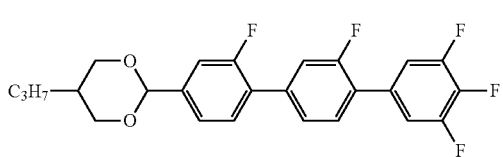
3.3 wt %

The phase transition temperature of the liquid crystal composition J is expressed by "N 79.1 I".

Next, a liquid crystal compositions J1 including the liquid crystal composition J (88.8 wt %) and the above chiral dopants BN-H4 (2.55 wt %) and BN-H5 (2.55 wt %) was prepared.

The phase transition temperatures (° C.) of the liquid crystal composition J1 is expressed by "N* 70.3 BP 71.6 BP+I 72.9 I".

Comparative Example 2

Preparation of Mixture of Monomer and Liquid Crystal Composition

The liquid crystal composition J1 of 88.8 wt %, n-dodecyl acrylate of 6.0 wt %, 1,4-di(4-(6-(acryloyloxy)hexyloxy) benzoyloxy)-2-methylbenzene (LCA-6) of 4.8 wt %, and 2,2'-dimethoxyphenylacetophenone as a photo-polymerization initiator of 0.4 wt % were mixed to prepare a mixture J1-1M as a mixture of a liquid crystal composition and a monomer.

The phase transition temperatures (° C.) of the mixture J1-1M are expressed by "N* 39.8 BP 44.1 BP+I–I, I–BP+I 43.1 BP 37.1 N*". The symbol "–" means that the phase transition temperature could not be determined.

Preparation of Polymer/Liquid Crystal Composite Material

The mixture J1-1M was held between a non-aligned comb-like electrode substrate and the opposite glass substrate (without electrode) with a cell gap of 10 μm, and then the resulting liquid crystal cell was heated until the liquid crystal became a blue phase at 40.1° C. In this state, the cell was irradiated with UV light of 365 nm in an intensity of 23 mW·cm$^{-2}$ for 1 min for polymerization.

The polymer/liquid crystal composite material J1-1P thus prepared maintained an optically isotropic liquid crystal phase even being cooled to room temperature.

Moreover, as shown in FIG. 1, the electrodes on the comb-like electrode substrate were arranged such that parts of the electrode 1 extending from the left side and parts of the electrode 2 from the right side were alternatively arranged. Therefore, when a potential difference is present between the electrodes 1 and 2, the comb-like electrode substrate is provided with an electric field in two (upward and downward) directions of the figure in the view of one electrode, as shown in FIG. 1.

Comparative Example 3

A liquid crystal cell holding the polymer/liquid crystal composite material J1-1P obtained in Comparative Example 2 was arranged in the optical system of FIG. 2 to measure its electrooptical properties. The light source was the white light source of a polarizing microscope Eclipse LV100POL manufactured by Nikon. The above liquid crystal cell was arranged in the optical system in a manner such that the incident light on the cell was perpendicular to the surface of the cell, and the line direction of the comb-like electrode was at 45° with respect to the polarizer and the analyzer, respectively. The correlation of the voltage and the transmittance was investigated at room temperature. When a rectangular wave of 43 V was applied, the transmittance was 83% and the transmitted light intensity was saturated.

As mentioned above, the optical device of this invention can be driven by a low voltage and exhibits a BP in the cooling process, and is therefore advantageous over the prior art. Moreover, since a BP is exhibited in the cooling process, in the fabricating process of the optical device, the polymer/liquid crystal composite material can be easily prepared. This indicates the usefulness of the optical device of this invention.

INDUSTRIAL UTILITY

The applications of this invention include, for example, optical devices, such as display devices using polymer/liquid crystal composites, and so on.

What is claimed is:

1. A liquid crystal composition exhibiting an optically isotropic liquid crystal phase, the liquid crystal composition comprising an achiral component T and a chiral dopant, wherein the achiral component T contains, as a first component thereof, at least one compound selected from the group consisting of compounds represented by formula (1),

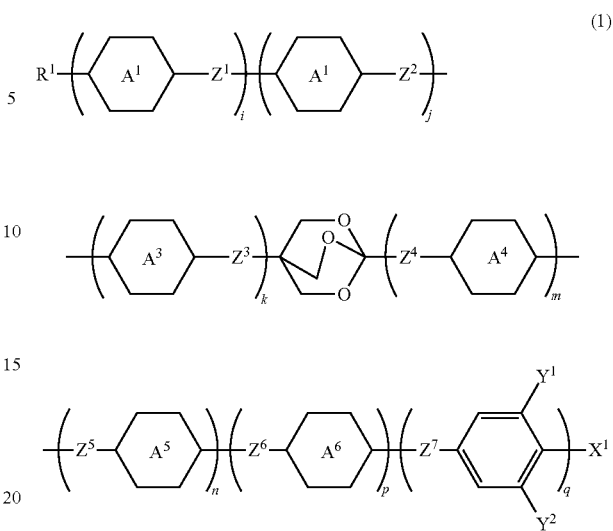

wherein $R^1$ is $C_{1\text{-}10}$ alkyl in which at least one —$CH_2$— is optionally replaced by —O— and at least one —$(CH_2)_2$— is optionally replaced by —CH=CH—; ring $A^1$, ring $A^2$, ring $A^3$, ring $A^4$, ring $A^5$ and ring $A^6$ are independently 1,4-cyclohexylene or 1,4-phenylene, wherein in the 1,4-cyclohexylene at least one —$CH_2$— is optionally replaced by —O— and least one —$(CH_2)_2$— is optionally replaced by —CH=CH—, and in the 1,4-phenylene at least one —CH= is optionally replaced by —N= and at least one hydrogen is optionally replaced by halogen; $Z^1$, $Z^2$, $Z^3$, $Z^4$, $Z^5$, $Z^6$ and $Z^7$ are independently a single bond, —$(CH_2)_2$—, —COO—, —OCO—, —$CF_2O$—, —$OCF_2$— or —CH=CH—; $X^1$ is fluorine, —$CF_3$ or —$OCF_3$; $Y^1$ and $Y^2$ are independently hydrogen or fluorine; i, j, k, m, n, p and q are independently 0 or 1; and i+j+k+m+n+p+q is 1, 2, 3 or 4.

2. The liquid crystal composition of claim 1, wherein in formula (1), i+j+k+m+n+p+q is 2, 3 or 4.

3. The liquid crystal composition of claim 1, wherein in formula (1), q is 1.

4. The liquid crystal composition of claim 1, wherein in formula (1), $R^1$ is a straight alkyl of $C_{1\text{-}10}$, a straight alkenyl of $C_{2\text{-}10}$ or a straight alkoxy of $C_{1\text{-}9}$; the ring $A^1$, the ring $A^2$, the ring $A^3$, the ring $A^4$, the ring $A^5$ and the ring $A^6$ are independently 1,4-cyclohexylene, 1,4-cyclohexenylene, tetrahydropyran-2,5-diyl, or 1,4-phenylene in which at least one hydrogen is optionally replaced by fluorine or chlorine; and $Z^1$, $Z^2$, $Z^3$, $Z^4$, $Z^5$, $Z^6$ and $Z^7$ are independently a single bond, —$(CH_2)_2$—, —COO—, —$CF_2O$— or —CH=CH—.

5. The liquid crystal composition of claim 1, wherein in formula (1), $R^1$ is a straight alkyl of $C_{1\text{-}10}$; the ring $A^1$, the ring $A^2$, the ring $A^3$, the ring $A^4$, the ring $A^5$ and the ring $A^6$ are independently 1,4-cyclohexylene, 1,4-phenylene, tetrahydropyran-2,5-diyl, 3-fluoro-1,4-phenylene or 3,5-difluoro-1,4-phenylene; and $Z^1$, $Z^2$, $Z^3$, $Z^4$, $Z^5$, $Z^6$ and $Z^7$ are independently a single bond, —$(CH_2)_2$—, —COO—, —$CF_2O$— or —CH=CH—.

6. The liquid crystal composition of claim 1, wherein the first component comprises at least one compound selected from the group consisting of compounds represented by formula (1-1-1):

(1-1-1)

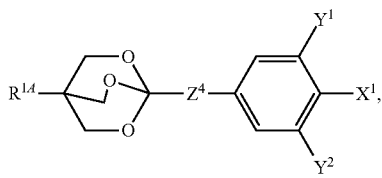

(1-3-1)

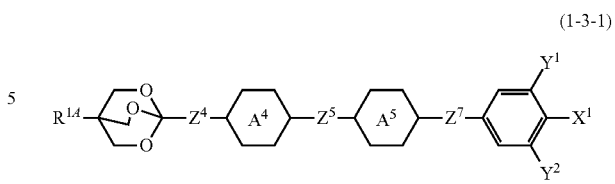

wherein $R^{14}$ is a straight alkyl of $C_{1-10}$, $Z^4$ is a single bond; —$(CH_2)_2$—, —COO—, —$CF_2O$— or —CH=CH—; $X^1$ is fluorine, —$CF_3$ or —$OCF_3$—; and $Y^1$ and $Y^2$ are independently hydrogen or fluorine.

7. The liquid crystal composition of claim 1, wherein the first component comprises at least one compound selected from the group consisting of compounds represented by formulae (1-2-1) and (1-2-2):

(1-2-1)

(1-2-2)

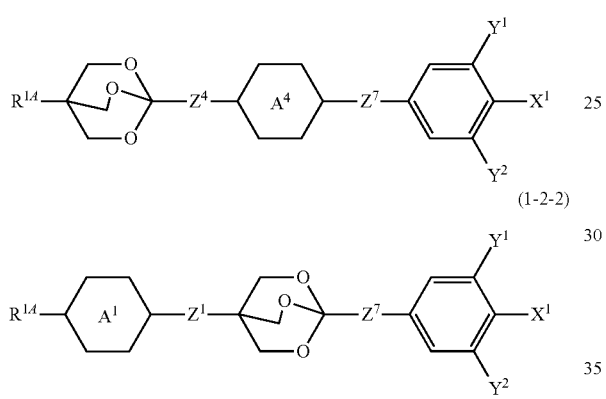

wherein $R^{14}$ is a straight alkyl of $C_{1-10}$; the ring $A^1$ and the ring $A^4$ are independently 1,4-cyclohexylene, 1,4-phenylene, tetrahydropyran-2,5-diyl, 3-fluoro-1,4-phenylene or 3,5-difluoro-1,4-phenylene; $Z^1$, $Z^4$ and $Z^7$ are independently a single bond, —$(CH_2)_2$—, —COO—, —$CF_2O$— or —CH=CH—; $X^1$ is fluorine, —$CF_3$ or —$OCF_3$—; $Y^1$ and $Y^2$ are independently hydrogen or fluorine; in formula (1-2-1), at least one of $Z^4$ and $Z^7$ is a single bond; and in formula (1-2-2), at least one of $Z^1$ and $Z^7$ is a single bond.

8. The liquid crystal composition of claim 7, wherein in formula (1-2-1), arbitrary one of $Z^4$ and $Z^7$ is —$CF_2O$—; and in formula (1-2-2), arbitrary one of $Z^1$ and $Z^7$ is —$CF_2O$—.

9. The liquid crystal composition of claim 1, wherein the first component comprises at least one compound selected from the group consisting of compounds represented by formulae (1-3-1), (1-3-2) and (1-3-3):

(1-3-2)

(1-3-3)

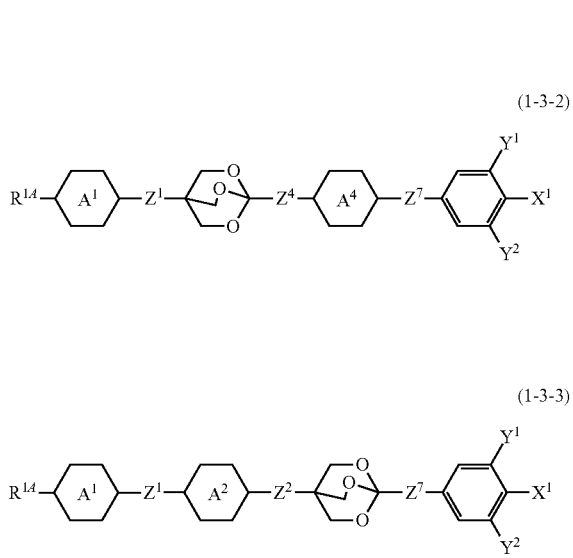

wherein $R^{14}$ is a straight alkyl of $C_{1-10}$; the ring $A^1$, the ring $A^2$, the ring $A^4$ and the ring $A^5$ are independently 1,4-cyclohexylene, 1,4-phenylene, tetrahydropyran-2,5-diyl, 3-fluoro-1,4-phenylene or 3,5-difluoro-1,4-phenylene; $Z^1$, $Z^2$, $Z^4$, $Z^5$ and $Z^7$ are independently a single bond, —$(CH_2)_2$—, —COO—, —$CF_2O$— or —CH=CH—; $X^1$ is fluorine, —$CF_3$ or —$OCF_3$—; $Y^1$ and $Y^2$ are independently hydrogen or fluorine; in formula (1-3-1), at least two of $Z^4$, $Z^5$ and $Z^7$ are single bonds; in formula (1-3-2), at least two of $Z^1$, $Z^4$ and $Z^7$ are single bonds; and in formula (1-3-3), at least two of $Z^1$, $Z^2$ and $Z^7$ are single bonds.

10. The liquid crystal composition of claim 9, wherein in formula (1-3-1), arbitrary one of $Z^4$, $Z^5$ and $Z^7$ is —$CF_2O$—; in formula (1-3-2), arbitrary one of $Z^1$, $Z^4$ and $Z^7$ is —$CF_2O$—; and in formula (1-3-3), arbitrary one of $Z^1$, $Z^2$ and $Z^7$ is —$CF_2O$—.

11. The liquid crystal composition of claim 1, wherein the first component comprises at least one compound selected from the group consisting of compounds represented by formulae (1-4-1), (1-4-2), (1-4-3) and (1-4-4):

(1-4-1)

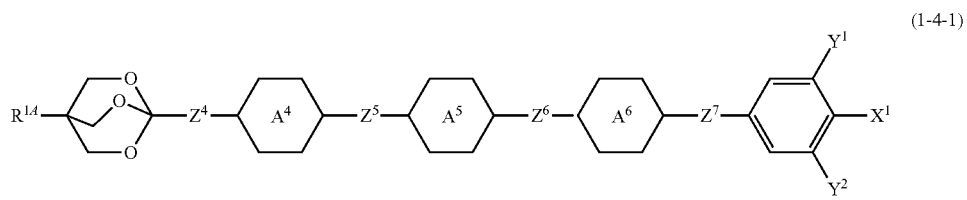

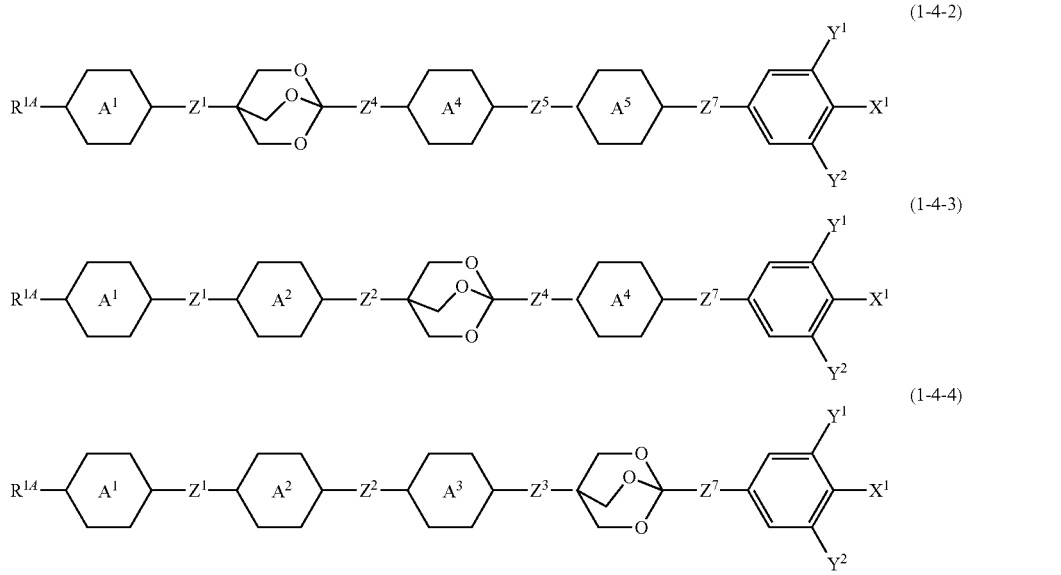

wherein $R^{14}$ is a straight alkyl of $C_{1-10}$; the ring $A^1$, the ring $A^2$, the ring $A^3$, the ring $A^4$, the ring $A^5$ and the ring $A^6$ are independently 1,4-cyclohexylene, 1,4-phenylene, tetrahydropyran-2,5-diyl, 3-fluoro-1,4-phenylene or 3,5-difluoro-1,4-phenylene; $Z^1$, $Z^2$, $Z^3$, $Z^4$, $Z^5$, $Z^6$ and $Z^7$ are independently a single bond, $-(CH_2)_2-$, $-COO-$, $-CF_2O-$ or $-CH=CH-$; $X^1$ is fluorine, $-CF_3$ or $-OCF_3-$; $Y^1$ and $Y^2$ are independently hydrogen or fluorine; in formula (1-4-1), at least three of $Z^4$, $Z^5$, $Z^6$ and $Z^7$ are single bonds; in formula (1-4-2), at least three of $Z^1$, $Z^4$, $Z^5$ and $Z^7$ are single bonds; in formula (1-4-3), at least three of $Z^1$, $Z^2$, $Z^4$ and $Z^7$ are single bonds; and in formula (1-4-4), at least three of $Z^1$, $Z^2$, $Z^3$ and $Z^7$ are single bonds.

12. The liquid crystal composition of claim 11, wherein in formula (1-4-1), arbitrary one of $Z^4$, $Z^5$, $Z^6$ and $Z^7$ is $-CF_2O-$; in formula (1-4-2), arbitrary one of $Z^1$, $Z^4$, $Z^5$ and $Z^7$ is $-CF_2O-$; in formula (1-4-3), arbitrary one of $Z^1$, $Z^2$, $Z^4$ and $Z^7$ is $-CF_2O-$; and in formula (1-4-4), arbitrary one of $Z^1$, $Z^2$, $Z^3$ and $Z^7$ is $-CF_2O-$.

13. The liquid crystal composition of claim 1, wherein a ratio of the first component relative to a total weight of the achiral component T is in a range of 0.5 wt % to 50 wt %.

14. The liquid crystal composition of claim 1, wherein the achiral component T further comprises, as a second component thereof, at least one compound selected from the group consisting of compounds represented by formula (2), wherein $R^2$ is hydrogen, or $C_{1-20}$ alkyl in which arbitrary $-CH_2-$ is optionally replaced by $-O-$, $-S-$, $-COO-$, $-OCO-$, $-CH=CH-$, $-CF=CF-$ or $-C\equiv C-$, and in the alkyl or in a group derived by replacing arbitrary $-CH_2-$ in the alkyl by $-O-$, $-S-$, $-COO-$, $-OCO-$, $-CH=CH-$, $-CF=CF-$ or $-C\equiv C-$, arbitrary hydrogen is optionally replaced by halogen; ring $B^1$, ring $B^2$, ring $B^3$, ring $B^4$ and ring $B^5$ are independently 1,4-cyclohexylene, 1,3-dioxane-2,5-diyl, tetrahydropyran-2,5-diyl, 1,4-phenylene, 1,4-phenylene in which one or two hydrogen atoms are replaced by fluorine, 1,4-phenylene in which two hydrogen atoms are replaced by fluorine and chlorine respectively, pyridine-2,5-diyl, or pyrimidine-2,5-diyl; $Zb^1$, $Zb^2$, $Zb^3$, $Zb^4$, $Zb^5$, $Zb^6$ are independently a single bond, or $C_{1-4}$ alkylene in which arbitrary $-CH_2-$ is optionally replaced by $-O-$, $-COO-$ or $-CF_2O-$; $L^7$, $L^8$ and $L^9$ are independently hydrogen or fluorine; $X^2$ is fluorine, chlorine, $-CF_3$ or $-OCF_3$; $l^1$, $m^1$, $n^1$, $o^1$ and $p^1$ are independently 0 or 1, and $2 \leq l^1+m^1+n^1d+o^1+p^1 \leq 3$.

15. The liquid crystal composition of claim 14, wherein the second component of the achiral component T comprises at least one compound selected from the group consisting of compounds represented by formulae (2-1-1-2), (2-1-2-1), (2-1-3-1), (2-1-3-2), (2-1-4-2) and (2-1-4-3):

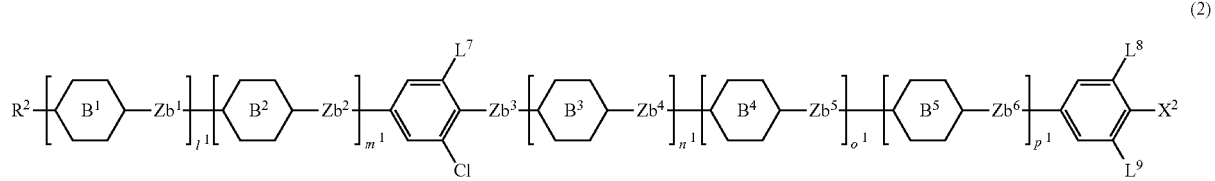

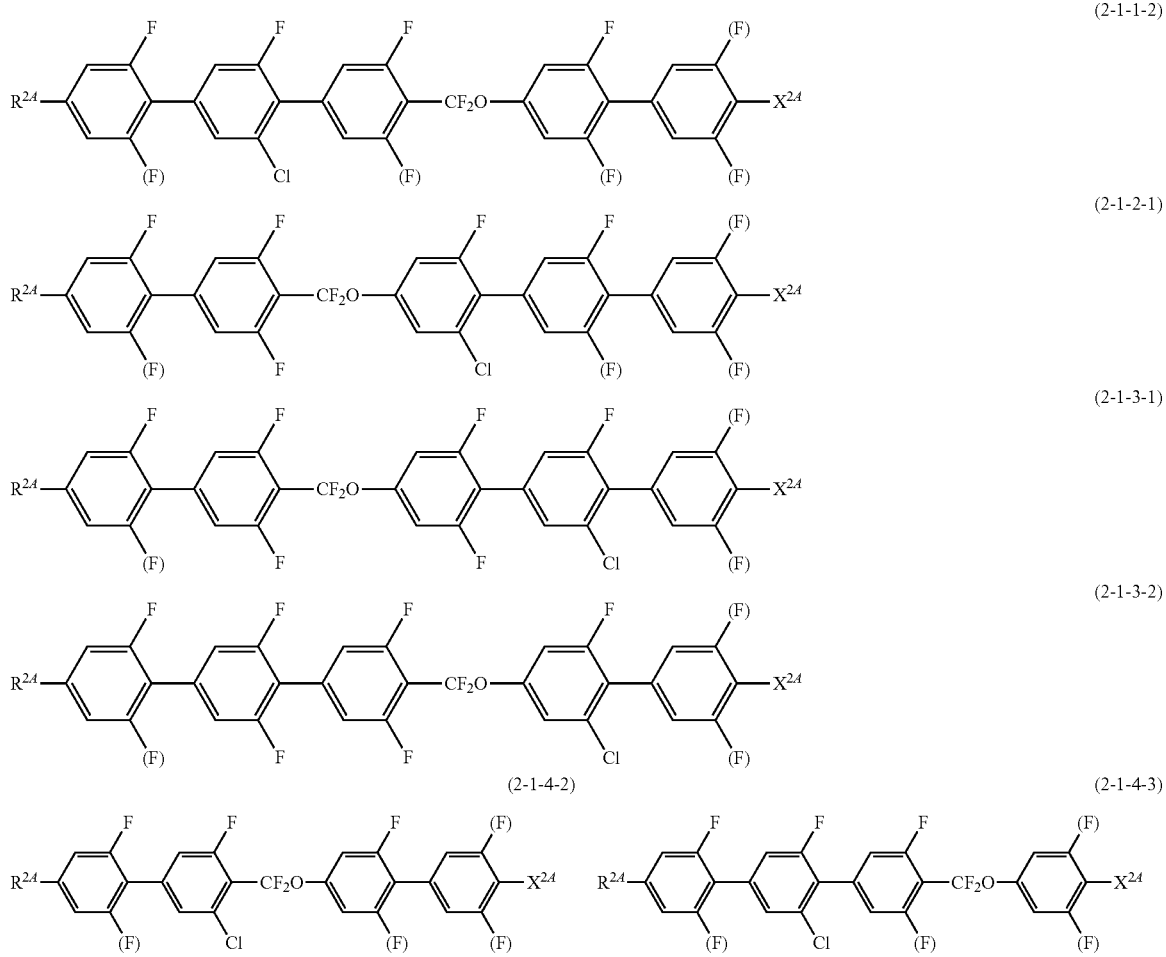

wherein $R^{2A}$ is $C_{1-12}$ alkyl, $C_{1-12}$ alkoxy, $C_{2-12}$ alkenyl, or $C_{2-12}$ alkenyl in which arbitrary hydrogen is replaced by fluorine; each (F) is independently hydrogen or fluorine; and $X^{2A}$ is fluorine, chlorine, —$CF_3$ or —$OCF_3$.

16. The liquid crystal composition of claim 15, wherein the second component of the achiral component T comprises at least one compound selected from the group consisting of compounds represented by formulae (2-1-1-2).

17. The liquid crystal composition of claim 15, wherein the second component of the achiral component T comprises at least one compound selected from the group consisting of compounds represented by formulae (2-1-4-3).

18. The liquid crystal composition of claim 15, wherein the second component of the achiral component T comprises a mixture of at least one compound selected from the group consisting of compounds represented by formulae (2-1-1-2) and at least one compound selected from the group consisting of compounds represented by formulae (2-1-4-3).

19. The liquid crystal composition of claim 14, wherein a ratio of the second component relative to a total weight of the achiral component T is in a range of 5 wt % to 70 wt %.

20. The liquid crystal composition of claim 14, wherein the achiral component T further comprises, as a third component thereof, at least one compound selected from the group consisting of compounds represented by formula (3),

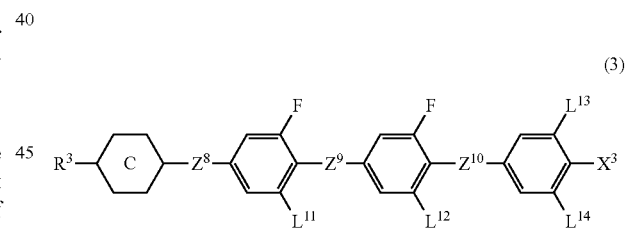

wherein $R^3$ is hydrogen, or $C_{1-20}$ alkyl in which arbitrary —$CH_2$— is optionally replaced by —O—, —S—, —COO—, —OCO—, —CH=CH—, —CF=CF— or —C≡C—, and in the alkyl or in a group derived by replacing arbitrary —$CH_2$— in the alkyl by —O—, —S—, —COO—, —OCO—, —CH=CH—, —CF=CF— or —C≡C—, arbitrary hydrogen is optionally replaced by halogen; ring C is 1,4-phenylene in which one or more hydrogen atoms are replaced by fluorine, tetrahydropyran-2,5-diyl or 1,3-dioxane-2,5-diyl; $Z^8$, $Z^9$ and $Z^{10}$ are independently a single bond, —COO— or —$CF_2$O—, with a proviso that at least one of $Z^8$, $Z^9$ and $Z^{10}$ is —$CF_2$O—; $L^{11}$, $L^{12}$, $L^{13}$ and $L^{14}$ are independently hydrogen or flourine; $X^3$ is hydrogen, halogen, —$SF_5$, or $C_{1-10}$ alkyl in which arbitrary —$CH_2$— is optionally replaced by —O—, —S—, —COO—, —OCO—, —CH=CH—, —CF=CF— or —C≡C—, and in the alkyl or in a group derived by replacing arbitrary —CH$_2$— in the alkyl by —O—, —S—, —COO—, —OCO—, —CH=CH—, —CF=CF— or —C≡C—, arbitrary hydrogen is optionally replaced by fluorine.

21. The liquid crystal composition of claim 20, wherein the third component of the achiral component T comprises at least one compound selected from the group consisting of compounds represented by formulae (3-2) to (3-5):

(3-2)

(3-3)

(3-4)

(3-5)

wherein each R$^{3A}$ is independently C$_{1-12}$ alkyl, C$_{1-12}$ alkoxy, C$_{2-12}$ alkenyl, or C$_{2-12}$ alkenyl in which arbitrary hydrogen is replaced by fluorine; X$^{3A}$ is fluorine, chlorine, —CF$_3$ or —OCF$_3$; and L$^{11}$, L$^{12}$, L$^{13}$ and L$^{14}$ are independently hydrogen or fluorine.

22. The liquid crystal composition of claim 21, wherein the third component of the achiral component T comprises at least one compound selected from the group consisting of compounds represented by formula (3-2).

23. The liquid crystal composition of claim 21, wherein the third component of the achiral component T comprises at least one compound selected from the group consisting of compounds represented by formula (3-3).

24. The liquid crystal composition of claim 21, wherein the third component of the achiral component T comprises at least one compound selected from the group consisting of compounds represented by formula (3-4).

25. The liquid crystal composition of claim 21, wherein the third component of the achiral component T comprises at least one compound selected from the group consisting of compounds represented by formula (3-5).

26. The liquid crystal composition of claim 20, wherein a ratio of the third component relative to a total weight of the achiral component T is in a range of 5 wt % to 70 wt %.

27. The liquid crystal composition of claim 20, wherein relative to a total weight of the achiral component T, a ratio of the first component is in a range of 1 wt % to 30 wt %, a ratio of the second component is in a range of 10 wt % to 50 wt %, and a ratio of the third component is in a range of 10 wt % to 50 wt %.

28. The liquid crystal composition of claim 20, wherein the achiral component T further comprises, as a fourth component thereof, at least one compound selected from the group consisting of compounds represented by formula (4),

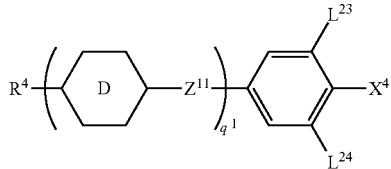
(4)

wherein R$^4$ is C$_{1-12}$ alkyl, C$_{1-12}$ alkoxy, C$_{2-12}$ alkenyl, or C$_{2-12}$ alkenyl in which arbitrary hydrogen is replaced by fluorine; each ring D is independently 1,4-cyclohexylene, 1,3-dioxane-2,5-diyl, tetrahydropyran-2,5-diyl, 1,4-phenylene, 2-fluoro-1,4-phenylene, 3-fluoro-1,4-phenylene, 3,5-difluoro-1,4-phenylene, 3,5-dichloro-1,4-phenylene or pyrimidine-2,5-diyl; each Z$^{11}$ is independently a single bond, ethylene, —COO—, —OCO—, —CF$_2$O— or —OCF$_2$—; L$^{23}$ and L$^{24}$ are independently hydrogen or fluorine; X$^4$ is fluorine, chlorine, —CF$_3$ or —OCF$_3$; q$^1$ is 1, 2, 3 or 4; when q$^1$ is 3 or 4, one Z$^{10}$ is —CF$_2$O— or —OCF$_2$—; and when q$^1$ is 3, each ring D is not 1,3-dioxane-2,5-diyl or tetrahydropyran-2,5-diyl, and the rings D are not simultaneously fluorine-substituted 1,4-phenylene.

29. The liquid crystal composition of claim 28, wherein the fourth component of the achiral component T comprises at least one compound selected from the group consisting of compounds represented by formulae (4-1) to (4-7):

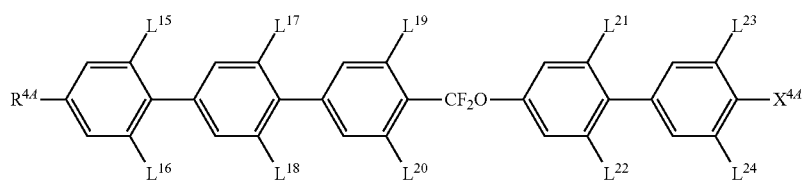
(4-1)

(4-2)
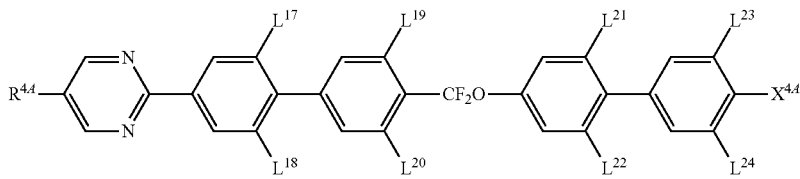

(4-3)
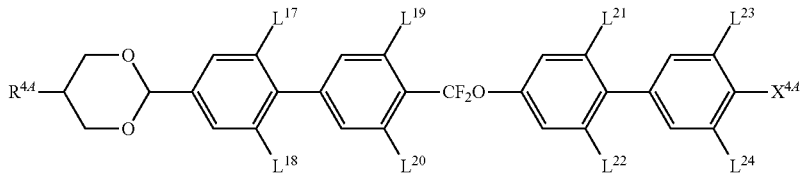

(4-4)
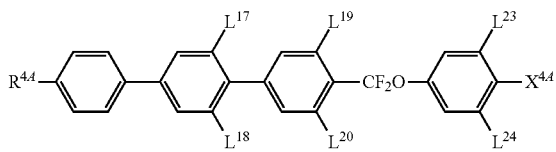

(4-5)

(4-6)
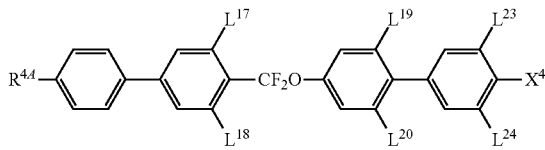

(4-7)
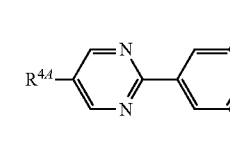

wherein each $R^{4A}$ is independently $C_{1-12}$ alkyl, $C_{1-12}$ alkoxy, $C_{2-12}$ alkenyl, or $C_{2-12}$ alkenyl in which arbitrary hydrogen is replaced by fluorine; $X^{4A}$ is fluorine, chlorine, —$CF_3$ or —$OCF_3$; and $L^{15}$, $L^{16}$, $L^{17}$, $L^{18}$, $L^{19}$, $L^{20}$, $L^{21}$, $L^{22}$, $L^{23}$ and $L^{24}$ are independently hydrogen or fluorine.

30. The liquid crystal composition of claim 28, wherein a ratio of the fourth component relative to a total weight of the achiral component T is in a range of 5 wt % to 40 wt %.

31. The liquid crystal composition of claim 20, wherein the achiral component T further comprises, as a fifth component thereof, at least one compound selected from the group consisting of compounds represented by formula (5), (5)
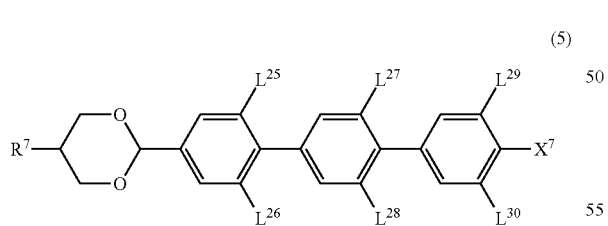

wherein $R^7$ is hydrogen, or $C_{1-20}$ alkyl in which arbitrary —$CH_2$— is optionally replaced by —O—, —S—, —COO—, —OCO—, —CH=CH—, —CF=CF— or —C≡C—, and in the alkyl or in a group derived by replacing arbitrary —$CH_2$— in the alkyl by —O—, —S—, —COO—, —OCO—, —CH=CH—, —CF=CF— or —C≡C—, arbitrary hydrogen is optionally replaced by halogen; $L^{25}$, $L^{26}$, $L^{27}$, $L^{28}$, $L^{29}$ and $L^{30}$ are independently hydrogen or fluorine; and $X^7$ is hydrogen, halogen, —$SF_5$, or $C_{1-10}$ alkyl in which arbitrary —$CH_2$— is optionally replaced by —O—, —S—, —COO—, —OCO—, —CH=CH—, —CF=CF— or —C≡C—, and in the alkyl or in a group derived by replacing arbitrary —$CH_2$— in the alkyl by —O—, —S—, —COO—, —OCO—, —CH=CH—, —CF=CF— or —C≡C—, arbitrary hydrogen is optionally replaced by fluorine.

32. The liquid crystal composition of claim 31, wherein the fifth component of the achiral component T comprises at least one compound selected from the group consisting of compounds represented by formulae (5-1) to (5-3):

(5-1)
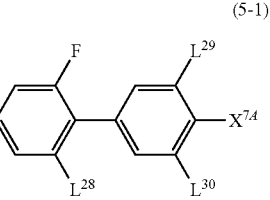

(5-2)
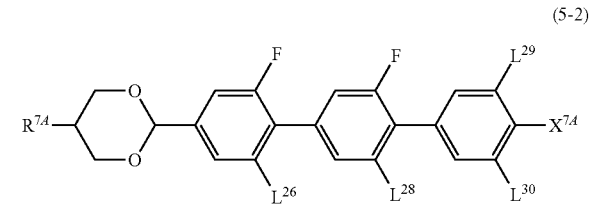

(5-3)

wherein $R^{7A}$ is $C_{1-12}$ alkyl, $C_{1-12}$ alkoxy, $C_{2-12}$ alkenyl, or $C_{2-12}$ alkenyl in which arbitrary hydrogen is replaced by fluorine; $L^{26}$, $L^{28}$, $L^{29}$ and $L^{30}$ are independently hydrogen or fluorine; and $X^{7A}$ is fluorine, chlorine, —$CF_3$ or —$OCF_3$.

33. The liquid crystal composition of claim 32, wherein the fifth component of the achiral component T comprises at least one compound selected from the group consisting of compounds represented by formula (5-2).

34. The liquid crystal composition of claim 32, wherein the fifth component of the achiral component T comprises at least one compound selected from the group consisting of compounds represented by formulae (5-1-1), (5-1-2), (5-2-1) to (5-2-4), (5-3-1) and (5-3-2), (5-1-1)

(5-1-2)

(5-2-1)

(5-2-2)

(5-2-3)

(5-2-4)

(5-3-1)

(5-3-2)

wherein $R^{7A}$ is $C_{1-12}$ alkyl, $C_{1-12}$ alkoxy, $C_{2-12}$ alkenyl, or $C_{2-12}$ alkenyl in which arbitrary hydrogen is replaced by fluorine; and $X^{7A}$ is fluorine, chlorine or —$OCF_3$.

35. The liquid crystal composition of claim 31, wherein a ratio of the fifth component relative to a total weight of the achiral component T is in a range of 1.0 wt % to 30 wt %.

36. The liquid crystal composition of claim 1, wherein the chiral dopant comprises at least one compound selected from the group consisting of compounds represented by formulae (K1)-(K5), (K1)

(K2)

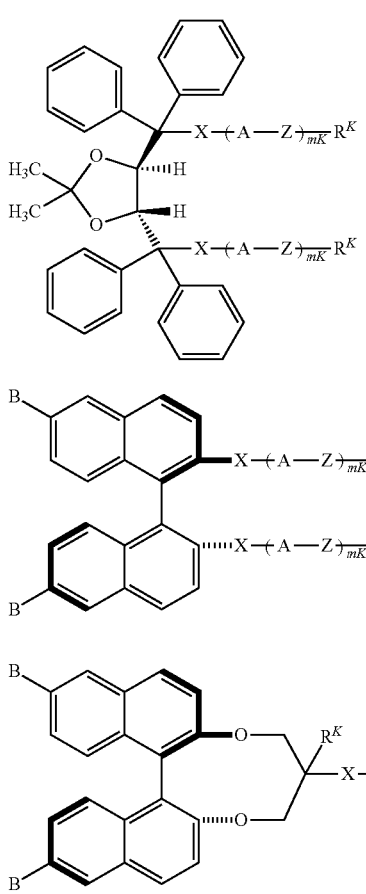

(K3)

(K4)

(K5)

wherein each $R^K$ is independently hydrogen, halogen, —C≡N, —N=C=O, —N=C=S, or $C_{1-20}$ alkyl in which arbitrary —$CH_2$— is optionally replaced by —O—, —S—, —COO— or —OCO—, arbitrary —$CH_2$—$CH_2$— is optionally replaced by —CH=CH—, —CF=CF— or —C≡C—, and arbitrary hydrogen is optionally replaced by halogen; each A is independently an aromatic six- to eight-member ring, a non-aromatic three- to eight-member ring, or a fused ring of 9 or more carbons, and in these rings arbitrary hydrogen is optionally replaced by halogen, $C_{1-3}$ alkyl or $C_{1-3}$ haloalkyl, —$CH_2$— is optionally replaced by —O—, —S— or —NH—, and —CH= is optionally replaced by —N=; each B is independently hydrogen, halogen, $C_{1-3}$ alkyl, $C_{1-3}$ haloalkyl, an aromatic six- to eight-member ring, a non-aromatic three- to eight-member ring, or a fused ring of 9 or more carbons, and in these rings arbitrary hydrogen is optionally replaced by halogen, $C_{1-3}$ alkyl or $C_{1-3}$ haloalkyl, —$CH_2$— is optionally replaced by —O—, —S— or —NH—, and —CH= is optionally replaced by —N=; each Z is independently a single bond, or $C_{1-8}$ alkylene in which arbitrary —$CH_2$— is optionally replaced by —O—, —S—, —COO—, —OCO—, —CSO—, —OCS—, —CH=N— or —N=CH—, arbitrary —$CH_2$—$CH_2$— is optionally replaced by —CH=CH—, —CF=CF— or —C≡C—, and arbitrary hydrogen is optionally replaced by halogen; X is a single bond, —COO—, —OCO—, —$CH_2O$—, —$OCH_2$—, —$CF_2O$—, —$OCF_2$— or —$CH_2CH_2$—; and mK is an integer of 1-4.

37. The liquid crystal composition of claim 36, wherein the chiral dopant comprises at least one compound selected from the group consisting of compounds represented by formulae (K4-1) to (K4-6) and (K5-1) to (K5-3).

(K4-1)

(K4-2)

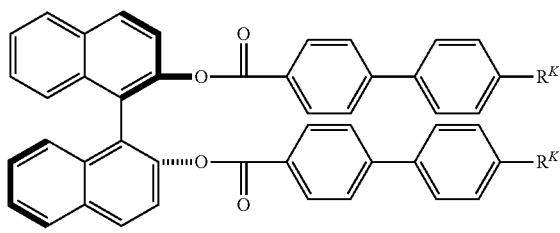

(K4-3)

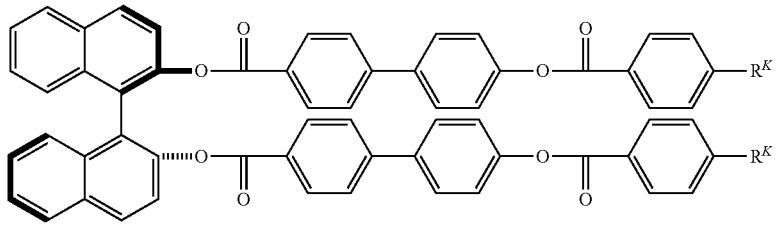

(K4-4)

(K4-5)

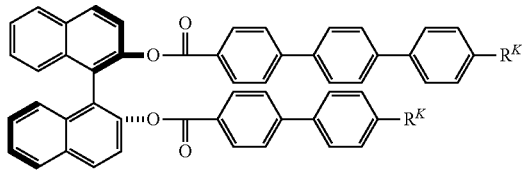
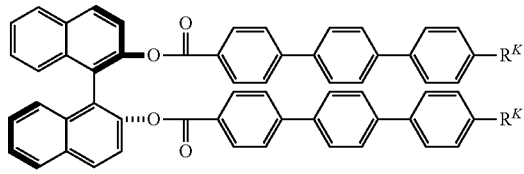

-continued (K4-6)

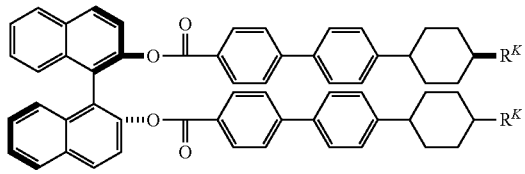

(K5-1)

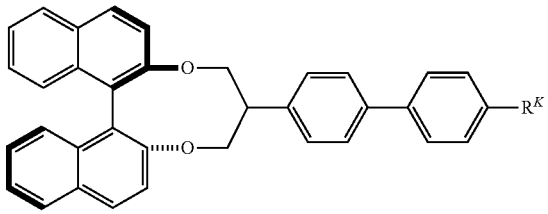

(K5-2)

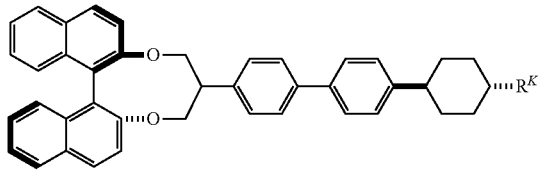

(K5-3)

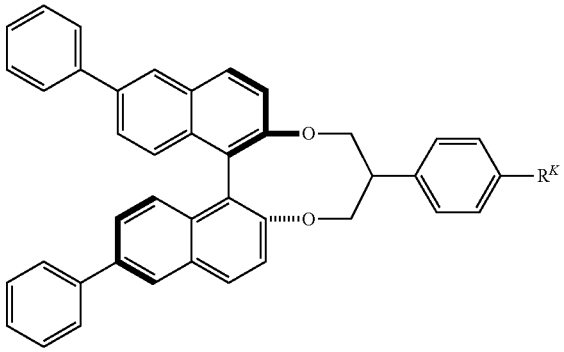

wherein each $R^K$ is independently $C_{3-10}$ alkyl in which the —CH$_2$— adjacent to a ring is optionally replaced by —O—, and in the alkyl or in a group derived by replacing the —CH$_2$— in the alkyl adjacent to the ring by —O—, arbitrary —CH$_2$— is optionally replaced by —C=C—.

38. The liquid crystal composition of claim 1, wherein a ratio of the chiral dopant relative to a total weight of the liquid crystal composition is in a range of 1 wt % to 40 wt %.

39. The liquid crystal composition of claim 1, which exhibits a chiral nematic phase at any temperature in a range of 70° C. to −20° C. and has a helical pitch of 700 nm or less at a temperature in at least a part of the range of 70° C. to −20° C.

40. The liquid crystal composition of claim 1, further comprising at least one antioxidant, at least one ultraviolet absorbent, or at least one antioxidant and at least one ultraviolet absorbent.

41. A mixture, comprising the liquid crystal composition of claim 1, and a polymerizable monomer.

42. A polymer/liquid crystal composite material, being obtained by polymerizing the mixture of claim 41 and used in a device driven in an optically isotropic liquid crystal phase.

43. The polymer/liquid crystal composite material of claim 42, wherein the mixture is polymerized in an isotropic phase or in an optically isotropic liquid crystal phase.

44. An optical device, comprising: a liquid crystal medium disposed between two substrates with electrodes disposed on a surface of one or both of the substrates, and an electric-field applying means for applying an electric field to the liquid crystal medium via the electrodes, wherein the liquid crystal medium is the polymer/liquid crystal composite material of claim 42.

45. An optical device, comprising: two substrates with a surface of one or both thereof disposed with electrodes thereon and at least one thereof being transparent, a liquid crystal medium disposed between the two substrates, a polarizer disposed on an outer side of the substrates, and an electric-field applying means for applying an electric field to the liquid crystal medium via the electrodes, wherein the liquid crystal medium is the polymer/liquid crystal composite material of claim 42.

46. The optical device of claim 44, wherein on at least one of the two substrates, the electrodes are constructed in a manner such that the electric field is applied in at least two directions.

47. The optical device of claim 44, wherein the two substrates are arranged parallel to each other, and on one or both of the two substrates, the electrodes are constructed in a manner such that the electric field is applied in at least two directions.

48. The optical device of claim 44, wherein the electrodes are disposed in a matrix form to form pixel electrodes, and each pixel is provided with an active device being a thin film transistor (TFT).

\* \* \* \* \*